(12) United States Patent
Lank

(10) Patent No.: US 11,772,333 B2
(45) Date of Patent: Oct. 3, 2023

(54) SYSTEM AND METHOD FOR SEALING A PLASTIC ENCLOSURE

(71) Applicant: Brainchild Concepts, LLC, Ormond Beach, FL (US)

(72) Inventor: Juli Lank, Ormond Beach, FL (US)

(*) Notice: Subject to any disclaimer, the term of this patent is extended or adjusted under 35 U.S.C. 154(b) by 272 days.

(21) Appl. No.: 16/803,847

(22) Filed: Feb. 27, 2020

(65) Prior Publication Data

US 2020/0276768 A1 Sep. 3, 2020

Related U.S. Application Data

(60) Provisional application No. 62/812,372, filed on Mar. 1, 2019.

(51) Int. Cl.
  *B29C 65/30* (2006.01)
  *B65B 31/04* (2006.01)
  (Continued)

(52) U.S. Cl.
  CPC ............ *B29C 65/30* (2013.01); *B29C 65/745* (2013.01); *B29C 66/4312* (2013.01);
  (Continued)

(58) Field of Classification Search
  CPC ..... B29C 65/18; B29C 65/222; B29C 65/224; B29C 65/228; B29C 65/30; B29C 65/38;
  (Continued)

(56) References Cited

U.S. PATENT DOCUMENTS 2,401,991 A * 6/1946 Quayle ............... B29C 66/1122
                                                    156/358
2,441,817 A    5/1948 Huff
                (Continued)

FOREIGN PATENT DOCUMENTS

EP       1334706        8/2003
JP       55166633 B    12/1980
                (Continued)

OTHER PUBLICATIONS

PCT/US2020/048518 International Search Report and Written Opinion, dated Nov. 20, 2020, 12 pages.
(Continued)

*Primary Examiner* — Robert F Long
*Assistant Examiner* — Eduardo R Ferrero
(74) *Attorney, Agent, or Firm* — Wolter Van Dyke Davis, PLLC; Robert L. Wolter

(57) ABSTRACT

A method and apparatus for sealing a plastic enclosure is provided. The apparatus includes a handle including elements pivotally coupled together at a first end. The apparatus also includes a pair of spaced apart heating elements positioned along an inner surface of an element and connected to a power source where a longitudinal axis of the heating elements is oriented parallel with a longitudinal axis of the element. Plastic material including first and second plastic layers is positioned at an interface between the second elements. Upon pivoting the first elements from an open position to a closed position the heating elements increase a temperature at the interface to melt the plastic material and form a pair of spaced apart seals between the first and second plastic layers.

20 Claims, 47 Drawing Sheets

(51) Int. Cl.
*B65B 51/14* (2006.01)
*B29C 65/74* (2006.01)
*B29C 65/00* (2006.01)
*B29L 31/00* (2006.01)

(52) U.S. Cl.
CPC .......... *B29C 66/8511* (2013.01); *B65B 31/04* (2013.01); *B65B 51/146* (2013.01); *B65B 51/148* (2013.01); *B29L 2031/7128* (2013.01)

(58) Field of Classification Search
CPC .............. B29C 65/745; B29C 65/7451; B29C 65/8253; B29C 66/00145; B29C 66/0044; B29C 66/1122; B29C 66/232; B29C 66/431; B29C 66/4312; B29C 66/43121; B29C 66/71; B29C 66/73921; B29C 66/8122; B29C 66/81435; B29C 66/8161; B29C 66/81821; B29C 66/8324; B29C 66/83241; B29C 66/84121; B29C 66/849; B29C 66/8511; B29C 66/8614; B29C 66/8618; B29C 66/91231; B29C 66/91421; B29C 66/91431; B29C 66/91641; B29C 66/961; B29C 66/9672; B29C 66/8221; B29C 2043/3639; B29L 2023/008; B29L 2031/712; B29L 2031/7128; B65B 31/04; B65B 31/06; B65B 51/146; B65B 51/148; B65B 51/30; B65B 69/0008; B65B 69/0033; B65B 13/327; B65D 2501/24783
USPC .......................................................... 383/119
See application file for complete search history.

(56) References Cited

U.S. PATENT DOCUMENTS

| | | | | |
|---|---|---|---|---|
| 2,496,609 | A * | 2/1950 | Van Antwerpen | ........................ B29C 66/81435 53/122 |
| 2,579,088 | A | 12/1951 | Piazze | |
| 2,698,273 | A | 12/1954 | Miner | |
| 2,759,090 | A | 8/1956 | Frye | |
| 2,844,697 | A | 7/1958 | William | |
| 3,035,381 | A * | 5/1962 | Hosso | B29C 66/431 53/568 |
| 3,149,015 | A | 9/1964 | Lindsay | |
| 3,162,564 | A * | 12/1964 | Buchner | B29C 66/83241 156/498 |
| 3,174,892 | A * | 3/1965 | Fichtner | B29C 65/229 156/583.3 |
| 3,196,067 | A * | 7/1965 | Techtmann | B29C 66/80 53/133.8 |
| 3,200,028 | A | 8/1965 | Chisholm | |
| 3,236,174 | A * | 2/1966 | Hutchinson | B29C 66/81457 100/319 |
| 3,322,603 | A | 5/1967 | Grasso | |
| 3,516,223 | A * | 6/1970 | Andersen | B29C 66/81431 53/425 |
| 3,597,587 | A * | 8/1971 | Baum | B29K 2827/18 219/243 |
| 3,630,665 | A * | 12/1971 | Andersen | B65B 31/06 422/33 |
| 3,731,054 | A * | 5/1973 | Bair | B29C 66/8324 219/243 |
| 3,752,017 | A | 8/1973 | Lloyd et al. | |
| 4,001,075 | A * | 1/1977 | Menzner | B29C 65/18 156/581 |
| 4,025,383 | A | 5/1977 | Ferrigno | |
| 4,093,500 | A * | 6/1978 | Browne | B29C 65/228 156/510 |
| 4,138,308 | A | 2/1979 | Guenther | |
| 4,156,382 | A | 5/1979 | Baker | |
| 4,221,101 | A * | 9/1980 | Woods | B29C 66/8167 53/512 |
| 4,353,196 | A * | 10/1982 | Beer | B26D 1/095 53/451 |
| 4,416,104 | A * | 11/1983 | Yamada | B29C 66/8227 53/375.6 |
| 4,613,320 | A * | 9/1986 | Lerner | B29C 65/18 493/198 |
| 4,650,535 | A * | 3/1987 | Bennett | B29C 66/8742 493/207 |
| 4,697,401 | A * | 10/1987 | Kessler | B29C 65/7451 53/201 |
| 5,019,027 | A * | 5/1991 | Boeckmann | B29C 65/18 493/209 |
| 5,048,269 | A | 9/1991 | Deni | |
| 5,142,123 | A | 8/1992 | Chou | |
| 5,209,573 | A * | 5/1993 | Freeman | B65D 31/04 383/114 |
| 5,638,664 | A * | 6/1997 | Levsen | B29C 66/8324 53/512 |
| 6,088,996 | A * | 7/2000 | Maruyama | B29C 66/8161 53/373.7 |
| 6,178,726 | B1 * | 1/2001 | Takigawa | B29C 66/93451 53/374.6 |
| 6,256,968 | B1 * | 7/2001 | Kristen | F04B 37/14 53/512 |
| 6,313,439 | B1 | 11/2001 | Fischbach et al. | |
| 6,335,515 | B1 | 1/2002 | Chou et al. | |
| 6,392,198 | B1 | 5/2002 | Yao | |
| D528,137 | S | 9/2006 | Huang | |
| D542,315 | S | 5/2007 | Chang | |
| 7,312,421 | B2 | 12/2007 | Chou et al. | |
| 7,315,010 | B2 | 1/2008 | Chou et al. | |
| 7,516,594 | B1 * | 4/2009 | Terminella | B29C 66/348 53/512 |
| 7,700,897 | B2 | 4/2010 | Chou et al. | |
| 7,730,698 | B1 | 6/2010 | Montano | |
| 2003/0159405 | A1 * | 8/2003 | Knowlton | B29C 66/82421 53/434 |
| 2003/0185703 | A1 | 10/2003 | Walsh | |
| 2004/0030305 | A1 | 2/2004 | Sakamoto | |
| 2004/0045570 | A1 | 3/2004 | Yao | |
| 2004/0060262 | A1 * | 4/2004 | Harges | B29C 66/8221 53/512 |
| 2004/0262281 | A1 | 12/2004 | Chou | |
| 2005/0193685 | A1 * | 9/2005 | Kuchler | B29C 66/8324 53/77 |
| 2006/0053748 | A1 * | 3/2006 | Ahn | B65B 31/046 53/434 |
| 2006/0137299 | A1 * | 6/2006 | Huang | B29C 66/8322 53/512 |
| 2006/0230711 | A1 * | 10/2006 | Higer | B65B 51/146 53/512 |
| 2006/0231211 | A1 * | 10/2006 | Chou | B29C 66/849 156/579 |
| 2006/0248856 | A1 * | 11/2006 | Cheng | B29C 66/8161 53/77 |
| 2007/0125498 | A1 * | 6/2007 | Kataoka | B65B 51/146 156/583.1 |
| 2009/0007521 | A1 * | 1/2009 | Opdycke | B29C 65/02 53/374.8 |
| 2009/0026190 | A1 | 1/2009 | Chang | |
| 2010/0032098 | A1 | 2/2010 | Lalli | |
| 2011/0126986 | A1 * | 6/2011 | Cheung | B29C 66/1122 156/350 |
| 2011/0289885 | A1 * | 12/2011 | Re | B29C 65/224 53/510 |
| 2012/0060447 | A1 * | 3/2012 | Liu | B29C 65/224 53/370.7 |
| 2012/0111449 | A1 | 5/2012 | Hsu | |
| 2014/0196405 | A1 * | 7/2014 | Owens | B29C 66/91212 53/396 |
| 2015/0027089 | A1 * | 1/2015 | Owens | B29C 66/1122 53/510 |
| 2015/0232210 | A1 * | 8/2015 | Sung | B29C 66/849 307/26 |

(56) References Cited

U.S. PATENT DOCUMENTS

| | | | |
|---|---|---|---|
| 2016/0001907 A1* | 1/2016 | Kim | B65B 31/048 |
| | | | 53/329.2 |
| 2016/0101885 A1* | 4/2016 | Ledger | B65B 31/00 |
| | | | 53/110 |
| 2017/0043892 A1* | 2/2017 | Bocks | B65B 51/148 |
| 2018/0064835 A1* | 3/2018 | Young | B65B 51/148 |
| 2018/0346169 A1 | 12/2018 | Lank | |
| 2020/0276768 A1 | 9/2020 | Lank | |

FOREIGN PATENT DOCUMENTS

| | | | |
|---|---|---|---|
| JP | S55-166633 U | 12/1980 | |
| JP | H04118220 | 4/1992 | |
| JP | 2001218782 A | 8/2001 | |
| JP | 2001270501 A | 10/2001 | |
| JP | 3266033 | 1/2002 | |
| JP | 3112255 B | 8/2005 | |

OTHER PUBLICATIONS

Uline; Tabletop Poly Bag Sealers—Impulse with Cutter; https://www.uline.com/BL_2254/Tabletop-Poly-Bag-Sealer-Impulse-with-Cutter.

Amazon; Orblue Bag Heat Sealer-Food Saver and Creates Airtight Containers—Cabinet Accessory; https://www.amazon.com/gp/product/B00SHK7M9M.

Digi-Key Electronics; HAKO; https://www.digikey.com/catalog/en/partgroup/fm2023-05-mini-hot-tweezer-kit/65443.

PCT/US2018/064028 International Search Report and Written Opinion, dated Mar. 20, 2019, 17 pages.

Japanese Patent Office Action dated Sep. 27, 2022 in Japanese Patent Application No. 2021-517546.

* cited by examiner

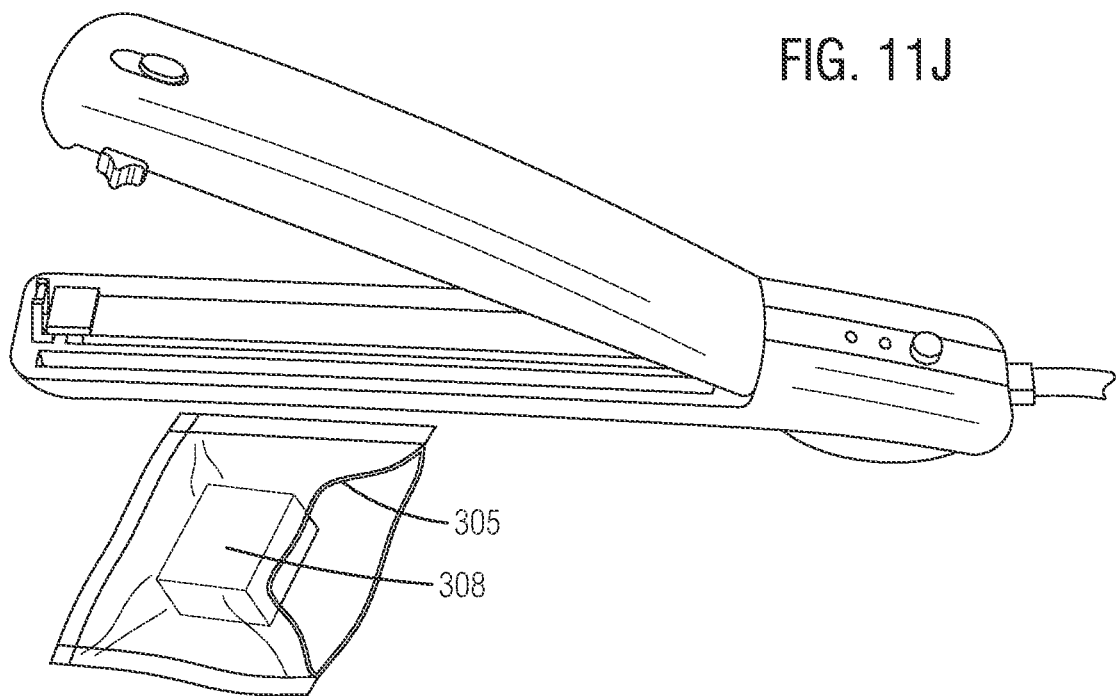
FIG. 11J
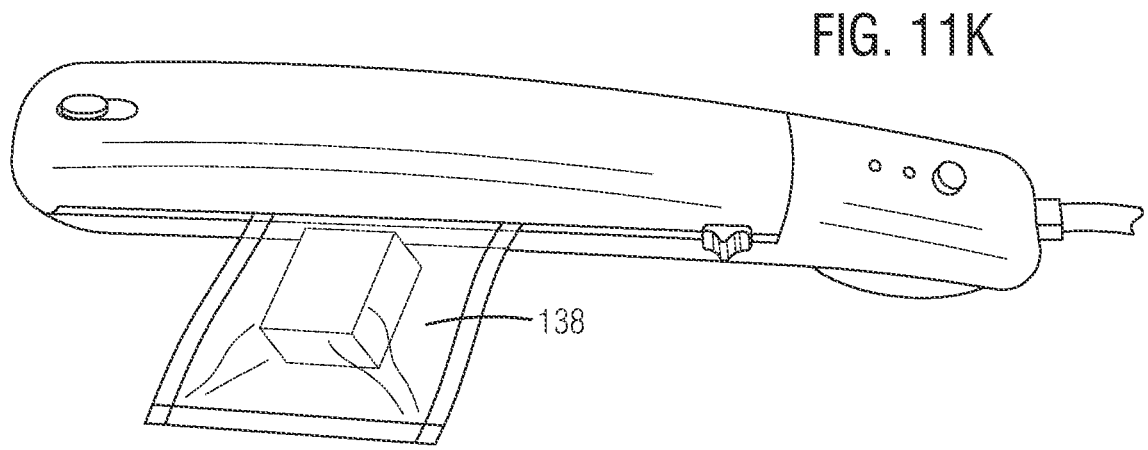
FIG. 11K
FIG. 11L
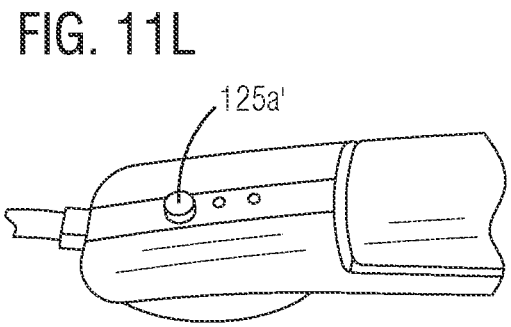
FIG. 11M
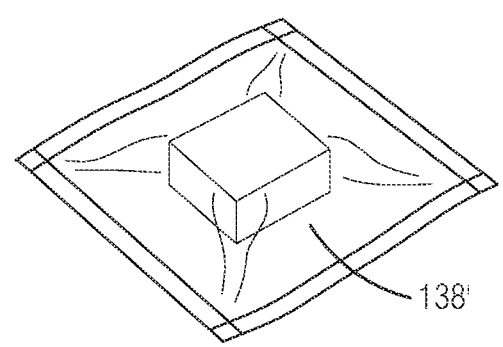

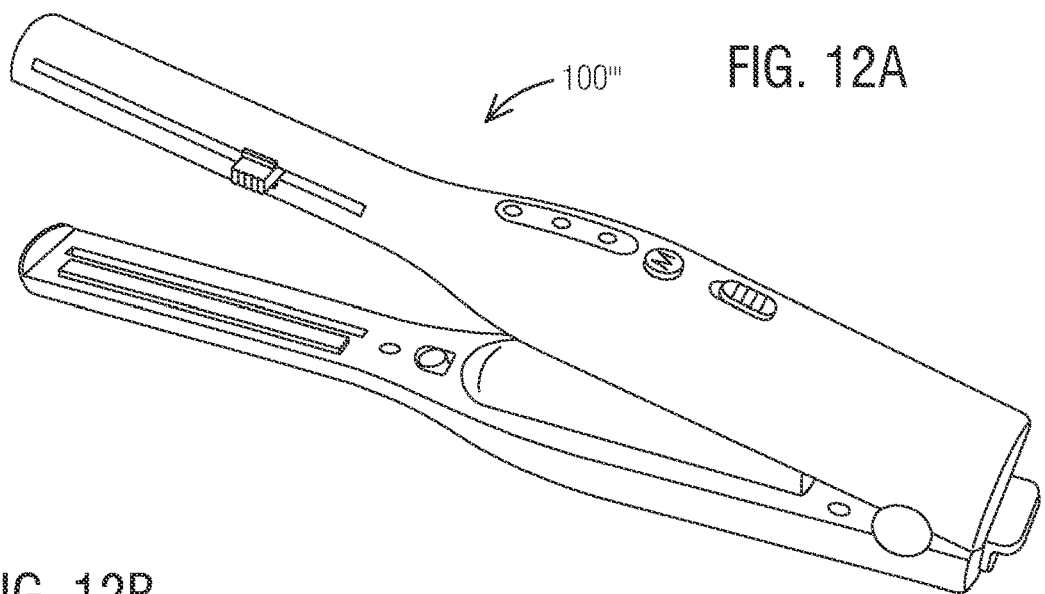
FIG. 12A
FIG. 12B
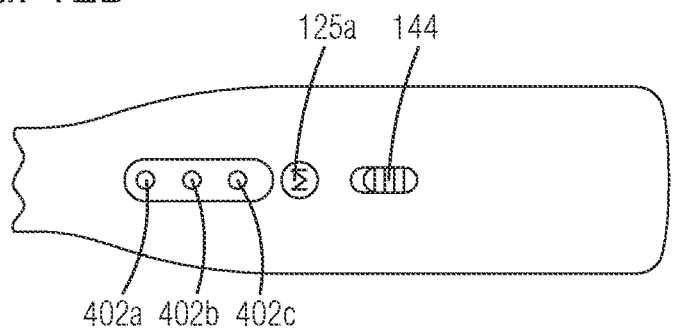
FIG. 12C
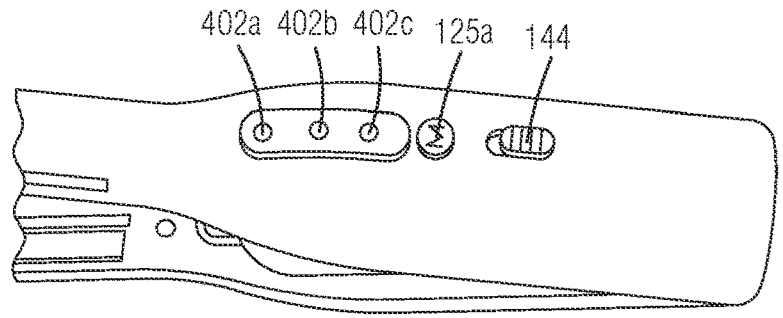
FIG. 12D
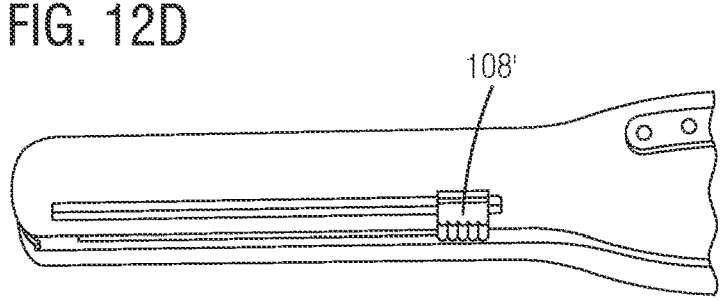

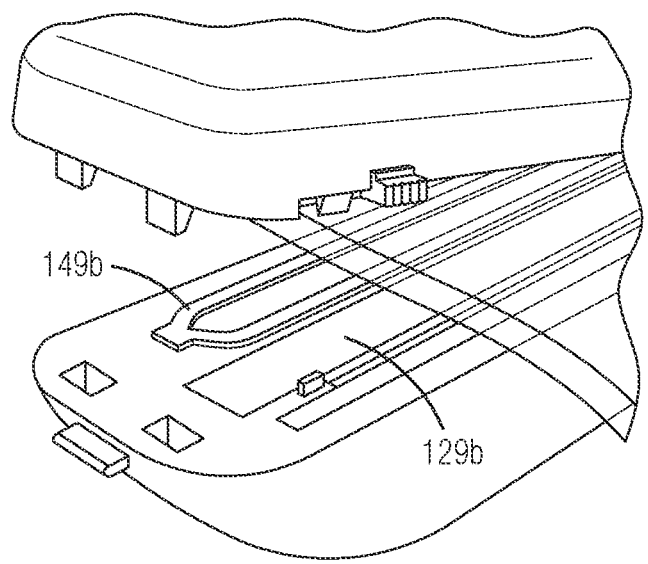
FIG. 13G
FIG. 13H
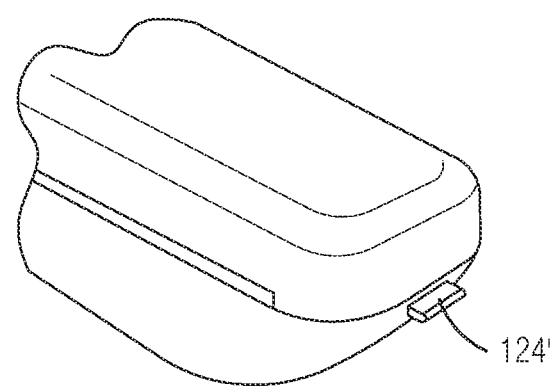
FIG. 13I
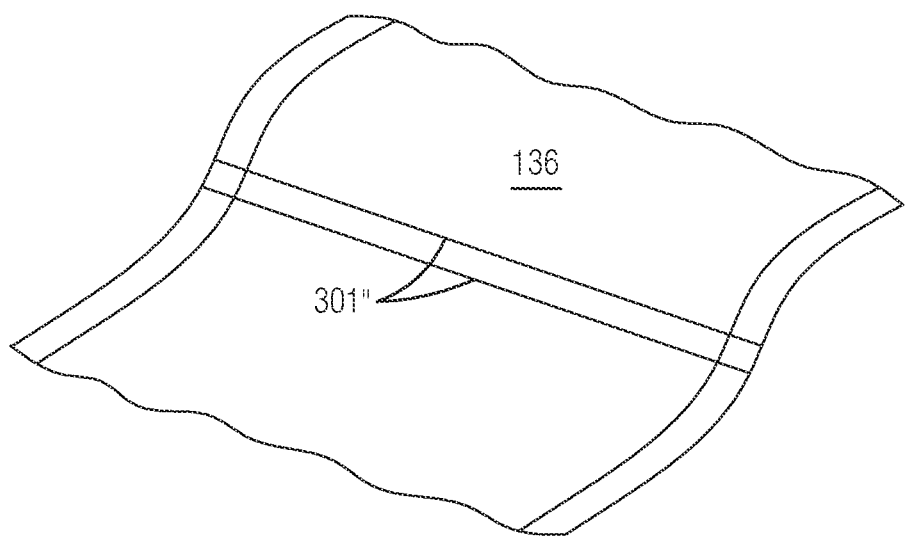

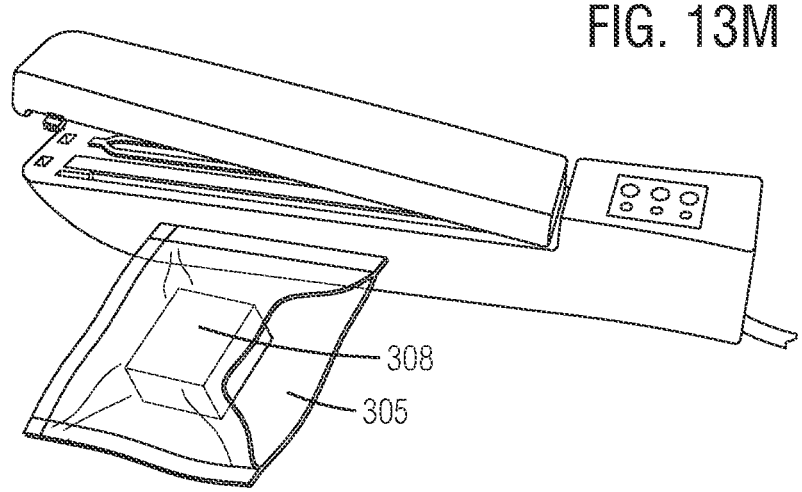
FIG. 13M
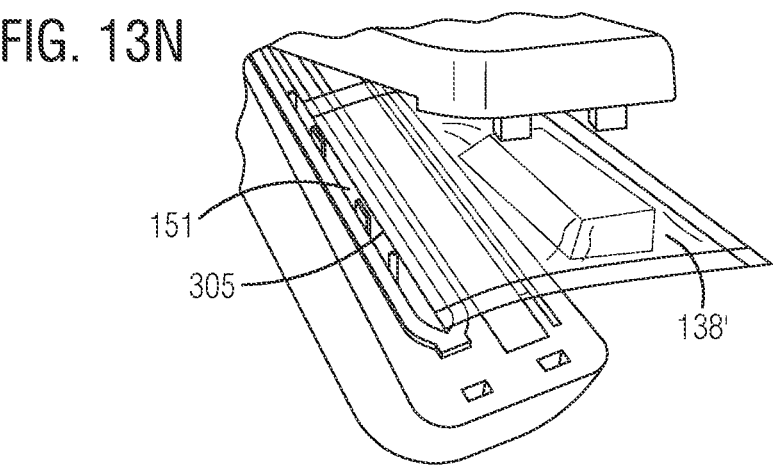
FIG. 13N
FIG. 13O
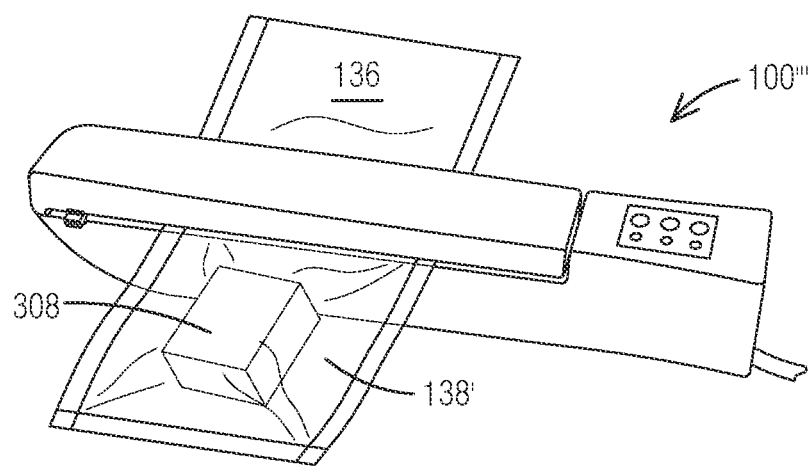

SYSTEM AND METHOD FOR SEALING A PLASTIC ENCLOSURE

CROSS REFERENCE TO RELATED APPLICATIONS

This application claims benefit of Provisional Application No. 62/812,372, filed Mar. 1, 2019, the entire contents of which is hereby incorporated by reference as if fully set forth herein, under 35 U.S.C. § 119(e).

BACKGROUND

Conventional packages are available for temporary storage of condiments, snacks, or personal products. For example, plastic containers (e.g. Tupperware®) are available in which such products can be temporarily stored. Additionally, conventional bags (e.g. Ziploc®) are available in which such products can be temporarily stored.

SUMMARY

Techniques are provided for sealing a plastic enclosure that can be used to transport a range of products including condiments, snacks or personal products. The inventor noted that the conventional heat sealers feature a single heating element on a top and bottom element of the sealer which seal a relatively wide seal. The inventor of the present invention recognized that these conventional heat sealers have drawbacks, including that the wide single heating element consumes a relatively large amount of power. Additionally, the inventor of the present invention recognized that the relatively wide seal formed by such heat sealers provides a single seal and thus does not provide a backup seal in the event of the single seal not properly forming. Thus, the inventor of the present invention developed an improved system for sealing a plastic enclosure with spaced apart heating elements on an inner surface of the system, so to create spaced apart seals. This advantageously provides a backup seal in the event of the primary seal not being formed. Also, this advantageously provides a means for the user to visually verify whether the primary seal formed, i.e. whether the contents of the enclosure move into a spacing between the two seals. Also, the improved system provides spaced apart seals with spacing therebetween which allows the user sufficient space to manually cut between the seals without accidentally cutting into one of the sealed enclosures. Additionally, in one embodiment, the improved system operates as an impulse sealer and thus the heating elements increase in temperature when the pair of elements are closed, which enhances the safety of the system.

The inventor also noted that conventional heat sealers include vacuum sealing, e.g. table top sealers. However, the inventor recognized that these conventional table top sealers are inherently seal enclosures in a horizontal orientation and thus are inherently limited based on the contents and/or orientation of the plastic enclosure. For example, the inventor of the present invention recognized that such conventional heat sealers are ineffective at vacuum sealing plastic enclosures with liquid contents. Also, the inventor of the present invention recognized that such conventional sealers are not portable and hand held and thus cannot be used to efficiently form vacuum seals in a manner that would be capable with a portable or hand held sealer. In an example, the inventor of the present invention recognized that it would be advantageous to develop a hand held system that can be used to form a heat and vacuum seal of an enclosure of plastic material. In particular, the inventor of the present invention recognized that it would be advantageous to develop such a system to form a heat and vacuum seal for plastic enclosures that contain liquid contents at room temperature.

In a first embodiment, an apparatus is provided for sealing an enclosure of plastic material. The apparatus includes a pair of elements pivotally coupled together at a first end of the elements. The apparatus further includes a pair of spaced apart heating elements positioned along an inner surface of at least one element and connected to a power source, where a longitudinal axis of the heating elements is oriented parallel to a longitudinal axis of the element. Upon positioning plastic material including a first plastic layer and a second plastic layer at an interface between the pair of second elements, the pair of spaced apart heating elements melt the plastic material and form a seal between the first plastic layer and the second plastic layer.

In a second embodiment, an apparatus is provided for sealing an enclosure of plastic material. The apparatus includes a pair of elements pivotally coupled together at a first end of the elements. The apparatus further includes a pair of spaced apart heating elements positioned along an inner surface of one element and connected to a power source. The apparatus further includes a cutting element positioned at an inner surface of one element and is configured to move relative to the inner surface of the element to cut the plastic material along the interface adjacent the seal. Upon positioning plastic material including a first plastic layer and a second plastic layer at the interface between the elements, the pair of spaced apart heating elements are configured to melt the plastic material and form a pair of spaced apart seals between the first plastic layer and the second plastic layer.

In a third embodiment, a method is provided for sealing an enclosure of plastic material. The method includes positioning the plastic material including a first plastic layer and a second plastic layer at an interface between the pair of elements. The method further includes pivoting the pair of elements from an open position to a closed position such that the pair of spaced apart heating elements increase a temperature at the interface to melt the first plastic layer and the second plastic layer. The method further includes forming a pair of spaced apart first seals between the first plastic layer and the second plastic layer based on the melting of the first plastic layer and the second plastic layer. The method further includes filling the enclosure of the plastic material with contents through an opening in the plastic material and positioning the plastic material including the first plastic layer and the second plastic layer at the interface. The method further includes pivoting the pair of elements from the open position to the closed position such that the heating elements increase the temperature at the interface to melt the first plastic layer and the second plastic layer. The method further includes forming a pair of spaced apart second seals between the first plastic layer and the second plastic layer based on the melting of the first plastic layer and the second plastic layer, where the enclosure of plastic material is formed between the first seal and the second seal.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIGS. 11H-11M are images that illustrate an example of various views of the system of FIG. 11A being used to seal contents within an enclosure, according to an embodiment;

FIGS. 12A-12L are images that illustrate an example of various views of a system for sealing an enclosure of plastic material, according to an embodiment;

FIGS. 13A-13H are images that illustrate an example of various views of a system for sealing an enclosure of plastic material, according to an embodiment;

FIGS. 13I-13N are images that illustrate an example of various views of the system of FIG. 13A being used to seal contents within an enclosure, according to an embodiment;

DETAILED DESCRIPTION

Figure 1A:
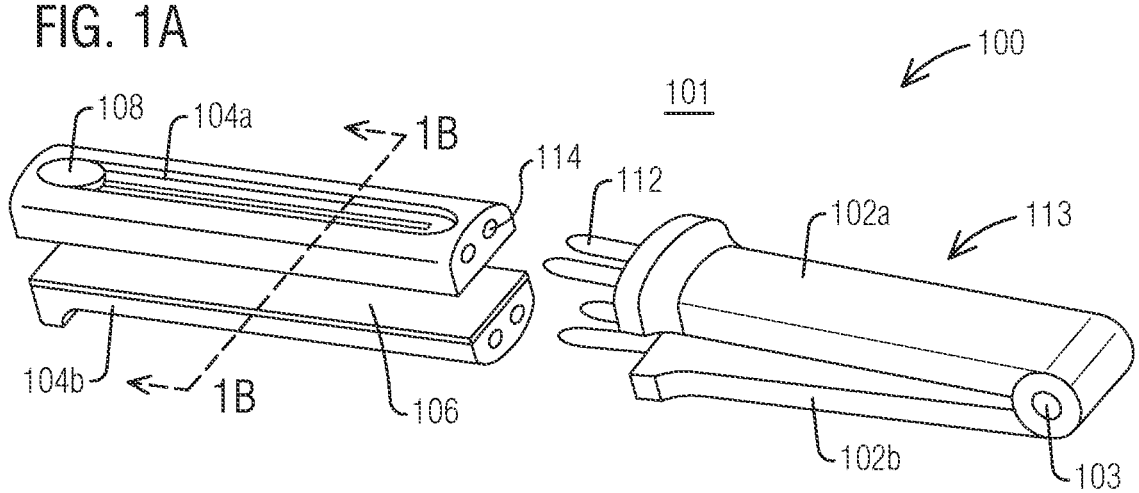
FIG. 1A is an image that illustrates an example of a perspective view of a system for sealing an enclosure of plastic material in an open position, according to an embodiment.

A method and apparatus are described for sealing an enclosure of plastic material. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4. Additionally, the term "orthogonal" is used to indicate an angle between two directions in a range of 90 degrees±10 degrees or in a range of 90 degrees±20 degrees. Additionally, the term "parallel" is used to indicate an angle between two directions in a range of 0 degrees±10 degrees or in a range of 0 degrees±20 degrees.

Some embodiments of the invention are described below in the context of sealing an enclosure of plastic material. For purposes of this description, "enclosure" means an enclosed volume (e.g. rectangular volume) defined by plastic material. In other embodiments, "enclosure" means an enclosed volume defined by a non-plastic material, such as plastic and mylar materials. In some embodiments, the enclosure is defined by one or more seals in the plastic material, where the seals are formed between layers of the plastic material and define one or more boundaries of the enclosure. In some embodiments, the enclosure is a plastic bag defined by one or more seals in plastic material that includes a first plastic layer and a second plastic layer. In other embodiments, the enclosure is defined as a sub-enclosure or sub-volume within a larger enclosure, e.g. an interior volume or sub-enclosure within a plastic bag formed between two interior seals or between an interior seal and a seal at one end or side of the bag. In other embodiments, the enclosure is a capsule defined by one or more seals in plastic material that is a straw, e.g. plastic straw. However, the invention is not limited to this context. For purposes of this description, "plastic material" means material made of plastic that includes multiple layers. In some embodiments, the plastic material includes a first plastic layer and a second plastic layer that are sealed along opposite sides. In other embodiments, the plastic material is a plastic straw. For purposes of this description, "portable" means a device that can be carried by a person, such as in a standard handbag and/or a device that can be operated while being carried by a person. In some embodiments, "portable" means that the device can be used to perform each step of a method to seal a plastic enclosure while being carried by a person. In some embodiments, "portable" means that the device has a largest dimension (e.g. length, width, height) no greater than from about 6 inches to about 12 inches. In other embodiments, "portable" means that the device has a largest dimension (e.g. length, width, height) no greater than from about 4 inches to about 14 inches. In other embodiments, "portable" means that the device has a weight no greater than about 8 ounces to about 12 ounces. In still other embodiments, "portable" means that the device has a weight no greater than about 4 ounces to about 14 ounces.

FIG. 1A is an image that illustrates an example of a perspective view of a system 100 for sealing an enclosure of plastic material in an open position 101, according to an embodiment. In some embodiments, the system 100 is portable. In one embodiment, the system 100 is portable such that it can be carried in a handbag (e.g. woman's handbag). The system 100 includes a handle 113 with a pair of first elements 102a, 102b that are pivotally coupled at one end of the elements 102a, 102b. In one embodiment, the first elements 102a, 102b are pivotally coupled together at a hinge 103. In one embodiment, the first elements 102a, 102b are made of a plastic material. In another embodiment, the first elements 102a, 102b are made of a heat resistant or insulating substrate material (e.g. ceramic, silicone, silicone rubber, etc.).

Figure 1B:
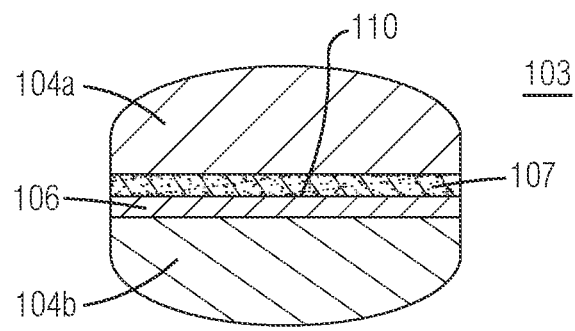
FIG. 1B is an image that illustrates an example of a cross sectional view taken along the line 1B-1B in FIG. 1A, according to an embodiment.
Figure 1C:
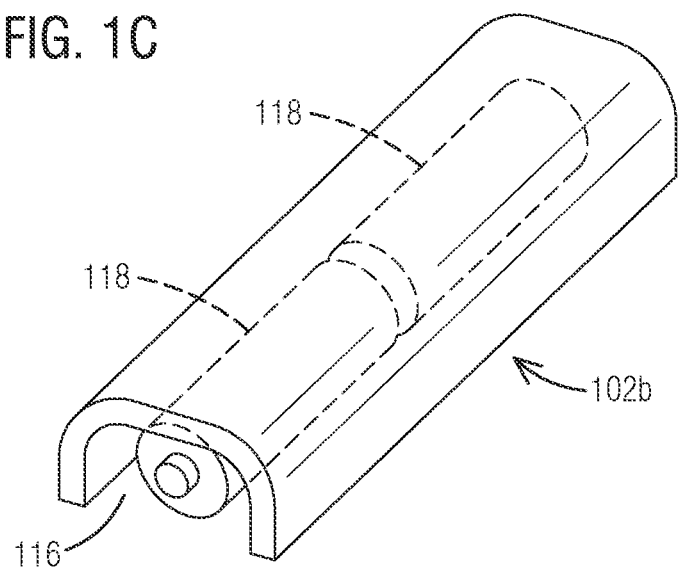
FIG. 1C is an image that illustrates an example of a sectional view of a first element of the system of FIG. 1A, according to an embodiment.
Figure 1D:
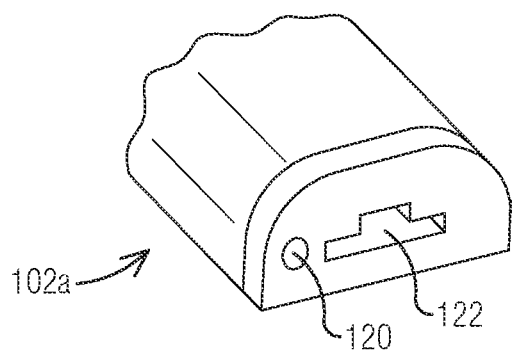
FIG. 1D is an image that illustrates an example of a perspective end view of a first element of the system of FIG. 1A, according to an embodiment.
Figure 1E:
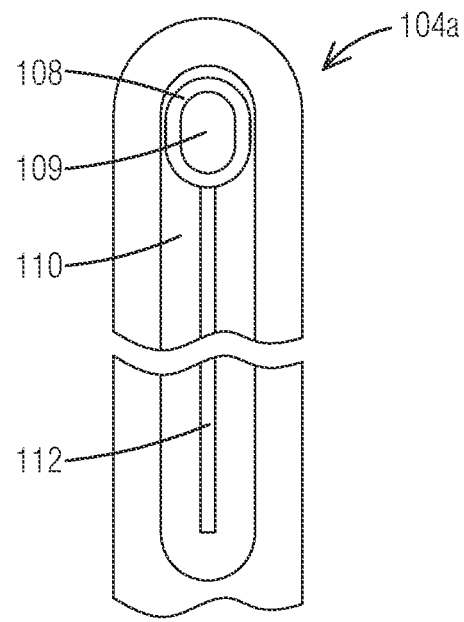
FIG. 1E is an image that illustrates an example of a top view of a second element of the system of FIG. 1A, according to an embodiment.
Figure 1F:
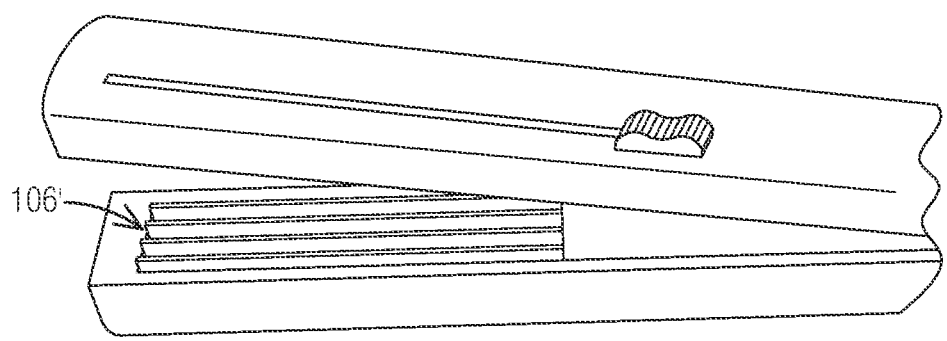
FIG. 1F is an image that illustrates an example of a perspective view of a system for sealing an enclosure of plastic material in an open position, according to an embodiment.
Figure 1G:
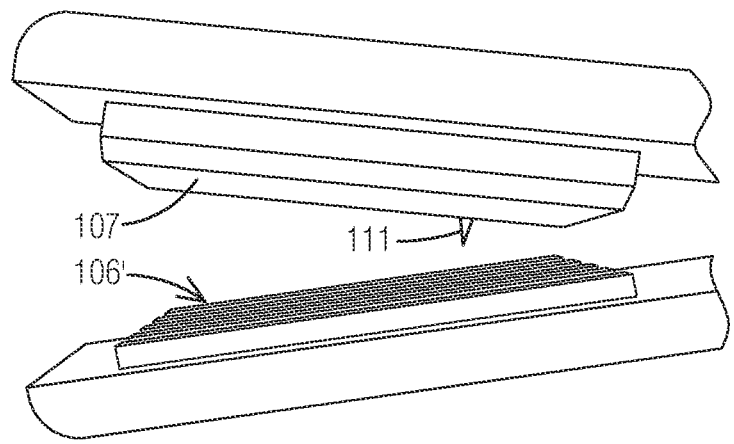
FIG. 1G is an image that illustrates an example of a side view of the second elements of the system of FIG. 1F, according to an embodiment.
Figure 1H:
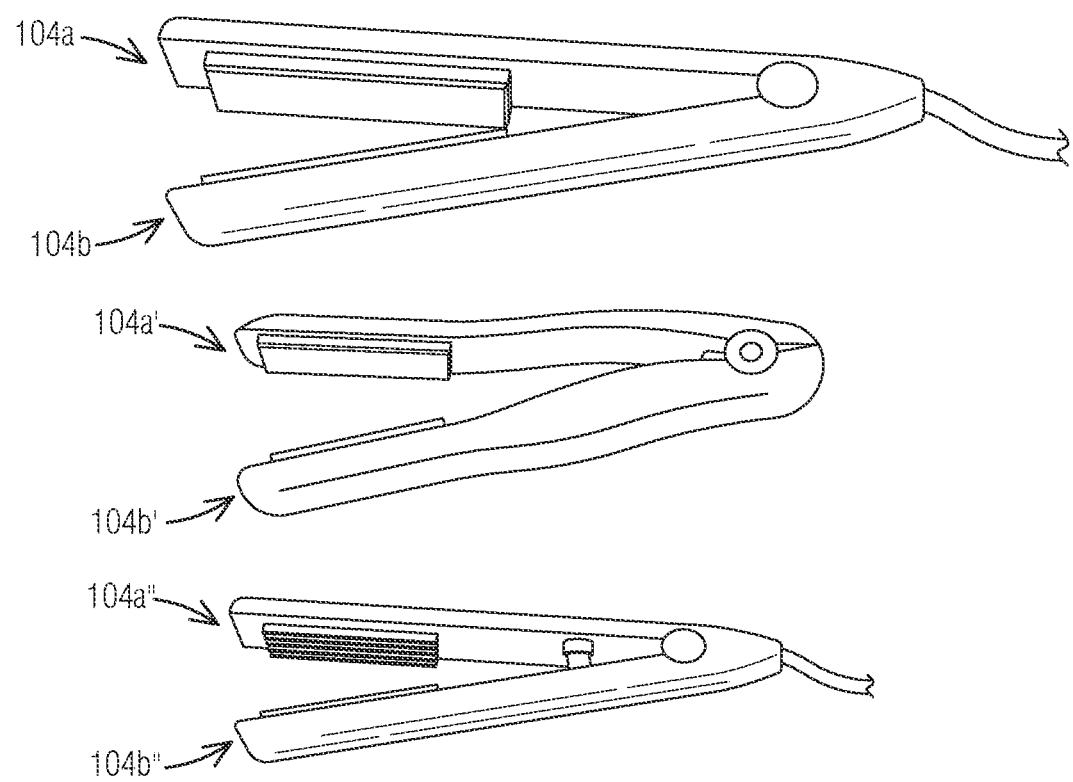
FIG. 1H is an image that illustrates an example of a perspective view of pairs of second elements of different dimension, according to an embodiment.
Figure 2A:
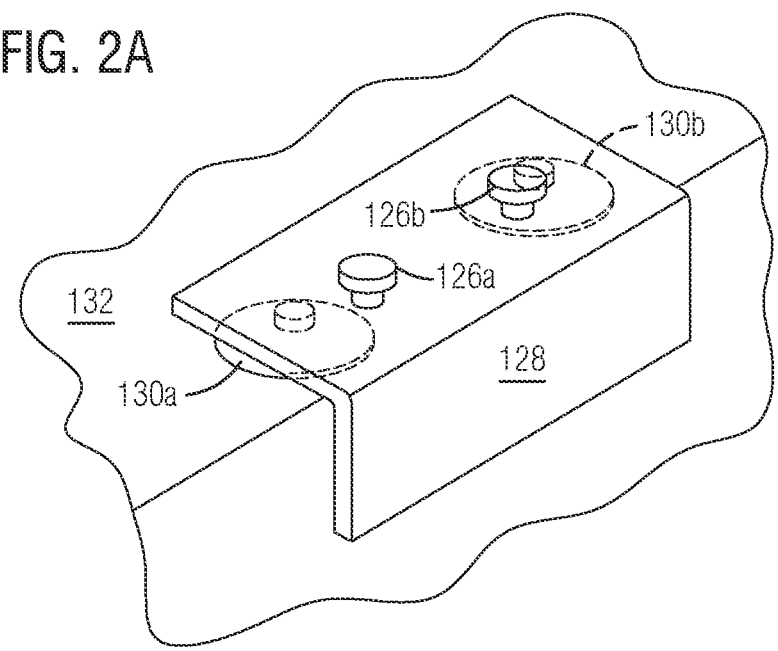
FIG. 2A is an image that illustrates an example of a perspective view of a bracket mounted to a flat surface, according to an embodiment.
Figure 2B:
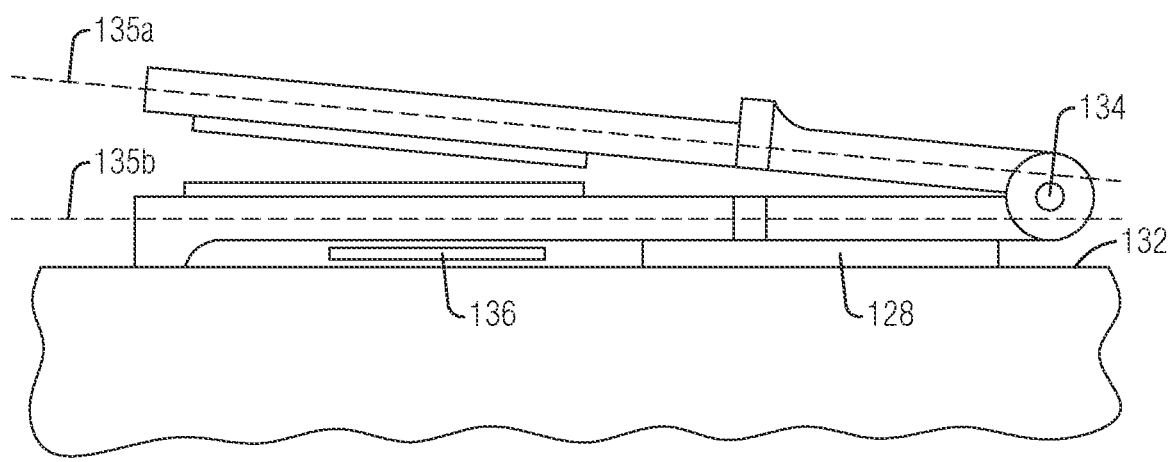
FIG. 2B is an image that illustrates an example of a side view of the system of FIG. 1A mounted to the bracket of FIG. 2A, according to an embodiment.

The system 100 also includes a pair of second elements 104a, 104b that are removably coupled to a second end of the first elements 102a, 102b so that the second elements 104a, 104b are coextensive with the first elements 102a, 102b as depicted in FIG. 2B. In some embodiments, the second elements 104a, 104b are made from the same material as the first elements 102a, 102b. In one embodiment, the first elements 102a, 102b and second elements 104a, 104b are integrally connected as one pair of elements pivotally coupled at the hinge 103. FIG. 1H is an image that illustrates an example of a perspective view of pairs of second elements 104 of different dimension, according to an embodiment. In some embodiments, the pair of second elements 104a, 104b have a larger dimension that is used to seal plastic material 136 having a larger dimension (e.g. 6" wide bag), the pair of second elements 104a', 104b' have a medium dimension that is used to seal plastic material 136 having a medium dimension (e.g. 3" wide bag) and the pair of second elements 104a", 104b" have a small dimension that is used to seal plastic material 136 having a small dimension (e.g. straw).

In some embodiments, a heating element 106 is positioned along an inner surface of one of the second elements 104a, 104b. In this embodiment, a sponge material 107 (FIG. 2E) is positioned along an inner surface of the other second element 104a. In an example embodiment, the sponge material 107 is a sponge-like material (e.g. silicone) that is heat resistant. In other embodiments, the heating element 106 is positioned along the inner surface of both second elements 104a, 104b. In some embodiments, the heating element 106 has a flat planar surface. In other embodiments, the heating element has a crimping surface including one or more ridges. In an embodiment, the ridges of the crimping surface form a plurality of sealing interfaces in the plastic material 136 over the seal. FIG. 1F is an image that illustrates an example of a heating element 106' including a crimping surface with a plurality of ridges. In some embodiments, the crimping surface is made from a ceramic coated material. FIG. 1G is an image that illustrates an example of a side view of the second elements 104 of the system of FIG. 1F, according to an embodiment. The sponge material 107 and cutting element 111 are also depicted in FIG. 1G.

The heating element 106 is connected to a power source. In some embodiments, the pair of first elements 102 a, 102 b include a first connector 142 that is electrically connected to a power source and the pair of second elements 104 a, 104 b include a second connector 114 electrically connected to the heating element 106. In an example embodiment, the first connector 142 is a male connector and the second connector 114 is a female connector. In other embodiments, the first connector 142 is a female connector and the second connector 114 is a male connector. In still other embodiments, connectors 142, 114 other than male/female connectors can be used to electrically connect the elements 102 a, 102 b with the elements 104 a, 104 b. Upon connection of the first connector 142 with the second connector 114, the heating element 116 is electrically connected with the power source.

In some embodiments, the power source is an internal power source housed within the system 100. In one embodiment, the internal power source is housed within one of the first elements 102a, 102b. FIG. 1C is an image that illustrates an example of a sectional view of the first element 102b of the system 100 of FIG. 1A, according to an embodiment. In one embodiment, the first element 102b includes a compartment 116 to house a power source (e.g. one or more batteries 118). In an example embodiment, two AA rated batteries 118 are housed in the compartment 116. In other embodiments, the power source is an external power source and one of the first elements 102a, 102b is connected to the external power source. FIG. 1D is an image that illustrates an example of a perspective end view of the first element 102a of the system 100 of FIG. 1A, according to an embodiment. In one embodiment, the first element 102a includes an electrical inlet (e.g. USB port 122) for connection to an external power source. In other embodiments, the USB port 122 is used to charge the internal power source (e.g. batteries 118) while the internal power source (or external power source) provides serves as the power source for the heating element 106.

The system 100 also includes a cutting element 111 positioned along an inner surface of the second element 104a. FIG. 1E is an image that illustrates an example of a top view of the second element 104a of the system of FIG. 1A, according to an embodiment. In some embodiments, the second element 104a includes a slot 112 to slidably receive the cutting element. In these embodiments, an outer surface of the second element 104a includes a button 108 (with an optional button recess 109) slidably received in a recess 110, where the button 108 is connected to the cutting element 111 through the slot 112. In other embodiments, the recess 110 is not provided and the button 108 is configured to slide along the outer surface of the second element 104a. The cutting element 111 slides along the inner surface of the second element 104a when a user slides the button 108 along the recess 110.

During operation of the system 100, the first elements 102a, 102b are initially positioned in an open position 101 (FIG. 1A) with an angle between the first elements 102a, 102b. In some embodiments, the open position 101 is the default position of the first elements 102a, 102b such that the first elements 102a, 102b are in the open position 101 when no external force is applied. FIG. 2B is an image that illustrates an example of a side view of the system 100 of FIG. 1A in the open position 101. In some embodiments, the first element 102a and second element 104a are coextensive such that they share a common longitudinal axis 135a and the first element 102b and second element 104b are coextensive such that they share a common longitudinal axis 135b. Additionally, in other embodiments, a rotational axis 134 (orthogonal to the plane of FIG. 2B) of the first elements 102a, 102b is about perpendicular to the longitudinal axes 135a, 135b.

Figure 2C:
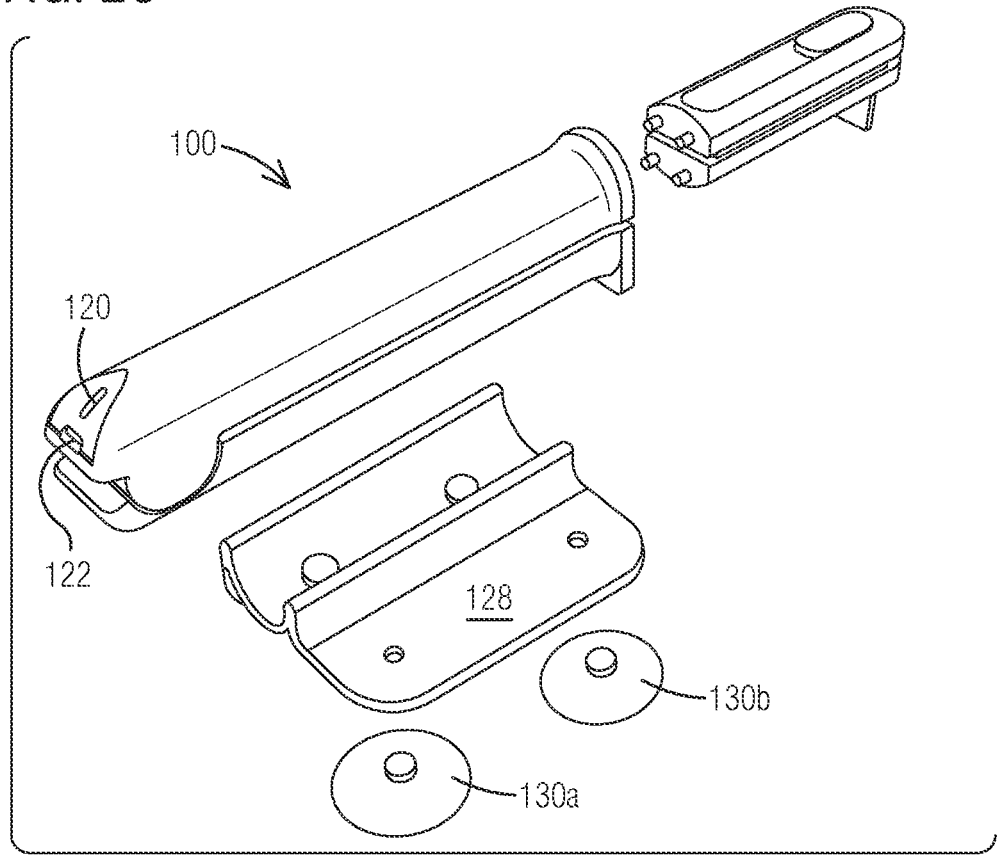
FIG. 2C is an image that illustrates an example of an exploded view of the system of FIG. 1A and the bracket of FIG. 2A, according to an embodiment.
Figure 2D:
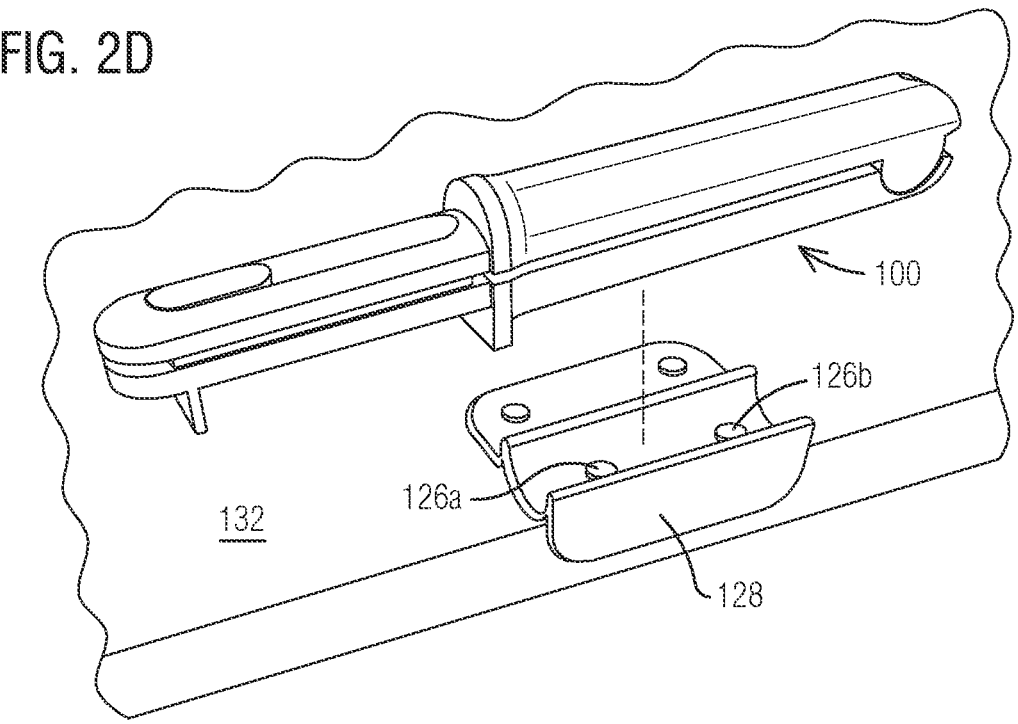
FIG. 2D is an image that illustrates an example of a perspective view of the system of FIG. 1A and the bracket of FIG. 2A mounted to a flat surface, according to an embodiment.
Figure 2E:
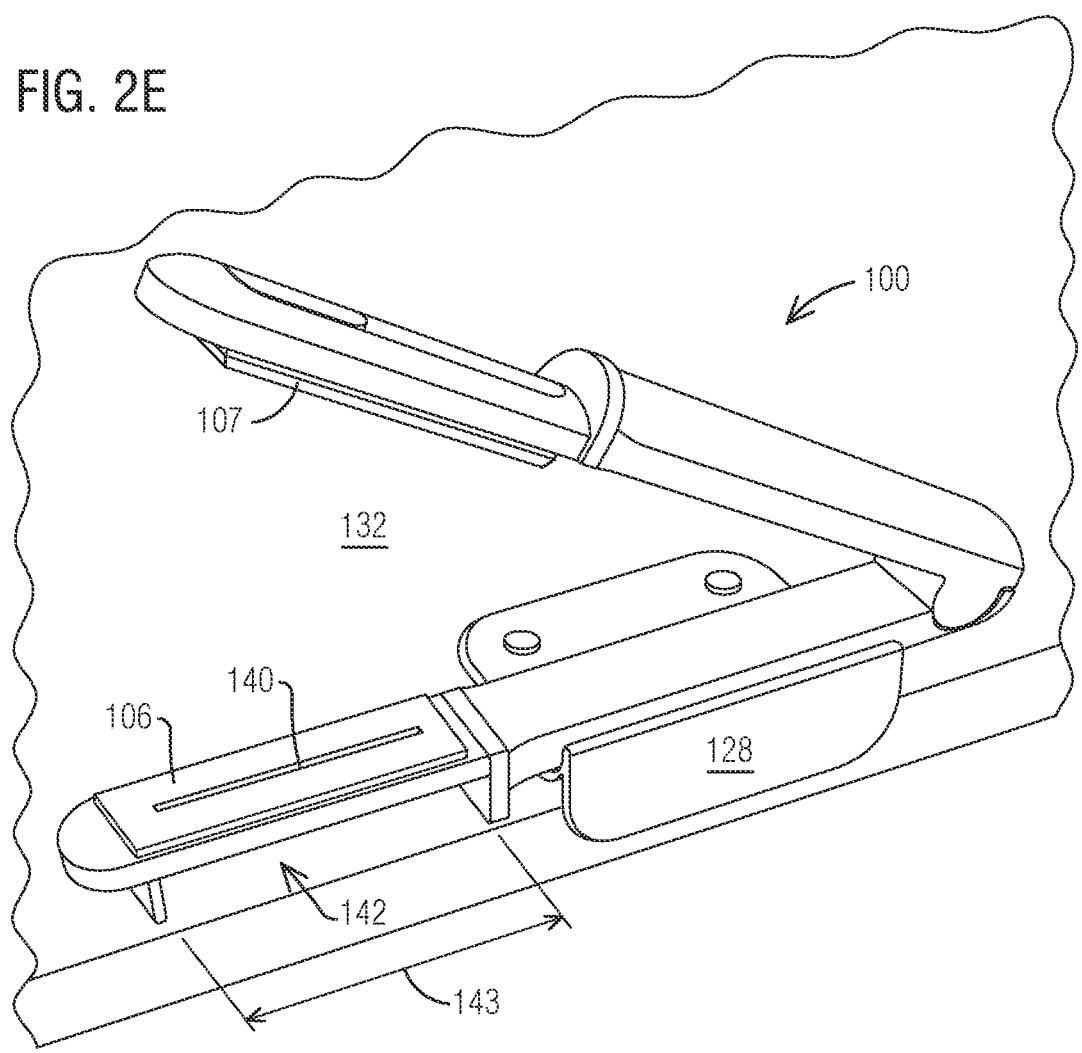
FIG. 2E is an image that illustrates an example of a perspective view of the system of FIG. 1A mounted to the bracket of FIG. 2A in the open position, according to an embodiment.

Plastic material including a first plastic layer and second plastic layer is initially positioned at an interface between the second elements 104a, 104b. In some embodiments, the plastic material is positioned between the heat element 106 and the sponge material 107. The pair of first elements 102a, 102b are then pivoted about the hinge 103 to move the system 100 from the open position 101 (FIG. 1A) to a closed position 103 (FIG. 1B). To facilitate moving the system from the open position 101 to the closed position 103, in some embodiments the heating element 106 includes a slot 140 (FIG. 2E) to slidably receive the cutting element on the inner surface of the second element 104a. In some embodiments, in the closed position 103 the heating element 106 moves within a threshold distance of the sponge material 107. Although FIG. 2E depicts the slot 140 provided along the heating element 106, in other embodiments the slot 140 is spaced apart from the heating element 106 along the inner surface of the element 104a.

In some embodiments, the system 100 is held in a hand of the user (e.g. hands-on operation). In other embodiments, the system 100 is used without being held by the user (e.g. hands-free operation). In these embodiments, the system 100 is mounted to a bracket 128 and the bracket 128 is mounted to a flat surface (e.g. counter). FIG. 2A is an image that illustrates an example of a perspective view of a bracket 128 mounted to a level surface (e.g. counter 132), according to an embodiment. The bracket 128 is mounted to the counter 132. In one embodiment, the bracket 128 is mounted to the counter 132 with a pair of suction cups 130a, 130b. Each suction cup 130 includes a base portion that is secured to the counter 132 and a nipple portion that is received with a respective opening in the bracket 128 (FIGS. 2C-2D). The bracket 128 includes a pair of mating keys 126a, 126b (FIG. 2A) and the first element 102b includes a pair of key holes that are sized to slidably receive the mating keys 126a, 126b into a locked position to securely mount the first elements 102a, 102b to the bracket 128. FIG. 2B depicts the first elements 102a, 102b and second elements 104a, 104b securely mounted to the bracket 128 and the bracket 128 securely mounted to the counter 132.

Figure 5A:
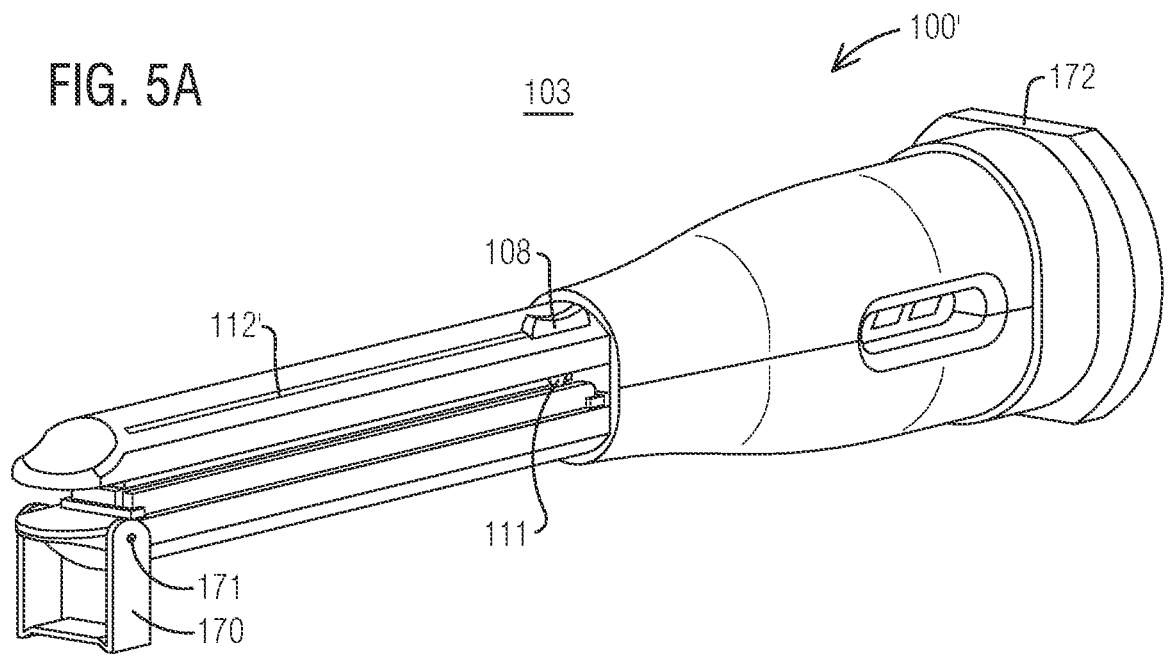
FIG. 5A is an image that illustrates an example of a perspective view of a system for sealing an enclosure of plastic material in a closed position, according to an embodiment.
Figure 5B:
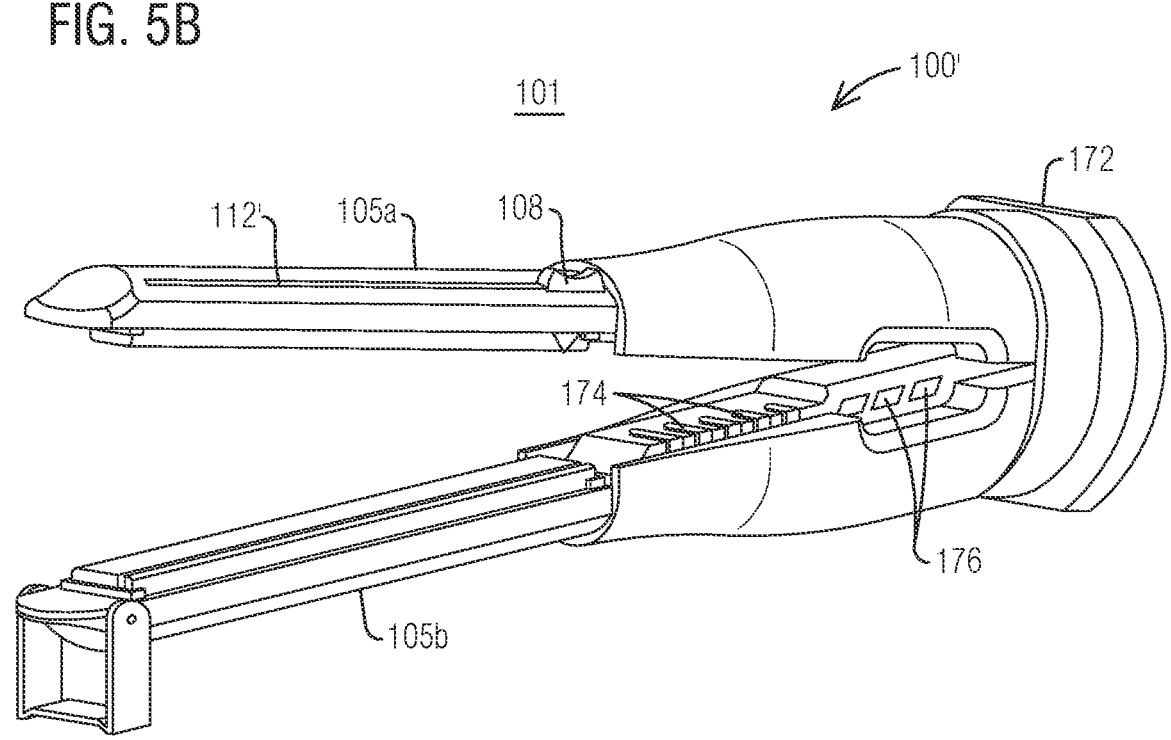
FIG. 5B is an image that illustrates an example of a perspective view of the system of FIG. 5A in an open position, according to an embodiment.
Figure 5C:
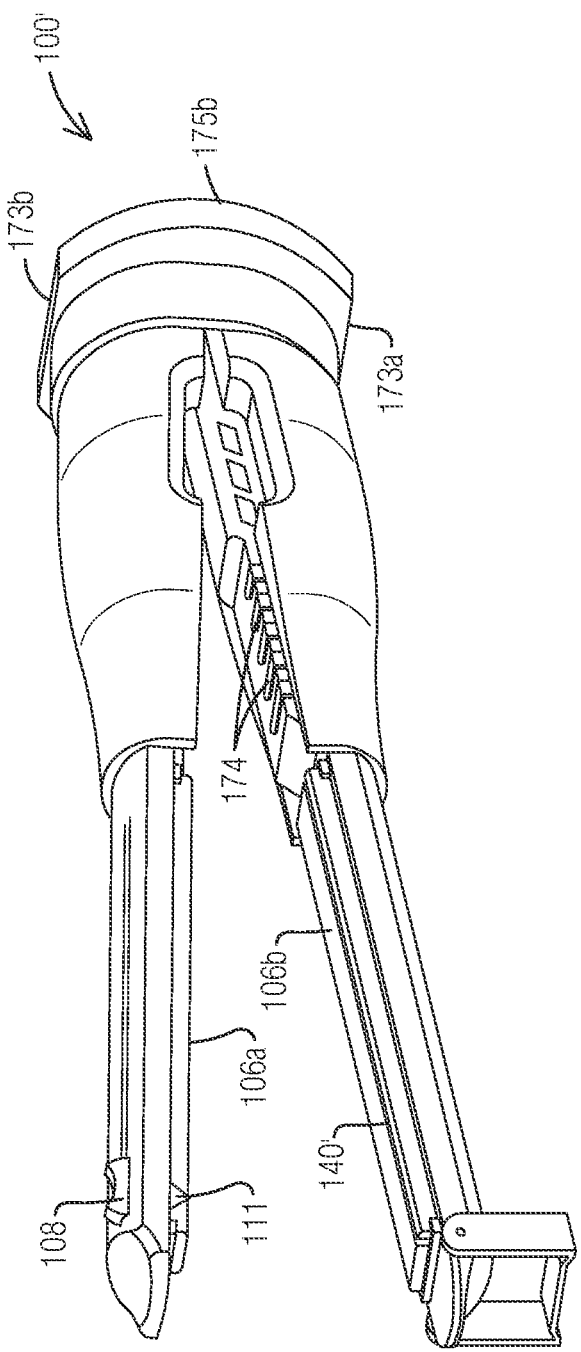
FIG. 5C is an image that illustrates an example of a perspective view of the system of FIG. 5B with the cutting element slid from a first end to a second end of a slot in one of the elements, according to an embodiment.

FIGS. 5A-5G are images that illustrate an example of different views of a system 100' for sealing an enclosure of plastic material, according to an embodiment. The system 100' is similar to the system 100 previously discussed, with the exception of the features discussed herein. Unlike the system 100 with a pair of first elements 102 and a pair of second elements 104 connected to the pair of first elements 102 using connectors 142, 114, the system 100' includes one pair of elements 105 a, 105 b. In an embodiment, the element 105 a integrates the element 102 a and 104 a and the element 105 b integrates the element 102 b and 104 b. Additionally, unlike the system 100 where the slot 142 and button 108 are arranged near a center of a width of the second element 104 a (FIG. 1E), in one embodiment the system 100' features a slot 142' and button 108 that are offset by a spacing 188 (FIG. 6D) from a center 189 of a width of the element 105 a. Thus, the cutting element 111 (positioned in the slot 142') is offset by the spacing 188 from the center 189 of the width of the element 105 a. In an embodiment, the spacing 188 is about ⅛" or in a range from about ¹⁄₁₆" to about ¼" or in a range from about ¹⁄₃₂" to about ½" or in a range from about ¹⁄₆₄" to about 1". In other embodiments, the slot 142' and button 108 are centered along the center 189 of the width of the element 105 a.

In an embodiment, the system 100' includes a U-shaped member 170 that is rotatably fixed to the element 105b about a pivot axis 171. In one embodiment, the U-shaped member 170 is fixed to the element 105b adjacent a second end 177b of the element 105b and can rotate from a first position (FIG. 8F) to clasp the elements 105a, 105b together when they are in the closed position 103 to a second position (FIG. 5D) to support a second end 177b of the elements 105 on a level surface 180 (e.g. table) when the system 100' is placed on the level surface 180.

In another embodiment, the system 100' includes a base 172 adjacent to a first end 177a of the elements 105 that is opposite from the second end 177*b*. In an embodiment, the base 172 has an outer diameter 178 (FIG. 5D) that is greater than an outer diameter of the elements 105 between the first and second ends 177*a*, 177*b*. Additionally, in an embodiment, the base 172 includes a pair of flat surfaces 173*a*, 173*b* that are spaced apart by a width dimension (e.g. outer diameter 178) and a pair of arcuate surfaces 175*a*, 175*b* that are spaced apart by a length dimension that is greater than the width dimension. In an example embodiment, the width dimension is about 2" or in a range from about 1" to about 3" and the length dimension is about 2.5" or in a range from about 1.5" to about 2.5". In some embodiments, the length dimension is about the same as the width dimension. In an example embodiment, a height of the U-shaped member 170 is sized based on a difference between the outer diameter 178 of the base 172 and the outer diameter of the member 105*b* at the pivot axis 171. In another embodiment, one or more dimensions (e.g. outer diameter 178) of the base 172 are sized so that the system 100' can be vertically mounted on the level surface 180 and the system 100' is relatively stable in the vertical orientation. In some embodiments, a length of the system 100' (e.g. length between the ends 177*a*, 177*b*) is about 11.5" or in a range from about 9.5" to about 13.5". In other embodiments, a length of the heating elements 106*a*, 106*b* is about 6.5" or in a range from about 4.5" to about 8.5". In still other embodiments, a length of the slots 112', 140' are about 6.5" or in a range from about 4.5" to about 8.5".

In an embodiment, the system 100' features one or more heat settings 174 to adjust a temperature of the heating elements 106*a*, 106*b* and/or one or more electrical inlets 176 (e.g. USB port). The heat settings 174 and/or the electrical inlets 176 are advantageously positioned along a side of the system 100' so to be accessible when the system 100' is mounted on the base 172 in a vertical orientation on the level surface 180.

Figure 5D:
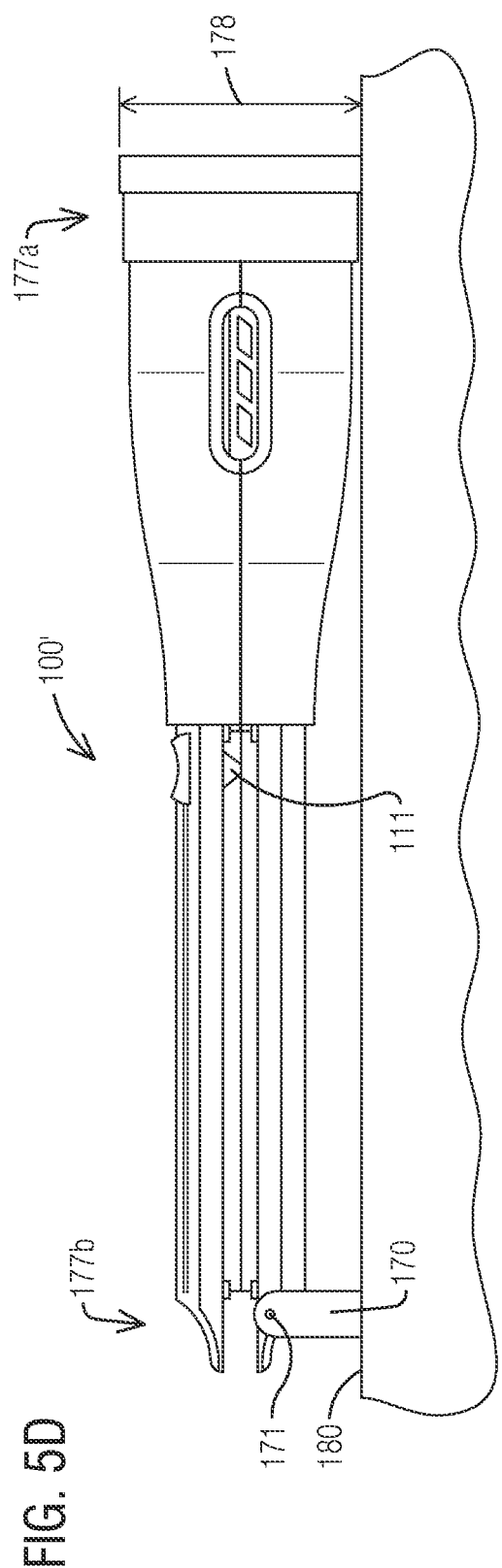
FIG. 5D is an image that illustrates an example of a side view of the system of FIG. 5A on a level surface, according to an embodiment.
Figure 6A:
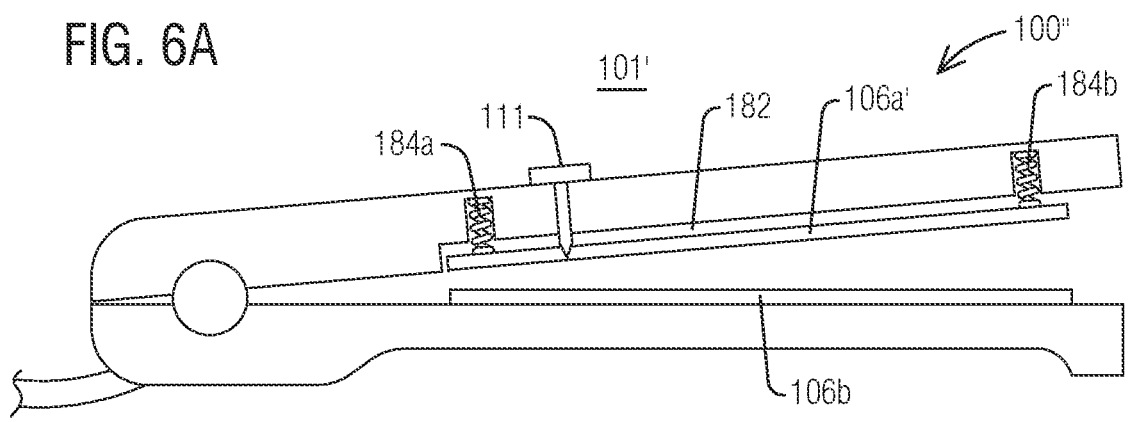
FIG. 6A is an image that illustrates an example of a side view of a system for sealing an enclosure of plastic material in an open position, according to an embodiment.
Figure 6B:
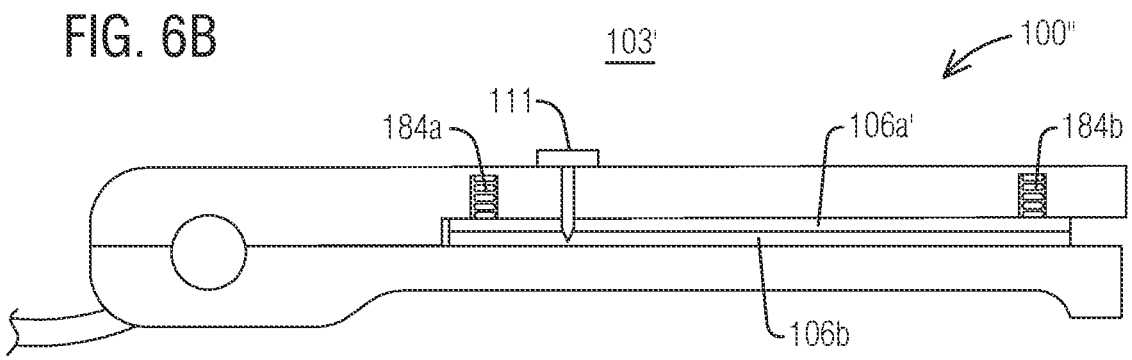
FIG. 6B is an image that illustrates an example of a side view of the system of FIG. 6A in a closed position, according to an embodiment.

As depicted in FIG. 5D, one or more dimensions of the base 172 (e.g. outer diameter 178) and one or more dimensions of the U-shaped member 170 (e.g. height) are sized so that the pair of elements 105 are supported on the level surface 180 in the closed position 101 such that the pair of elements 105 are about parallel to the level surface 180.

Figure 5E:
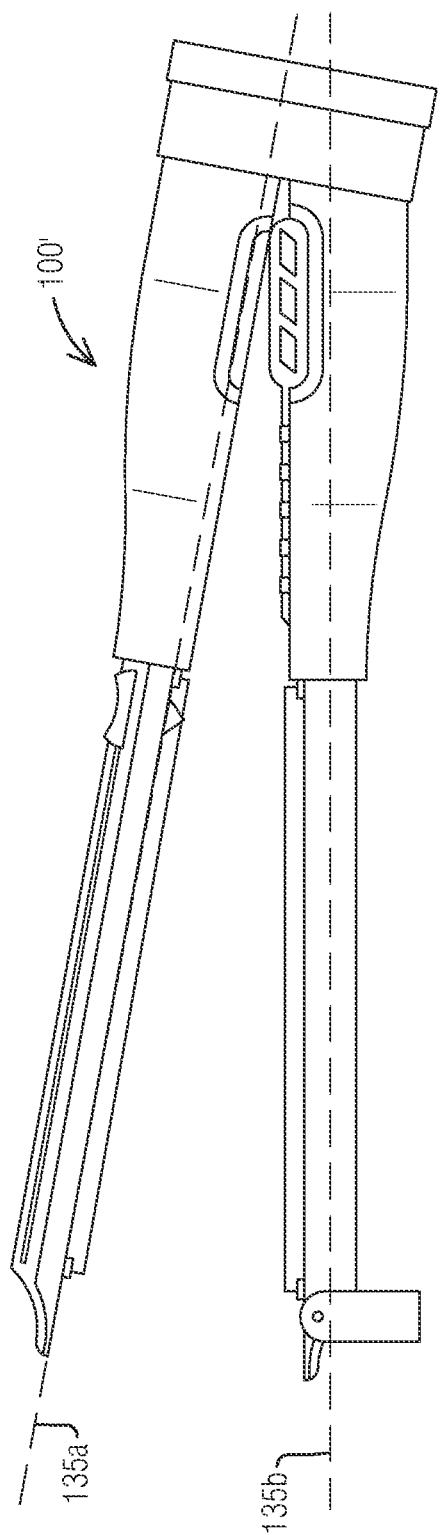
FIG. 5E is an image that illustrates an example of a side view of the system of FIG. 5A in an open position, according to an embodiment.
Figure 5F:
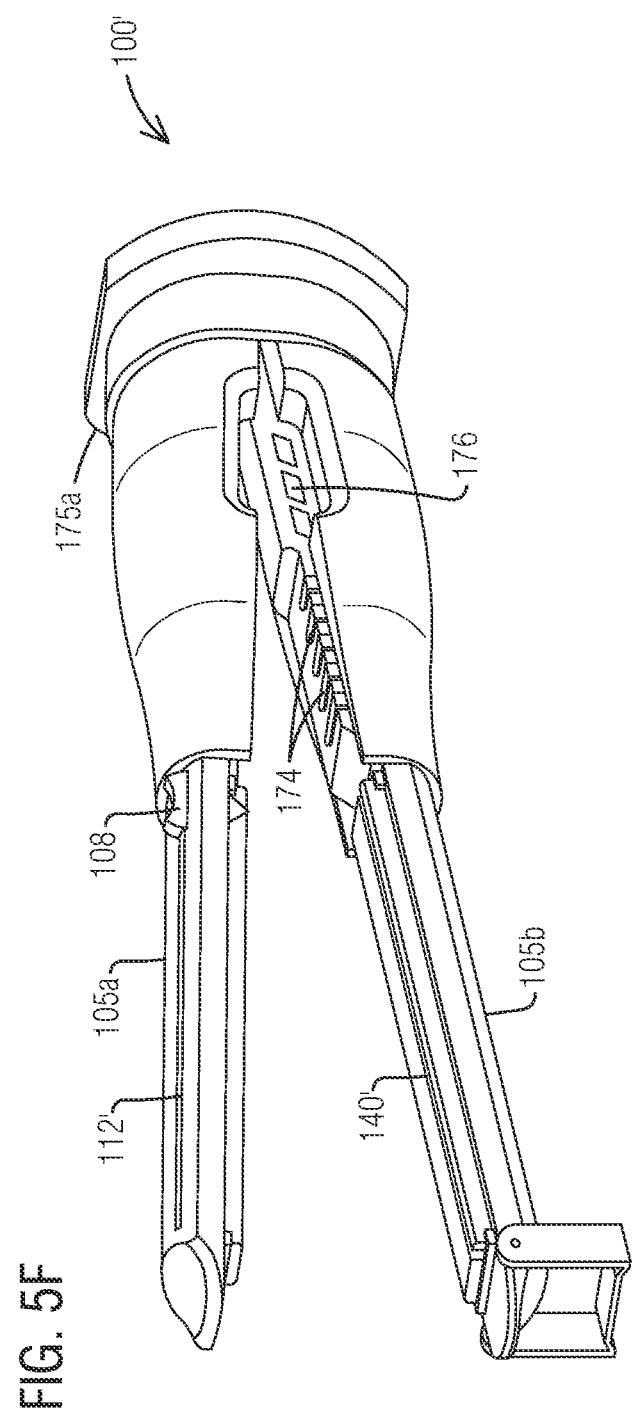
FIG. 5F is an image that illustrates an example of a top perspective view of the system of FIG. 5A in an open position, according to an embodiment.
Figure 5G:
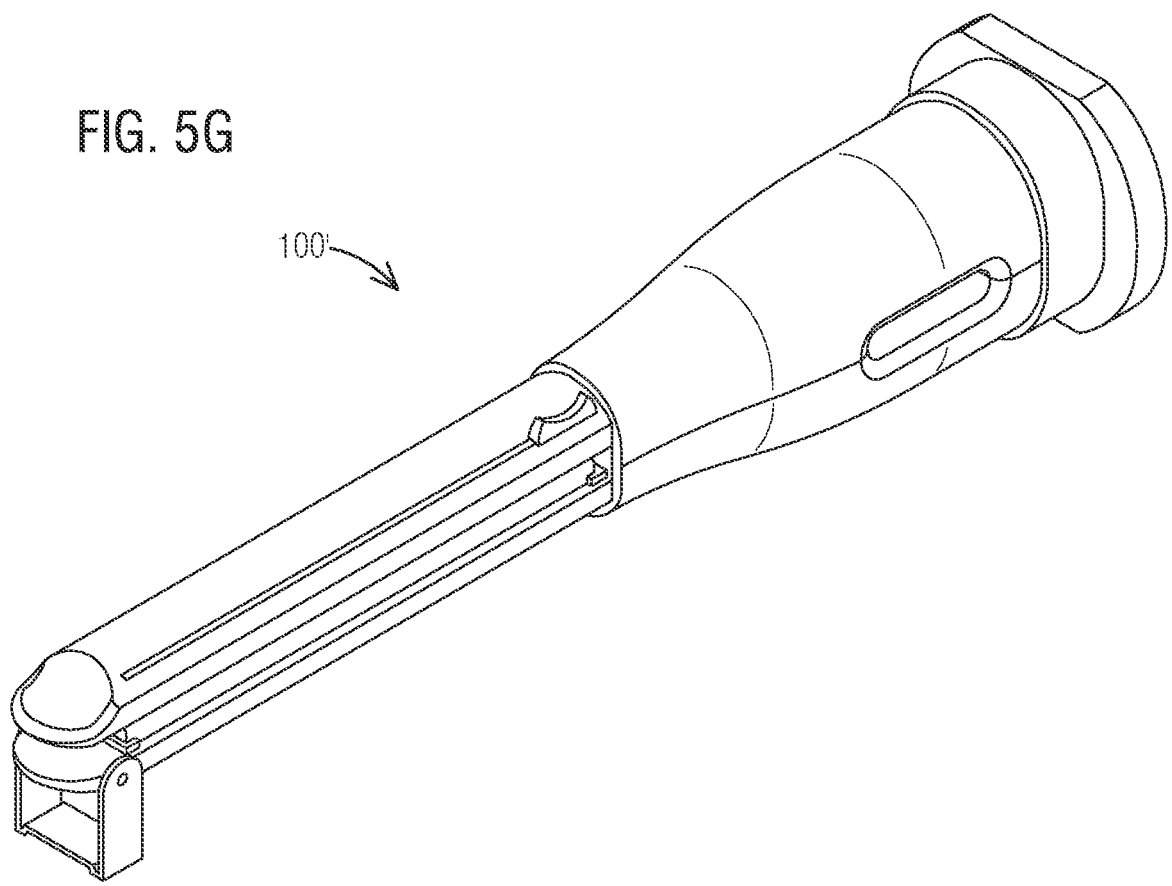
FIG. 5G is an image that illustrates an example of a top perspective view of the system of FIG. 5A in a closed position, according to an embodiment.

As depicted in FIG. 5C, in one embodiment a plurality of heating elements 106*a*, 106*b* are provided along the inner surface of the respective elements 105*a*, 105*b*. In one embodiment, the heating elements 106*a*, 106*b* include longitudinal axes that are oriented parallel to the longitudinal axes 135*a*, 135*b* of the respective elements 105*a*, 105*b* (FIG. 5E). In an embodiment, "longitudinal axis" of the heating elements 106*a*, 106*b* is defined as an axis aligned with a length dimension (e.g. length 143 in FIG. 2E for heating element 106) and orthogonal to a width dimension that is smaller than the length dimension of the heating elements 106*a*, 106*b*. In some embodiments, only one heating element 106 is provided along the inner surface of only one of the elements 105. In other embodiments, multiple heating elements are provided along the inner surface of each element 105.

Figure 6C:
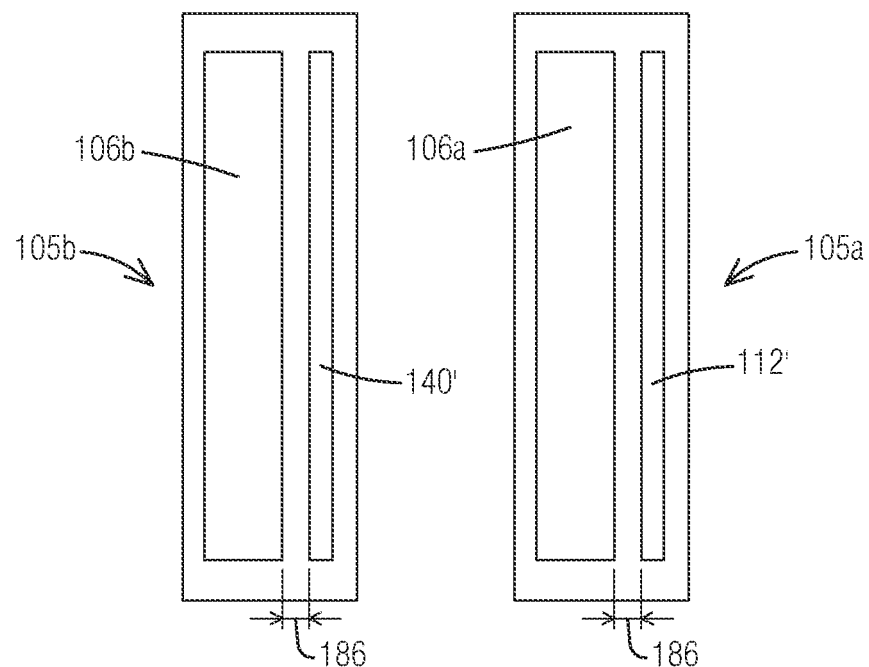
FIG. 6C is an image that illustrates an example of a plan view of an inner surface of the elements of the system of FIG. 6A, according to an embodiment.
Figure 6D:
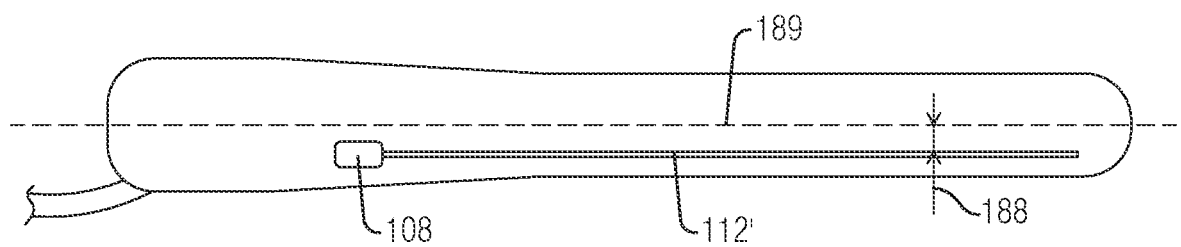
FIG. 6D is an image that illustrates an example of a top view of the system of FIG. 6A, according to an embodiment.

In one embodiment, the heating elements 106*a*, 106*b* have a width that is about the same as a width of the elements 105*a*, 105*b*. However, in other embodiments, the heating elements 106*a*, 106*b* have a width that is less than a width of the elements 105*a*, 105*b*. FIG. 6C is an image that illustrates an example of a plan view of an inner surface of the elements 105*a*, 105*b* of the system 100', according to an embodiment. In one embodiment, the slot 112' that slidably receives the cutting element 111 and button 108 in the element 105*a* is spaced apart from the heating element 106*a* by a minimum spacing 186 along the inner surface of the element 105*a*. Similarly, the slot 140' that slidably receives the cutting element 111 as it moves along the interface 110 is spaced apart from the heating element 106*b* by the minimum spacing 186 along the inner surface of the element 105*b*. In an example embodiment, the minimum spacing 186 is about ⅛" or in a range from about 1/16" to about ¼" or in a range from about 1/16" to about ½" or in a range from about 1/32" to about 1". Spatial separation of the slots 112', 140' and the heating elements 106*a*, 106*b* is adjusted to advantageously ensure that heat from the elements 106*a*, 106*b* does not melt the plastic material along a cut formed by the cutting element 111. Thus, the minimum spacing 186 ensures that a cut formed in the plastic material by the cutting element 111 is not resealed by heat from the heating element 106*a*, 106*b*. In order embodiments, a layer of heat insulation material or a silicone layer 185 (FIG. 8C) is positioned within the minimum spacing 186 to provide thermal insulation between the heating elements 106*a*, 106*b* and the cutting element 111, to further ensure that the heat from the elements 106*a*, 106*b* does not melt the cut formed in the plastic material by the cutting element 111. In some embodiments, a length of the slot 112' and/or slot 140' is equal to or greater than a length of the heating element 106*a* and/or heating element 106*b*. This advantageously ensures that a range of movement of the cutting element 111 (e.g. length of slots 112', 140') encompasses a maximum width of a seal formed at the interface (e.g. length of heating elements 106*a*, 106*b*).

In an embodiment, the cutting element 111 of the system 100' operates in a similar manner as the cutting element 111 of the system 100 (e.g. is slid across the interface 110 using the button 108 on an outer surface of the element 105*a*, to cut the plastic material across the interface 110). However, the embodiments of the present invention include any cutting element that moves relative to the inner surface of the element 105*a* or 105*b* in order to cut the plastic material along the interface 110. In another embodiment, the element 105*a* or element 105*b* includes a spring loaded mechanism to move the cutting mechanism 111 in a direction orthogonal to the longitudinal axis 135*a* or 135*b* to cut the plastic material upon actuation of a button operatively coupled to the spring loaded mechanism.

In some embodiments, the heating elements 106*a* 106*b* are securely fixed along the inner surface of the elements 105*a*, 105*b*. In other embodiments, one or both of the heating elements 106*a*, 106*b* are movably fixed to the inner surface of the elements 105*a*, 105*b*. FIG. 6A is an image that illustrates an example of a side view of a system 100" for sealing an enclosure of plastic material in an open position 101, according to an embodiment. In one embodiment, the system 100" of FIG. 6A is similar to the system 100' with the exception of the features discussed herein. In an embodiment, unlike the system 100' the heating element 106*a*' is movably fixed to the inner surface of the element 105*a*. In one embodiment, the heating element 106*a*' is movably mounted to the element 105*a* such that a recess 182 is provided between the heating element 106*a*' and the inner surface of the element 105*a*. Additionally, one or more springs 184*a*, 184*b* are provided that extend into the recess 182 and are operatively coupled to the heating element 106*a*'. A cutting element 111 is provided such that a tip of the cutting element 111 is aligned with an inner surface of the heating element 106*a*' when the system 100" is in the open position 101. Upon moving the system 100" from the open position 101 to the closed position 103 (FIG. 6B), the heating element 106a' engages the heating element 106b at the interface 110 which causes the heating element 106a' to move in a direction orthogonal to the longitudinal axis 135a and into the recess 182. The heating element 106a' retracts relative to the cutting element 111 so that the cutting element 111 extends beyond the inner surface of the heating element 106a' in the direction orthogonal to the longitudinal axis 135a. Since the tip of the cutting element 111 extends beyond an interface 110 of the heating elements 106a, 106b, the cutting element 111 will cut the plastic material at the interface 110 when the cutting element 111 is slid across the interface 110. This arrangement advantageously ensures that the cutting element 111 is not exposed when the system 100" is in the open position 101 since the tip of the cutting element 111 does not extend beyond the inner surface of the heating element 106a'.

Figure 8A:
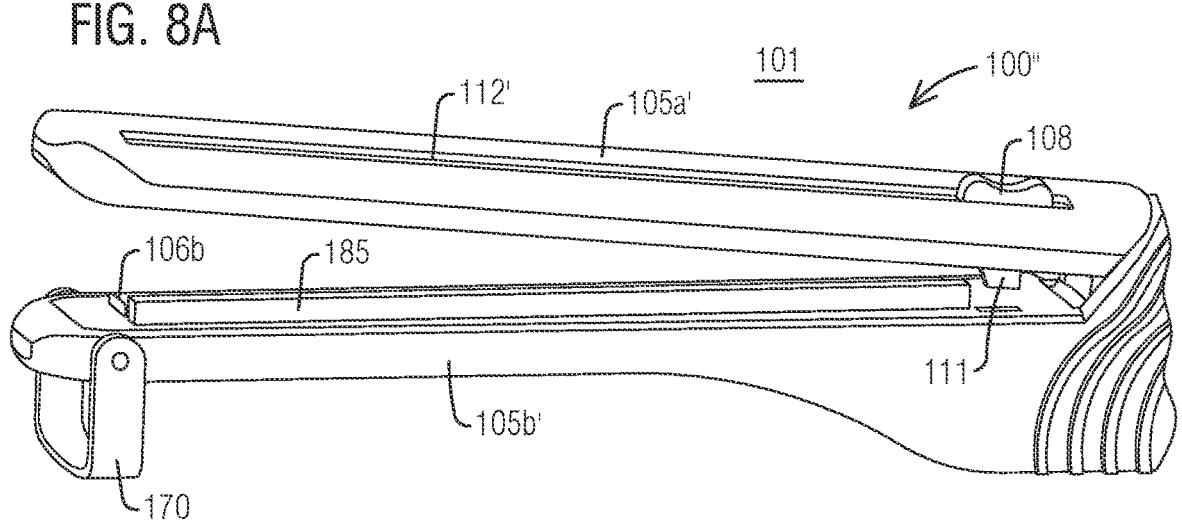
FIG. 8A is an image that illustrates an example of a perspective view of a system for sealing an enclosure of plastic material in an open position, according to an embodiment.
Figure 8B:
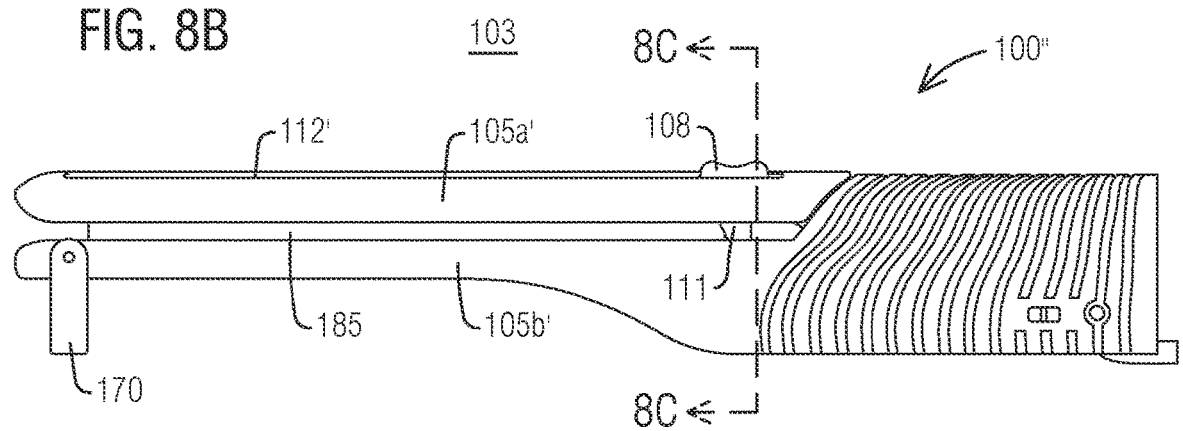
FIG. 8B is an image that illustrates an example of a side view of the system of FIG. 8A in a closed position, according to an embodiment.
Figure 8D:
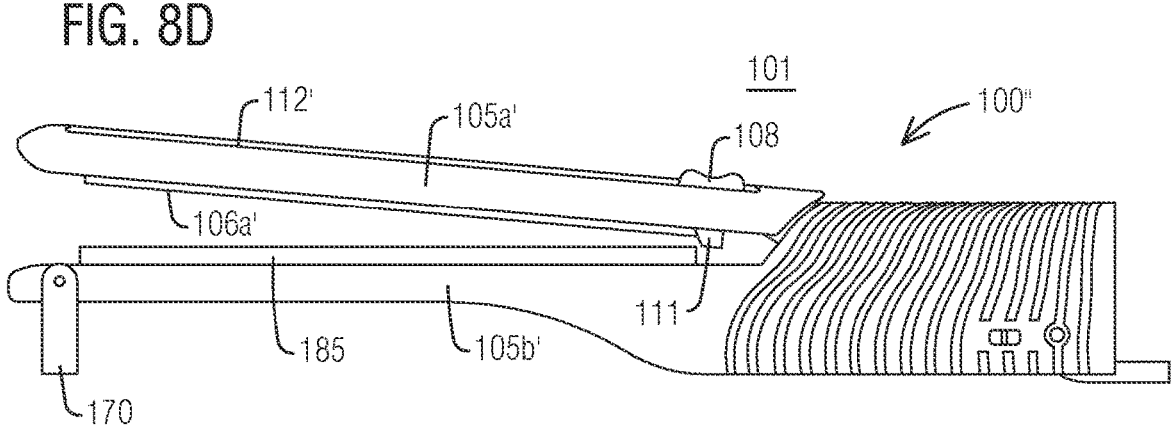
FIG. 8D is an image that illustrates an example of a side view of the system of FIG. 8A in an open position, according to an embodiment.
Figure 8C:
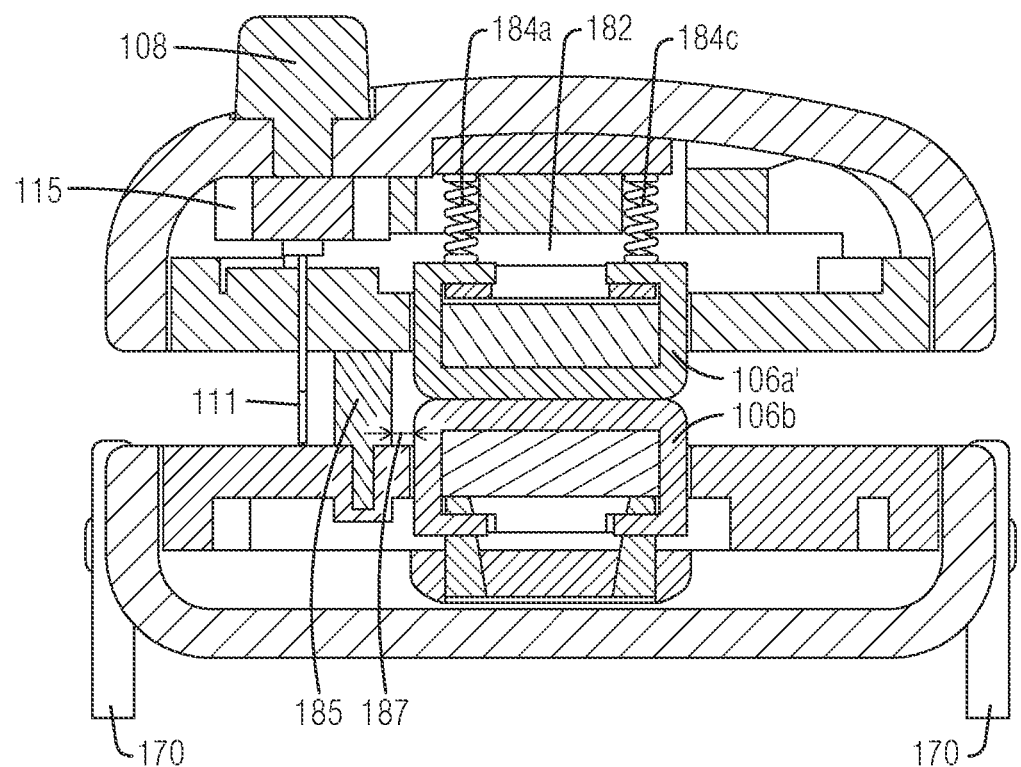
FIG. 8C is an image that illustrates an example of a cross sectional view taken along the line 8C-8C in FIG. 8B, according to an embodiment.
Figure 8E:
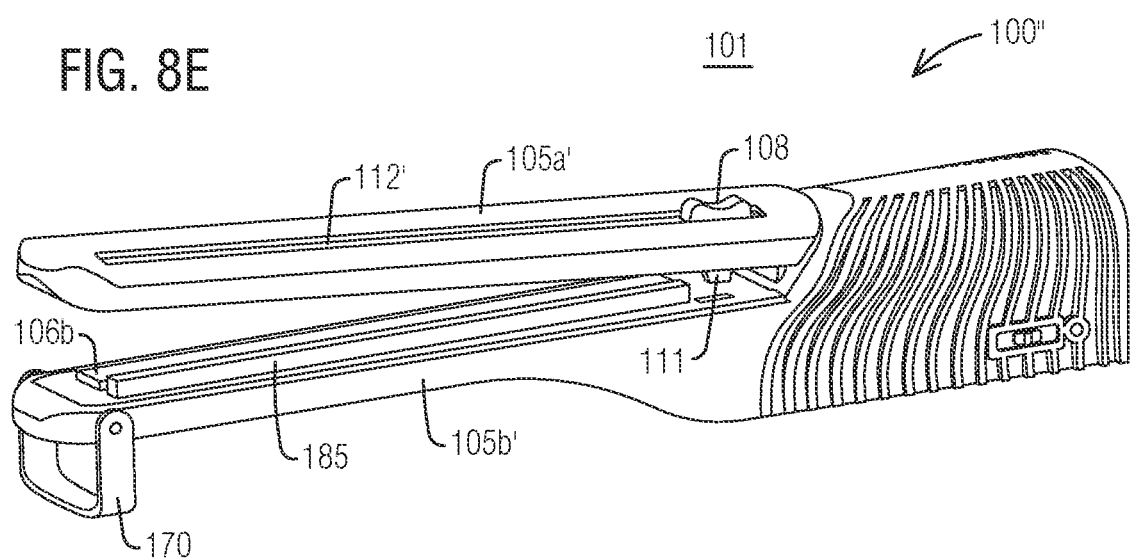
FIG. 8E is an image that illustrates an example of a perspective view of the system of FIG. 8A in an open position, according to an embodiment.
Figure 8F:
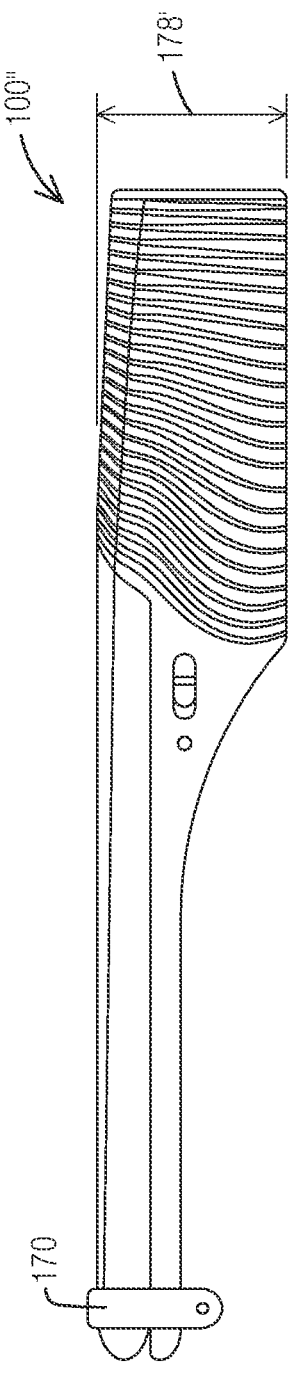
FIG. 8F is an image that illustrates an example of a side view of the system of FIG. 8A in a closed position, according to an embodiment.

FIG. 8A is an image that illustrates an example of a perspective view of the system 100" for sealing an enclosure of plastic material in the open position 101, according to an embodiment. FIG. 8B is an image that illustrates an example of a side view of the system 100" of FIG. 8A in the closed position 103, according to an embodiment. FIG. 8C is an image that illustrates an example of a cross sectional view taken along the line 8C-8C in FIG. 8B, according to an embodiment. In an embodiment, the system 100" of FIG. 8A is similar to the system 100" of FIG. 6A, with the exception of one or more features discussed herein.

In an embodiment, a silicone layer 185 (e.g. silicone rubber layer) is provided between the heating elements 106a, 106b and the cutting element 111 and within the spacing 186 between the heating elements 106a, 106b and the cutting element 111. In one embodiment, the silicone layer 185 is oriented orthogonal to the heating elements 106a, 106b such that a longer dimension of the silicone layer 185 is oriented orthogonal to a longer dimension of the heating elements 106a, 106b. The silicone layer 185 (e.g. rubber silicone) advantageously provides thermal insulation to the cut formed in the plastic material 136 by the cutting element 111 to prevent heat from the heating elements 106a, 106b from resealing the plastic material 136 along the cut. In one embodiment, the silicone layer 185 includes an extension that is fixedly received in a groove along the inner surface of the element 105b'. The silicone layer 185 is affixed within the groove of the inner surface of the element 105b' using any means appreciated by one of skill in the art (e.g. adhesive). In an embodiment, a width of the heating elements 106 along the interface 110 is about ¼" or in a range from about ⅛" to about ½" or in a range from about ¹⁄₁₆" to about ¾". In an embodiment, a width of the silicone layer 185 along the interface 110 is about 0.04" (1 mm) or in a range from about 0.02" (0.5 mm) to about 0.08" (2 mm) or in a range from about 0" to about 0.2". In still other embodiments, a width of the silicone layer 185 is based on a fraction of the width of the heating element 106, where the fraction is less than 1. In an embodiment, the height of the silicone layer 185 is sized to adjust a spacing of the inner surfaces of the elements 105a', 105b' in the closed position 103. In an embodiment, the silicone layer 185 has a minimum spacing 187 from the heating element 106b in the element 105b. In an example embodiment, the minimum spacing 187 is about 1 mm or in a range from about 0.5 mm to about 2 mm. In other embodiments, the silicone layer 185 and/or the springs 184 are absent from the system 100".

In an embodiment, a pair of springs 184a, 184c are aligned with opposing sides of the heating element 106a' adjacent the first end 177a and are operatively coupled to the heating element 106a' to accommodate the heating element 106a' moving into the recess 182 in the direction orthogonal to the longitudinal axis 135a upon engagement between the heating element 106a' and heating element 106b in the closed position 103. Additionally, a pair of springs 184b are aligned with opposing sides of the heating element 106a' adjacent the second end 177b or at increment spacings between the first end 177a and second end 177b. In an embodiment, the button 108 is operatively connected to the cutting element 111 through a member 115 that is slidably received within the slot 112'. In one embodiment, the member 115 is oriented orthogonal to the cutting element 111.

Figure 8G:
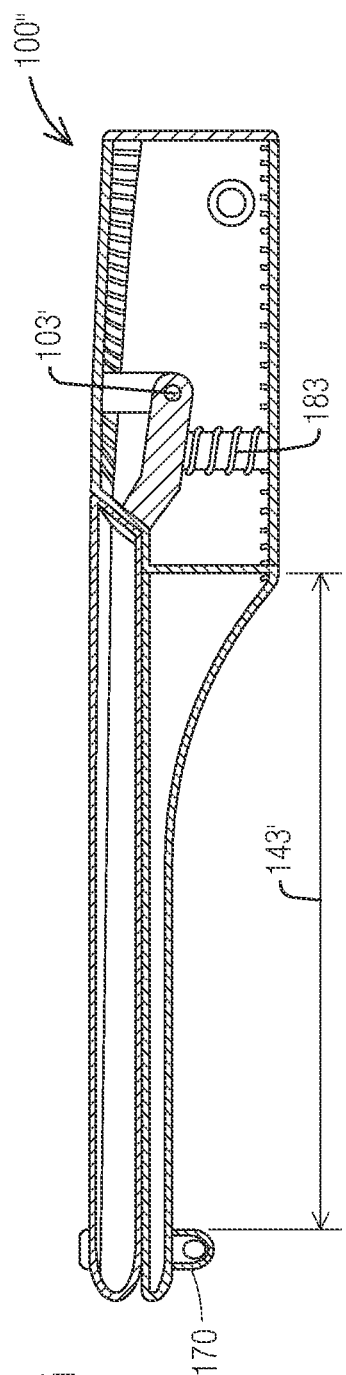
FIG. 8G is an image that illustrates an example of a partial sectional view of the system of FIG. 8F in a closed position, according to an embodiment.
Figure 8H:
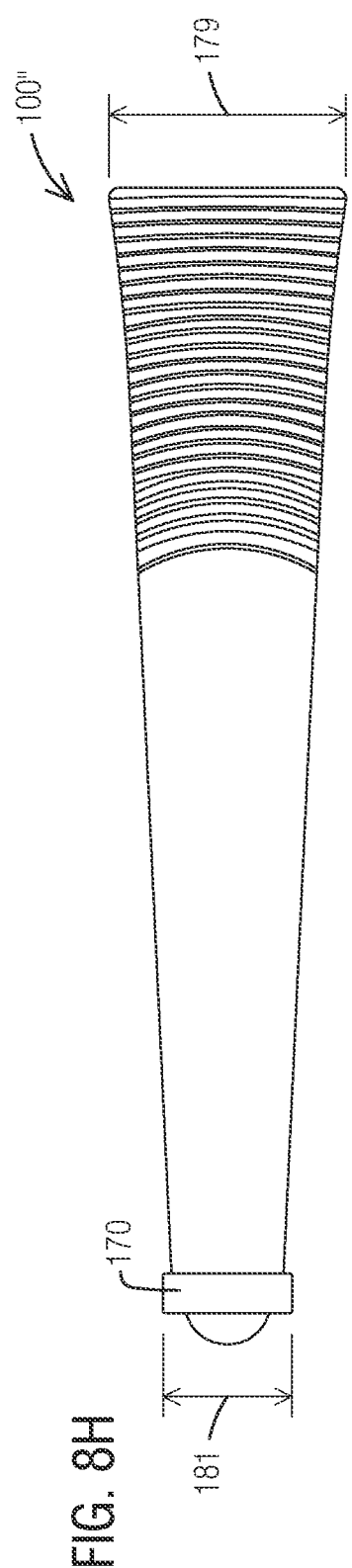
FIG. 8H is an image that illustrates an example of a top view of the system of FIG. 8F, according to an embodiment.

In an embodiment, the system 100" includes a spring 183 that is used to spring load the element 105a' at a hinge 103' (FIG. 8G). In one embodiment, when the system 100" is in the closed position 103 and the U-shaped member 170 is rotated from the first position (FIG. 8G) to the second position (FIG. 5D), the spring 183 presses upward on the element 105a' and causes the element 105a' to rotate about the hinge 103' until the system 100" reaches the open position 101. This advantageously causes the system 100" to automatically open to the open position 101 without any effort by the user. In other embodiments, the spring 183 is omitted and the user manually rotates the element 105a' from the closed position 103 to the open position 101.

Figure 5H:
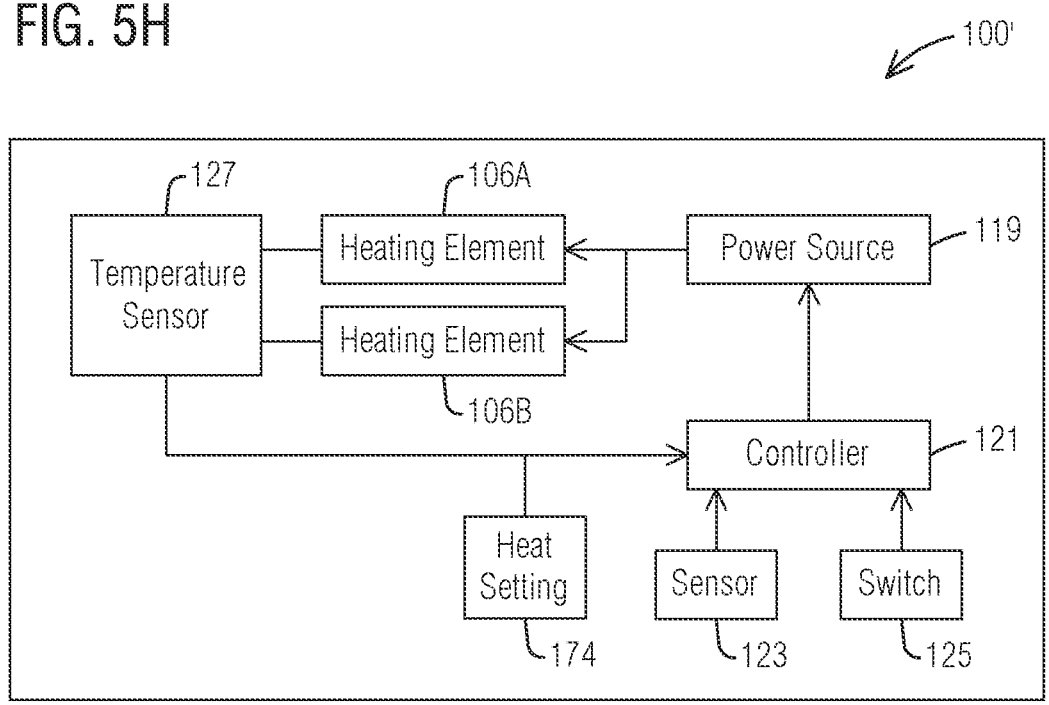
FIG. 5H is a block diagram that illustrates an example of electrical connections between the heating elements and the power source within the system of FIG. 5A, according to an embodiment.

As previously discussed, the system 100' includes one or more heat settings 174 to adjust a desired temperature of the heating elements 106a, 106b. FIG. 5H is a block diagram that illustrates an example of electrical connections between the heating elements 106a, 106b and a power source 119 (e.g. battery 118) within the system 100' of FIG. 5A, according to an embodiment. In some embodiments, the power source 119 is an electrical outlet that is connected to the system 100' through one or more electrical inlet 176 (e.g. USB port). In an embodiment, the system 100' includes a switch 125 to turn the system on or off (e.g. power switch). In one embodiment, no switch 125 is provided and the electrical connection between the power source 119 and the system (e.g. plugging the system into an electrical outlet) serves as the switch 125 that turns the system on or off. Additionally, in an embodiment, a sensor 123 is provided that detects when the elements 105a, 105b move from the open position 101 to the closed position 103 (e.g. sensor that detects engagement of heating elements 106a, 106b). In one embodiment, "open position" means an angle between the elements 105a, 105b greater than an angle threshold (e.g. about 5-10 degrees) such that the heating elements 106a, 106b are not activated in the open position, whereas the "closed position" means an angle between the elements 105a, 105b less than the angle threshold such that the heating elements 106a, 106b is activated. In another embodiment, the "open position" means an angle between the elements 105a, 105b beyond the angle threshold and the "closed position" means an angle between the elements 105a, 105b less than the angle threshold, where the angle between the elements 105a, 105b does not affect whether the heating elements 106a, 106b are activated.

In an embodiment, the system 100' includes a controller 121 that receives one or more inputs from the heat setting 174, the sensor 123 and/or the switch 125. Upon receiving these inputs, the controller 121 determines whether to transmit a signal to the power source 119 to transmit power to the heating elements 106a, 106b. In one embodiment, upon receiving a signal from the switch 125 that the system 100' is turned on, the controller 121 transmits the signal to the power source 119 to transmit power to the heating elements 106a, 106b. In this embodiment, the sensor 123 is not provided or used and the heating elements 106a, 106b are continuously heated as long as the switch 125 is turned on. In an example embodiment, the switch 125 is a power switch on an external surface of the system 100'. In another embodiment, upon receiving a signal from the switch 125 and the sensor 123 that the system 100' is turned on and that the elements 105a, 105b are in the closed position 103, the controller 121 transmits the signal to the power source 119 to transmit power to the heating elements 106a, 106b. Thus this embodiment requires that the switch 125 is turned on and that the elements 105a, 105b are in the closed position 103 in order for the heating elements 106a, 106b to be heated.

In an embodiment, selecting one of the heat settings 174 adjusts a temperature threshold that is stored in a memory of the controller 121. In an embodiment, a temperature sensor 127 is provided that continuously measures the temperature of the heating elements 106a, 106b as the power source 119 elevates the temperature of the heating elements 106a, 106b. The temperature sensor 127 continuously transmits data of the measured temperature to the controller 121 and the controller 121 continuously compares the received measured temperature data with the temperature threshold stored in the memory. When the measured temperature is equal to or greater than the temperature threshold, the controller 121 transmits a signal to the power source 119 to stop delivering power to the heating elements 106a, 106b. When the measured temperature falls below the temperature threshold, the controller 121 transmits the signal to the power source 119 to deliver power to the heating elements 106a, 106b.

In some embodiments, when the system 100' is moved to the closed position 103, the heating elements 106a, 106b receive electrical energy from the power source 119 and heat up to a desired temperature (e.g. temperature threshold based on the selected heat setting 174). In other embodiments, the heating elements 106a, 106b heat up to the desired temperature based on activating one or more controls, regardless of whether the system is in the open position 101 or closed position 103. In one embodiment, the system 100' features one or more controls (e.g. heat setting 174) to vary the desired temperature. In an example embodiment, the control features a dial to vary the desired temperature to one of a plurality of settings. In an example embodiment, the dial features between two and eight settings to vary the desired temperature to one of between two and eight different settings. In one embodiment, the desired temperature setting is adjusted based on the type of plastic material 136. In an example embodiment, enclosures made of mylar plastic material have a different desired temperature setting than enclosures made of polybag plastic material. In some embodiments, the desired temperature is selected based on a melting point of the plastic material. In an example embodiment, the system 100' features one or more controls on a surface of the elements 105a, 105b to select the desired temperature. In other embodiments, the system 100' features one or more controls to activate the heating elements 106a, 106b in the closed position 101 such that the heating elements 106a, 106b will only heat up in the closed position 101 if the control is activated. In still other embodiments, the controls activate the heating elements 106a, 106b regardless of the position of the system 100'. The temperature of the heating element 106 of the system 100 is controlled in a similar manner as the heating elements 106a, 106b of the system 100' discussed herein. In some embodiments, the first element 102a features a light emitting diode (LED) 120 (FIG. 1D) that activates in a first mode (e.g. flashing mode or a first color) when the heating element 106 is heating to the desired temperature and activates in a second mode different than the first mode (e.g. static mode or a second color) when the heating element 106 reaches the desired temperature.

Figure 3A:
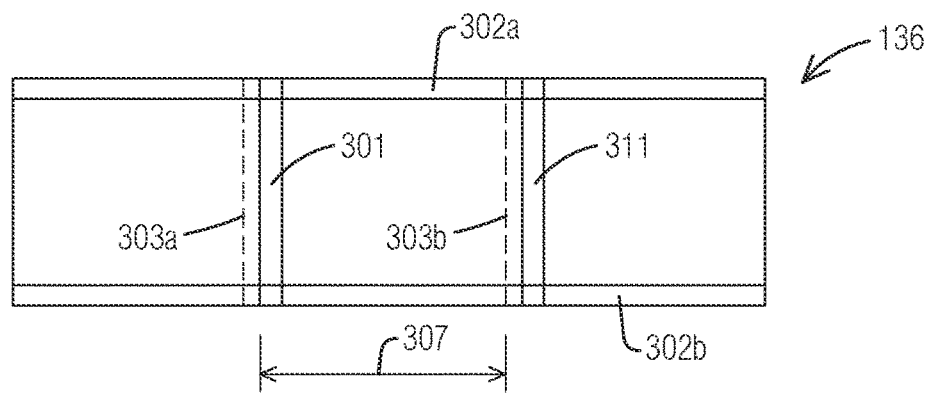
FIG. 3A is a block diagram that illustrates an example of a perspective view of a seal formed in the plastic material by the system of FIG. 5A, according to an embodiment.

The heating elements 106a, 106b heat up to the desired temperature to melt the plastic material including the first plastic layer and the second plastic layer and form a seal between the first plastic layer and the second plastic layer in the plastic material. FIG. 3A is a block diagram that illustrates an example of a perspective view of a first seal 301 formed in the plastic material 136 by the system 100', according to an embodiment. In some embodiments, the plastic material 136 includes side seals 302a, 302b before the plastic material 136 is heated with the heating elements 106a, 106b to form the first seal 301. In other embodiments, the plastic material 136 includes a first and second plastic layer that does not include the side seals 302a, 302b and the side seals 302a, 302b are formed with the heating elements 106a, 106b. In some embodiments, the plastic material 136 is exposed to the heating elements 106a, 106b at the desired temperature for a minimum time period (e.g. from about 3 seconds to about 5 seconds) to form the seal. In some embodiments, the minimum time period depends on one or more parameters of the plastic material 136 (e.g. thickness). In some embodiments, after forming the first seal 301 across the heating elements 106a, 106b, the button 108 is slid along the slot 112' of the element 105a to slide the cutting element 111 along a cut line 303a at the interface to cut the plastic material 136 adjacent to the first seal 301. A third seal 311 is then formed in the plastic material 136 using the heating elements 106a, 106b in a similar manner as to form the first seal 301 and the button 108 is slid along the slot 112' to slide the cutting element 111 along a cut line 303b to form an opening 305 in a plastic enclosure 310 (e.g. bag). The third seal 311 is formed as part of a second enclosure (e.g. second bag) that is separate and apart from the plastic enclosure 310.

Figure 3B:
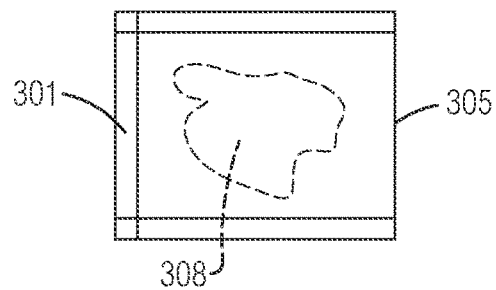
FIG. 3B is a block diagram that illustrates an example of a perspective view of the seal of FIG. 3A, according to an embodiment.
Figure 3C:
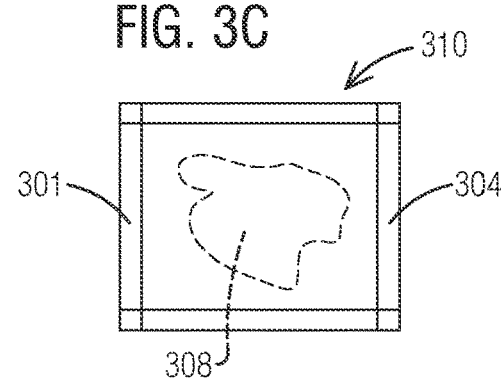
FIG. 3C is a block diagram that illustrates an example of a perspective view of a second seal formed in the plastic material by the system of FIG. 5A, according to an embodiment.

FIG. 3B is a block diagram that illustrates an example of a perspective view of the first seal 301 of FIG. 3A after cutting off the plastic material 136 from the first seal 301 using the system of FIG. 5A, according to an embodiment. The first seal 301 forms a base of the enclosure 310. An opening 305 of the enclosure 310 is provided by sliding the cutter element 111 along the cut line 303b. As discussed in the method below, contents 308 (e.g. condiments, snacks, personal products) are inserted into the enclosure 310 of plastic material 136 through the opening 305. FIG. 3C is a block diagram that illustrates an example of a perspective view of a second seal 304 formed in the plastic material 136 by the system 100' of FIG. 5A, according to an embodiment. After inserting contents 308 through the opening 305, the opening 305 is positioned at the interface between the elements 105a, 105b and the second seal 304 is formed by the heating elements 106a, 106b between the first and second plastic layers. The enclosure, i.e. a bag 310 is then provided which includes an enclosed volume that holds the contents 308 where the enclosed volume is defined by first seal 301, second seal 304 and side seals 302a, 302b.

FIG. 3B is a block diagram that illustrates an example of a perspective view of the first seal 301 of FIG. 3A after cutting off the plastic material 136 from the first seal 301 using the system of FIG. 5A, according to an embodiment. The first seal 301 forms a base of the enclosure 310. An opening 305 of the enclosure 310 is provided by sliding the cutter element 111 along the cut line 303b. As discussed in the method below, contents 308 (e.g. condiments, snacks, personal products) are inserted into the enclosure 310 of plastic material 136 through the opening 305. FIG. 3C is a block diagram that illustrates an example of a perspective view of a second seal 304 formed in the plastic material 136 by the system 100' of FIG. 5A, according to an embodiment. After inserting contents 308 through the opening 305, the opening 305 is positioned at the interface between the elements 105a, 105b and the second seal 304 is formed by the heating elements 106a, 106b between the first and second plastic layers. The enclosure, i.e. a bag 310 is then provided which includes an enclosed volume that holds the contents 308 where the enclosed volume is defined by first seal 301, second seal 304 and side seals 302a, 302b.

Figure 3D:
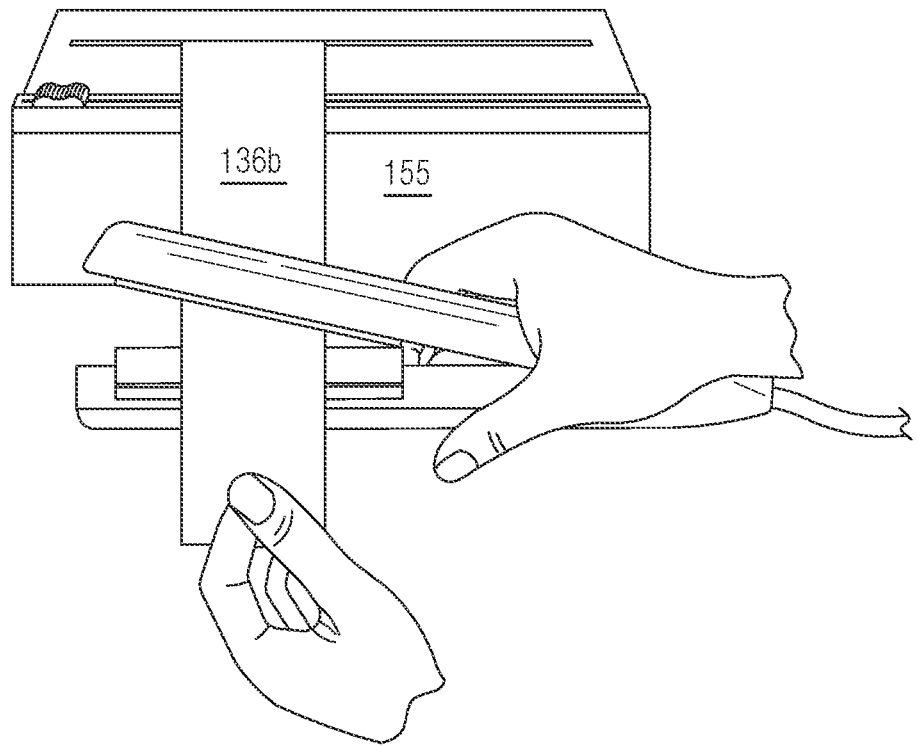
FIG. 3D is an image that illustrates an example of a perspective view of using the system to form the second seal of FIG. 3C in the plastic material, according to an embodiment.
Figure 3E:
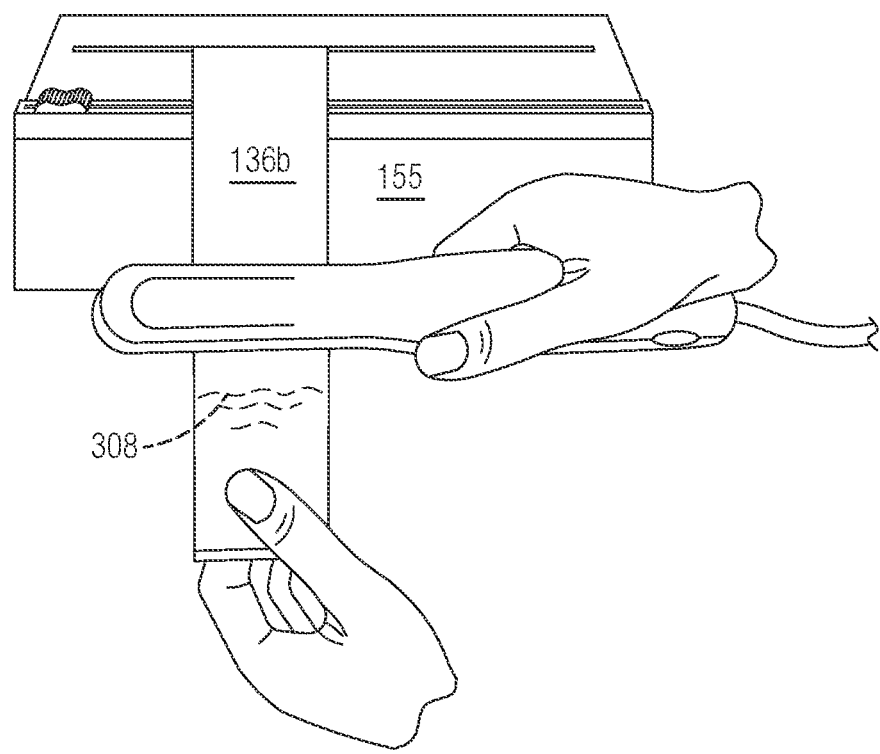
FIG. 3E is an image that illustrates an example of a perspective view of using the system to form the second seal of FIG. 3C, according to an embodiment.
Figure 3F:
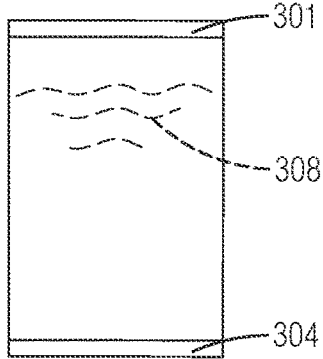
FIG. 3F is an image that illustrates an example of a top view of the enclosure of the plastic material including the first seal and the second seal, according to an embodiment.
Figure 3G:
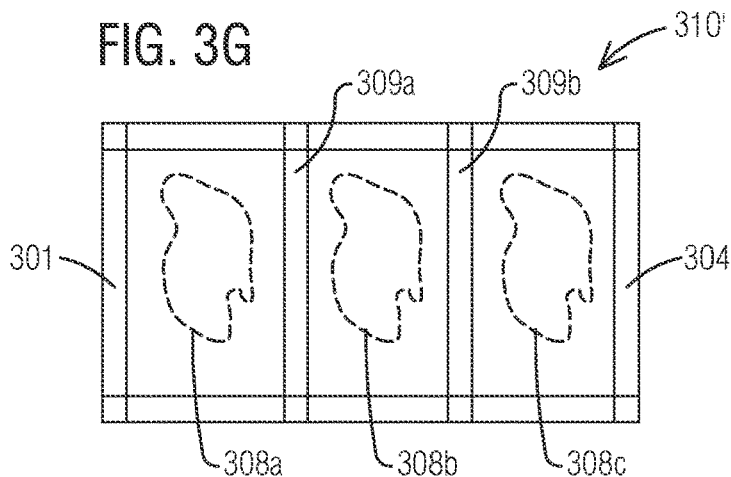
FIG. 3G is a block diagram that illustrates an example of a top view of the enclosure of the plastic material including interior seals between the first seal and the second seal, according to an embodiment.

FIG. 3G is a block diagram that illustrates an example of a top view of the enclosure 310' of the plastic material including interior seals 309a, 309b between the first seal 301 and the second seal 304, according to an embodiment. In this embodiment, after forming the first seal 301 and the opening 305, contents 308a are inserted through the opening 305 and an interior seal 309a is formed to keep contents 308a within a sub-enclosure of the enclosure 310'. Similarly, contents 308b are inserted through the opening 305 and an interior seal 309b is formed to keep contents 308b within a sub-enclosure of the enclosure 310'. The cutting element 111 is not slid across the interface adjacent to the interior seals 309a, 309b since it is not desired to cut the plastic material 136 adjacent to the interior seals 309a, 309b. Contents 308c are inserted through the opening 305 after which the second seal 304 is formed along the opening 305 using the elements 105a, 105b. This arrangement advantageously permits multiple sub-enclosures of contents 308 within one larger enclosure 310'. When a user wants to access contents 308c (but not contents 308a or 308b), the user can either cut the sub-enclosure with contents 308c or cut the interior seal 309b and carry the sub-enclosure with the contents 308c until they want to access the contents 308c. In an example embodiment, the user can form multiple sub-enclosures with contents 308 in each sub-enclosure for each day of the week so they only need to access the sub-enclosure for that specific day of the week.

Figure 2F:
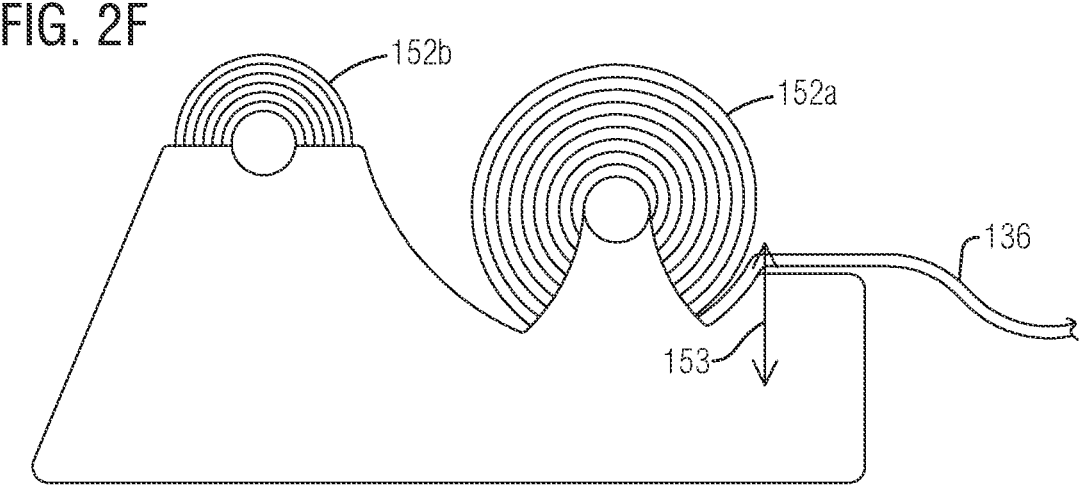
FIG. 2F is an image that illustrates an example of a side view of a plurality of reels of plastic material used in the system of FIG. 2E, according to an embodiment.
Figure 2G:
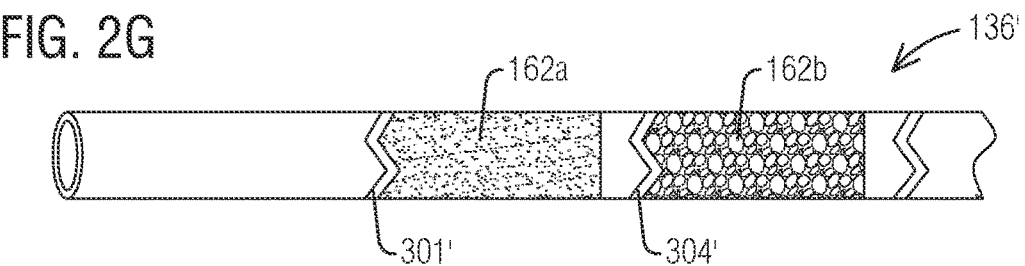
FIG. 2G is an image that illustrates an example of a top view of straw material and a plurality of capsules formed in the straw material with the system of FIG. 2E, according to an embodiment.
Figure 2H:
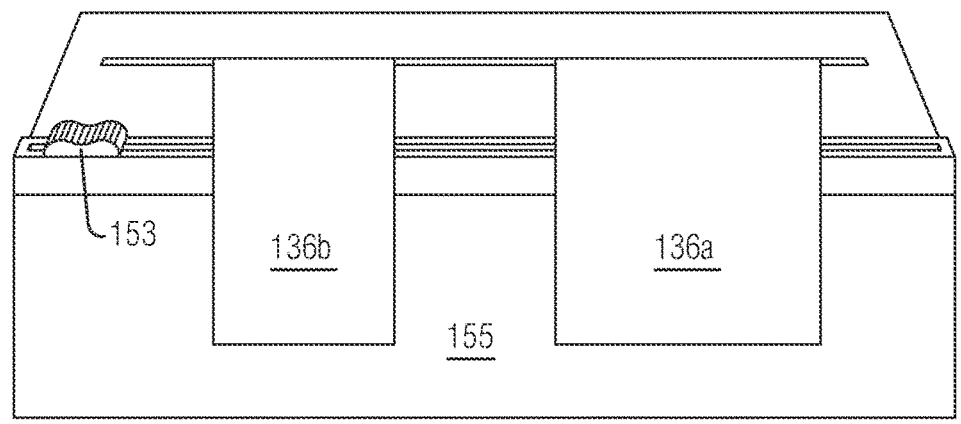
FIG. 2H is an image that illustrates an example of a perspective view of a plurality of reels of plastic material used in the system of FIG. 2E, according to an embodiment.
Figure 4:
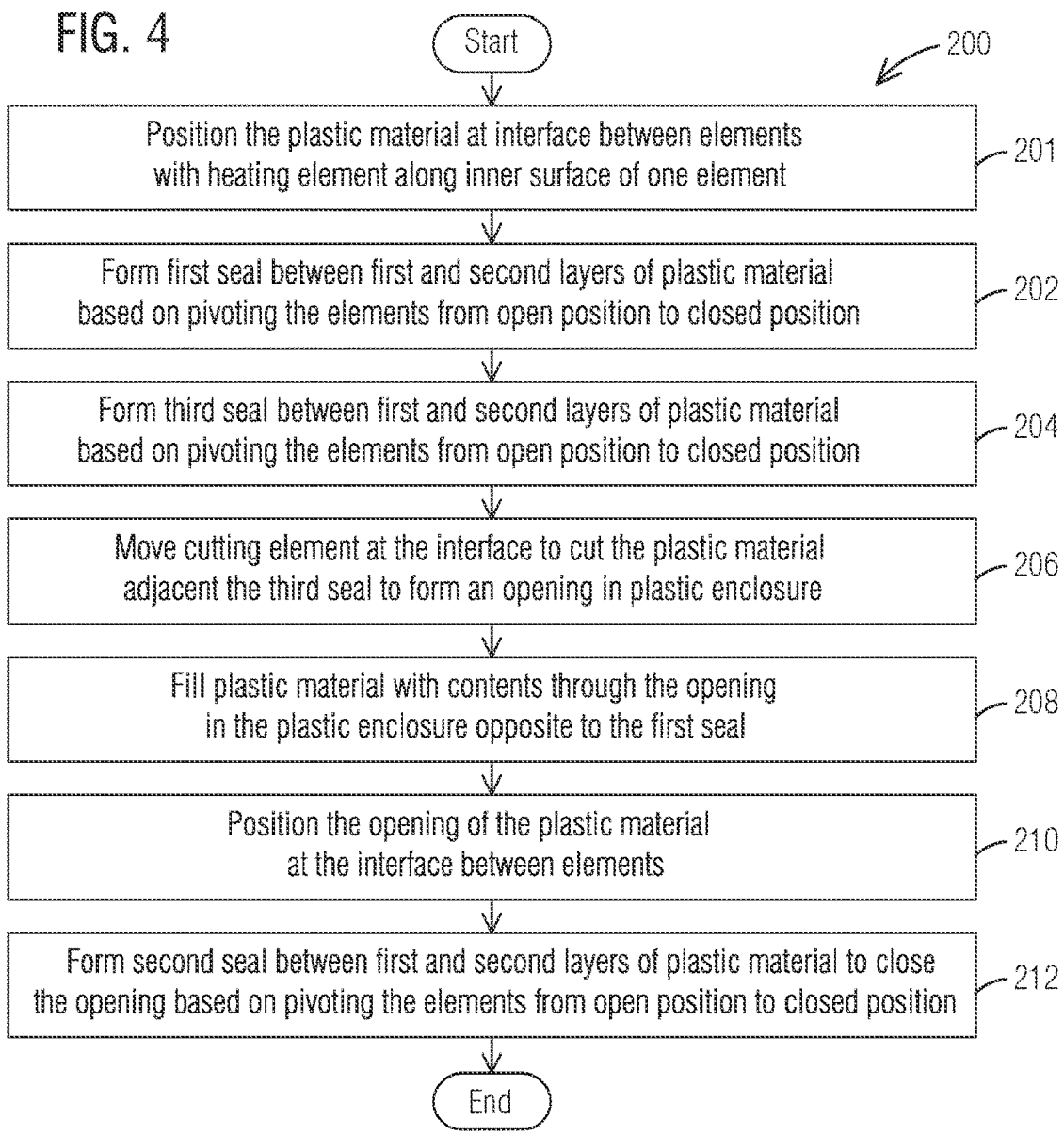
FIG. 4 is a flow chart that illustrates an example of a method for sealing an enclosure of plastic material, according to an embodiment.

FIG. 4 is a flow chart that illustrates an example of a method 200 for sealing an enclosure 310 of plastic material 136, according to an embodiment. In an embodiment, the system 100, 100', 100" is portable such that one or more steps of the method 200 can be performed while the system 100, 100', 100" is held in one or both hands of a user. The method 200 below can be performed using any embodiment of the systems 100, 100', 100" previously discussed. In step 201, the plastic material 136 is positioned at the interface between the elements 105a, 105b. FIG. 2F is a block diagram that illustrates an example of a side view of a plurality of reels 152a, 152b of plastic material 136 used in the system 100' of FIG. 5A, according to an embodiment. Alternatively, a reel 152 is provided in a box 155 (FIG. 7A) and is fed out of an opening in the box 155. In an embodiment, the reels 152a, 152b hold plastic material 136 of different widths. In an example embodiment, the reel 152a holds plastic material 136a of a first width (e.g. 6 inches) and the reel 152b holds plastic material 136b of a second width that is less than the first width (e.g. 3 inches). FIG. 2H depicts an embodiment where the plastic material 136a and the plastic material 136b are fed from a box or housing that holds the reels 152a, 152b. In an example embodiment, the plastic material 136 includes side seals 302a, 302b as depicted in FIG. 3A. In one embodiment, in step 201, plastic material 136 from one of the reels 152a, 152b or reel 152 in box 155 is fed to the interface between the elements 105a, 105b. In step 201, the reel 152a, 152b is selected such that the width of the plastic material 136 is equal to or less than a length 143 of the heating element 106 (FIG. 2E). In some embodiments, a cutter 153 is provided at the reels 152a, 152b and is used to cut the plastic material 136 such that a length of plastic material 136 is provided that corresponds to a desired length of the enclosure 310. In this embodiment, step 206 can be omitted in the method 200.

In some embodiments, in step 201, the plastic material 136 is positioned at the interface of the second elements 105a, 105b so that at least a desired length 307 (FIG. 3A) of plastic material 136 is pulled from the reel 152. FIG. 3D depicts one embodiment of step 201, where the plastic material 136b is positioned at the interface of the second elements 104a, 104b of the system 100. The desired length 307 corresponds to a desired length of the enclosure 310 (e.g. bag). In an example embodiment, the desired length of the enclosure 310 is in a range from about 5 inches to about 12 inches.

Figure 7A:
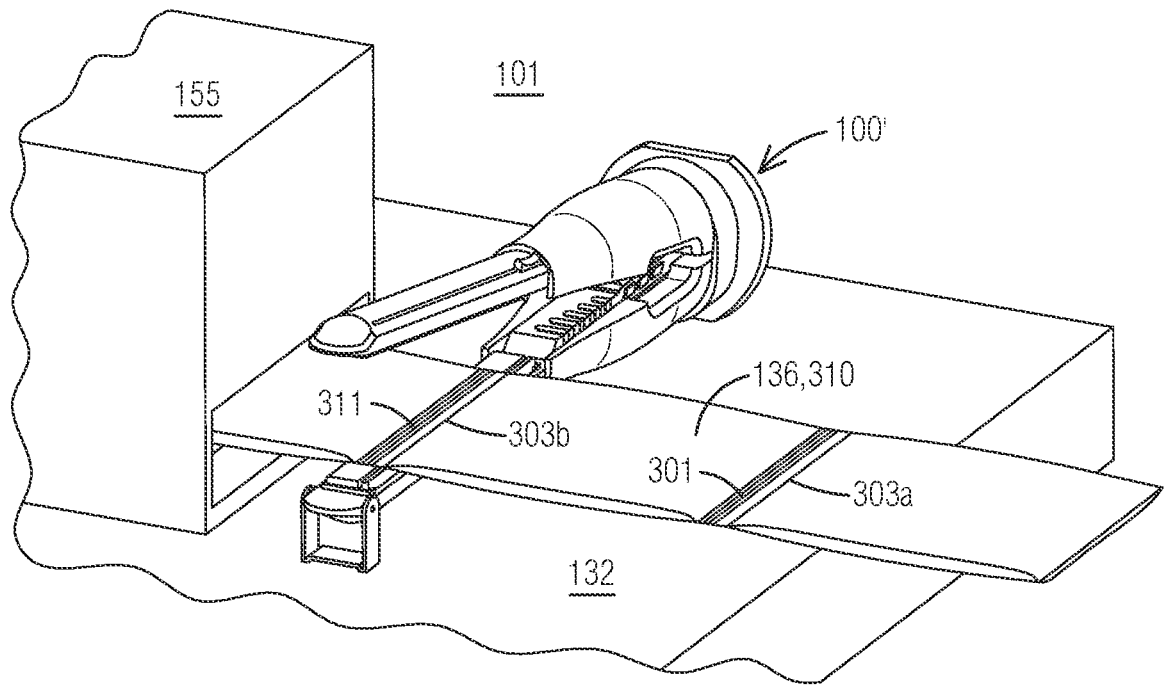
FIGS. 7A and 7B are images that illustrate an example of a perspective view of using the system of FIG. 5A to form a seal in the plastic material, according to an embodiment.

In some embodiments, in step 201, the plastic material 136 is initially moved between the elements 105a, 105b as depicted in FIG. 7A. In an example embodiment, in step 201 the plastic material 136 is moved between the elements 105a, 105b in FIG. 7A so that the region corresponding to the first seal 301 is initially positioned between the elements 105a, 105b.

Figure 7B:
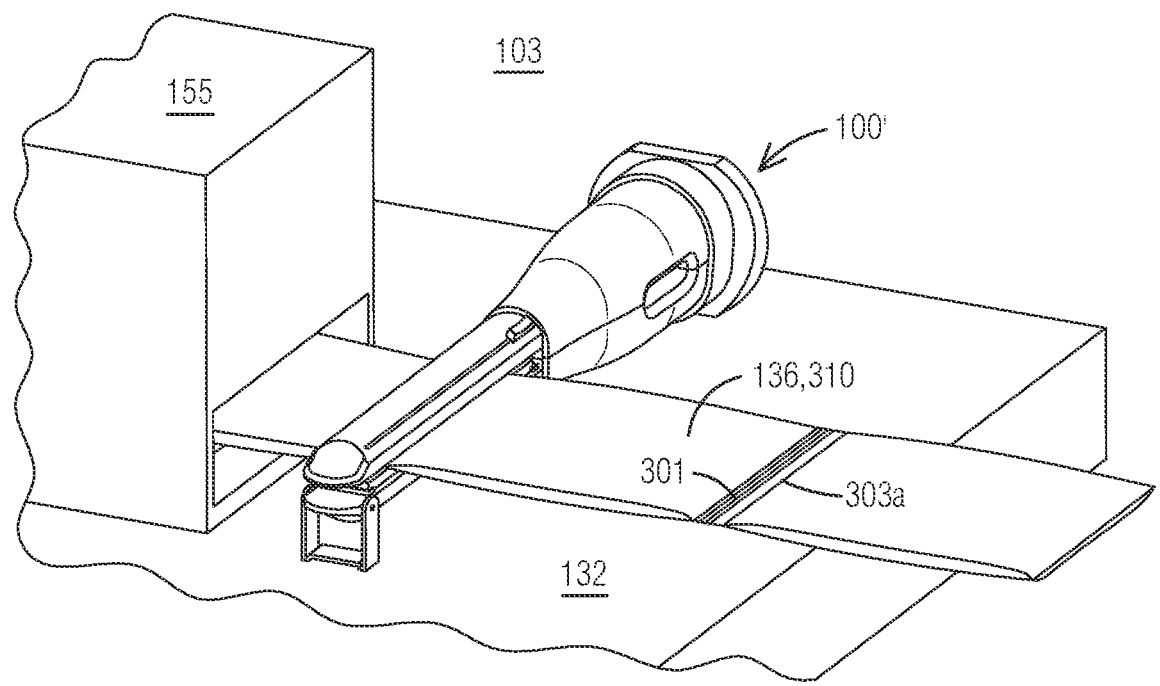
Figure 7C:
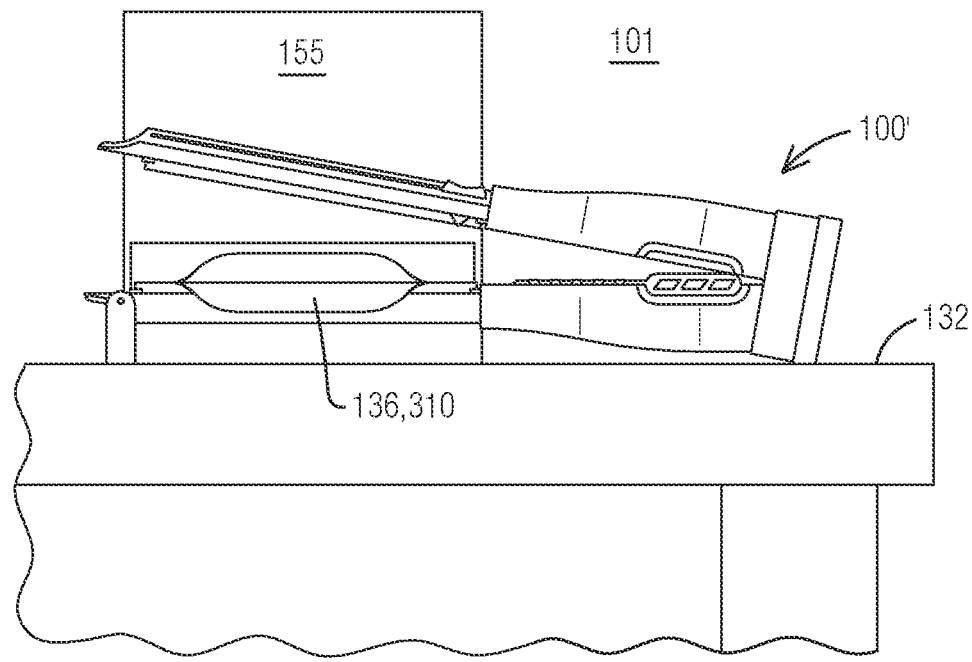
FIGS. 7C and 7D are images that illustrate an example of a side view of using the system of FIG. 5A to form a seal in the plastic material, according to an embodiment.
Figure 7D:
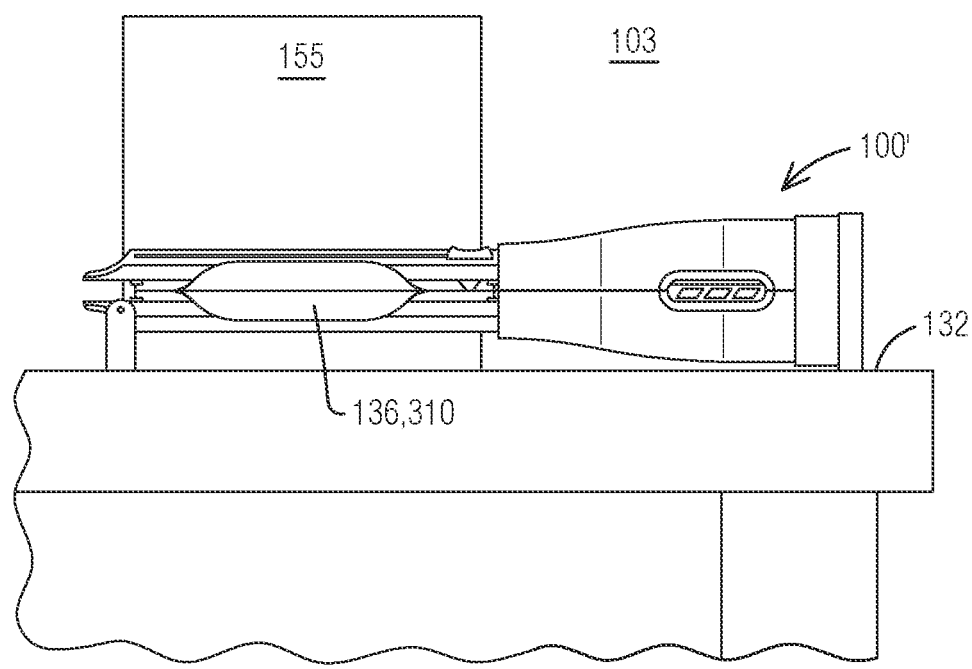

In step 202, after the plastic material 136 is positioned at the interface between the elements 105a, 105b, the heating elements 106a, 106b are pivoted from the open position 101 (FIG. 7A) to the closed position 103 (FIG. 7B). In some embodiments, in step 202, in addition to pivoting the elements 105a, 105b to the closed position 103, one or more controls are activated. The heating elements 106a, 106b then heat up to a desired temperature and increase the temperature at the interface of the heating elements 106a, 106b based on the electrical connection with the power source. In an embodiment, the desired temperature exceeds a melting temperature of the plastic material 136.

Additionally, in step 202, a first seal 301 is formed (FIG. 7A) in the plastic material 136 based on the heating of the interface in step 202. In some embodiments, in step 202, the first seal 301 is formed based on the temperature at the interface reaching the desired temperature for a minimum time period. In an example embodiment, the desired temperature is in a range from about 125 degrees to about 260 degrees. In another example embodiment, the minimum time period is in a range from about 3 seconds to about 5 seconds. In some embodiments, the user manually verifies when the minimum time period has elapsed and opens the elements 105a, 105b after that time period. In other embodiments, the heating elements 106a, 106b automatically heat up to the desired temperature and remains at that temperature for the minimum time period before automatically reducing its temperature.

In one embodiment, in step 202, after the first seal 301 is formed in the plastic material 136, the cutting element 111 is slid across the interface between the elements 105a, 105b along the cut line 303a (FIG. 3A) to cut the plastic material 136 adjacent to the first seal 301. FIG. 3B depicts one embodiment of the first seal 301 after performing step 206, where plastic material 136 adjacent to the first seal 301 has been cut off across the cut line 303a. FIG. 7A similarly depicts the cut line 303a where the cutting element 111 is slid across to cut the plastic material 136 adjacent to the first seal 301. In an embodiment, since the cutting element 111 is laterally displaced from the heating elements 106a, 106b the cut along the plastic material 136 in step 202 is advantageously displaced from the heating elements 106a, 106b which minimizes a risk that heat from the heating elements 106a, 106b melt the plastic material 136 together along the cut line 303a. Additionally, in another embodiment, the silicone layer 185 (FIG. 8C) provides thermal insulation to the plastic material 136 during the cutting along the line 303a, to reduce the risk of heating and resealing of the plastic material 136 along line 303a after cutting.

In step 204, a third seal 311 is formed between the first and second layers of the plastic material 136 based on pivoting the elements 105a, 105b from the open position 101 to the closed position 103, in the same manner that the first seal 301 was formed in step 202. FIG. 7A depict the plastic material 136 positioned between the elements 105a, 105b before the elements 105a, 105b are moved to the closed position 103 (FIG. 7B) to form the third seal 311. FIG. 3A depicts the third seal 311 formed in the plastic material 136.

In step 206, the cutting element 111 is moved at the interface 110 between the elements 105a, 105b along the cut line 303b to form the opening 305 in the enclosure 310. After step 206, the enclosure 310 as depicted in FIG. 3B is obtained including the first seal 310 and the opening 305 with the side seals 302a, 302b. In an embodiment, since the third seal 311 is detached from the enclosure 310 in step 206, the third seal 311 is used to form a second enclosure after the enclosure 310. In an example embodiment, the third seal 311 forms a similar seal in the second enclosure as the seal 301 in the enclosure 310.

FIG. 3B is a block diagram that illustrates an example of a perspective view of the plastic material 136 after using the cutting element 111 in step 206 to cut the plastic material 136 along the cut line 303b adjacent to the seal 311. An opening 305 (between the first and second plastic layers) is provided in the plastic material 136 opposite from the first seal 301.

In step 208, contents 308 (e.g. condiments, snacks, personal products) are inserted through the opening 305 of the plastic material 136. In one embodiment, a desired amount of contents 308 are inserted into the opening 305. In some embodiments, the contents 308 are liquid contents. In other embodiments, the contents 308 are solid contents.

In step 210, the opening 305 of the plastic material 136 is positioned at the interface between the elements 105a, 105b, after performing step 208. FIG. 3F depicts one embodiment of step 210, where the opening 305 of the plastic material 136 is positioned at the interface between the elements 105a, 105b. In some embodiments, step 210 is similar to step 201 with the exception that the opening 305 is positioned at the interface of the elements 105a, 105b. Step 212 is then performed which is similar to step 202.

Figure 7E:
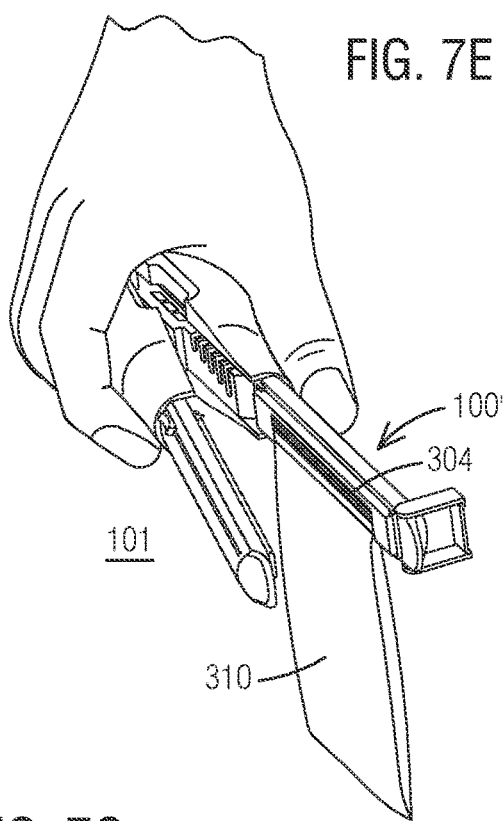
FIGS. 7E and 7F are images that illustrate an example of a perspective view of using the system of FIG. 5A to form a second seal in the plastic material, according to an embodiment.
Figure 7F:
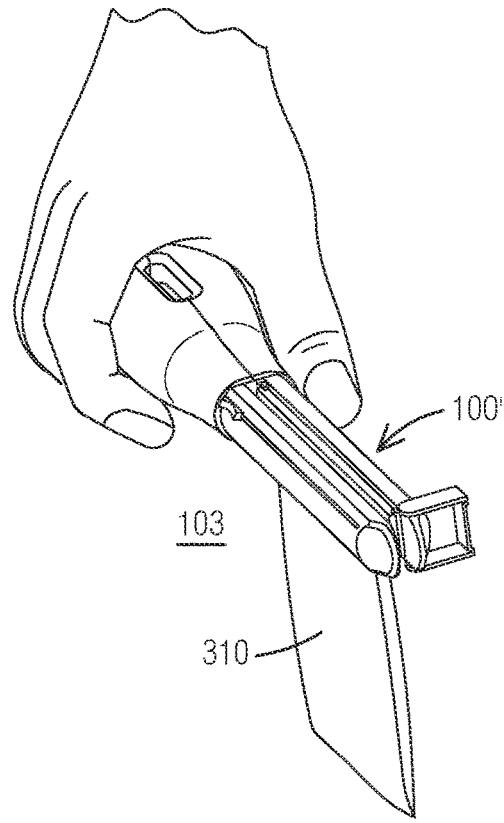

In step 212, a second seal 304 is formed in the plastic material 136 based on the heating of the interface in step 212. Upon performing step 212, the enclosure 310 (e.g. bag) is formed between the first seal 301, second seal 304 and side seals 302a, 302b. FIG. 3F depicts one embodiment of the enclosure 310 including the first seal 301 and second seal 304. In other embodiments, enclosures are formed other than rectangular enclosures, including arcuate shaped enclosures or enclosures based on any polygon shape. FIGS. 7E and 7F depict the system 100' being held in a hand of a user and used to form the second seal 304 as the user moves the system 100' from the open position 101 (FIG. 7E) to the closed position 103 (FIG. 7F).

Figure 7G:
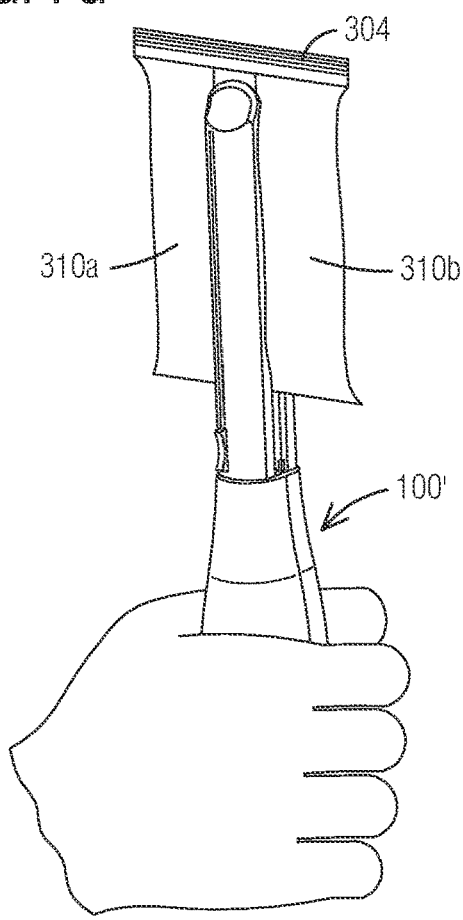
FIG. 7G is an image that illustrates an example of a perspective view of using the system of FIG. 5A to form interior seals in the plastic material, according to an embodiment.

In some embodiments, the method 200 is performed to fill the enclosure 310' (e.g. bag) with contents 308a, 308b, 308c (FIG. 3G) in respective sub-enclosures within the enclosure 310' and interior seals 309a, 309b are formed between the first seal 301 and the second seal 304. In these embodiments, steps 208 and 212 (omitting step 210) are repeatedly performed where step 212 involves forming the interior seal 309, until the desired number of sub-enclosures within the enclosure 310' are filled with contents 308a, 308b, 308c. Although FIG. 3G depicts three sub-enclosures within the enclosure 310', more than three or less than three sub-enclosures can be formed. After the desired number of sub-enclosures are formed (e.g. steps 208 and 212 are repeated a desired number of times), then step 212 is performed to close the opening 305 of the enclosure 310' with the second seal 304. Additionally, although FIG. 3G depicts that the sub-enclosures and interior seals 309 are formed in one direction and parallel to the first and second seals 301, 304, the interior seals can be omnidirectional such as vertical interior seals that are orthogonal to the first and second seals 301, 304 (FIG. 7G) that forms vertical sub-enclosures 310a, 310b or diagonal interior seals to form diagonal sub-enclosures within the enclosure 310'.

In some embodiments, the method 200 is performed using a straw 136' (FIG. 2G) where the first seal 301' and second seal 304' are formed in the straw 136' to form an enclosure (e.g. capsule 162) with the straw 136' material. In an example embodiment, the capsule 162 is filled with contents (e.g. spices) between forming the first seal 301' and second seal 304'. In one embodiment, in the method 200 using the straw 136', a first heating element 106 with a first length 143 based on a width of the plastic material 136 is replaced a second heating element 106 with a second length 143 e.g. based on a width of the straw 136'.

Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

Table 1 below lists various parameters (e.g. size, types of contents 308, etc) of various portions of the system 100, 100' and seal formed with the system 100, 100', 100" as well as different types of plastic material 136 that are used with various designs of the system 100, 100', 100" and different types of contents 308 associated with each type of plastic material 136. The parameters in Table 1 are merely one example embodiment of parameters that are used with the system 100, 100', 100" and are non-limiting. In other embodiments, parameters other than those listed in Table 1 can be used to form the system 100', 100', 100" or seal formed with the system 100, 100', 100".

TABLE 1

| Description | Travel Size | Standard Size | Uses | Bag Width | Bag Thickness |
|---|---|---|---|---|---|
| Size | | | | | |
| Heating element length | 2.5 inches | 5.5 inches | | | |
| Including slide cutter | 3.0 inches | 6.0 inches | | | |
| Handle length | 4.0 inches | 4.5 inches | | | |
| Total length | 7.0 inches | 10.5 inches | | | |
| Seal width | 0.25 inches on each side | 0.25 inches on each side | | | |
| Heating time | | | | | |
| Power | | | | | |
| Cordless-Battery type | Yes | Rechargeable | | | |
| Wired-Plug in power | Will work while charging | Yes | | | |
| Heat Settings | 2 | 3 | | | |
| Bags | | | | | |
| Medical Grade | N/A | Pills, liquids | Prescription | 2" | 8 ml |
| Thick bags-polyethylene with nylon | N/A | Liquids (food for boiling & microwaving) | Food | 2", 4", 6" | 7 ml |
| Thin bags | Liquids-thin bags | Liquids-thin bags | Household | 2", 4", 6" | 2 ml |
| Thinnest bags | Small items-thinnest bag | Small items-thinnest bag | Crafts | 2", 4", 6" | 1.2 ml |
| Total bags | 6 | 10 | | | |

Figure 9A:
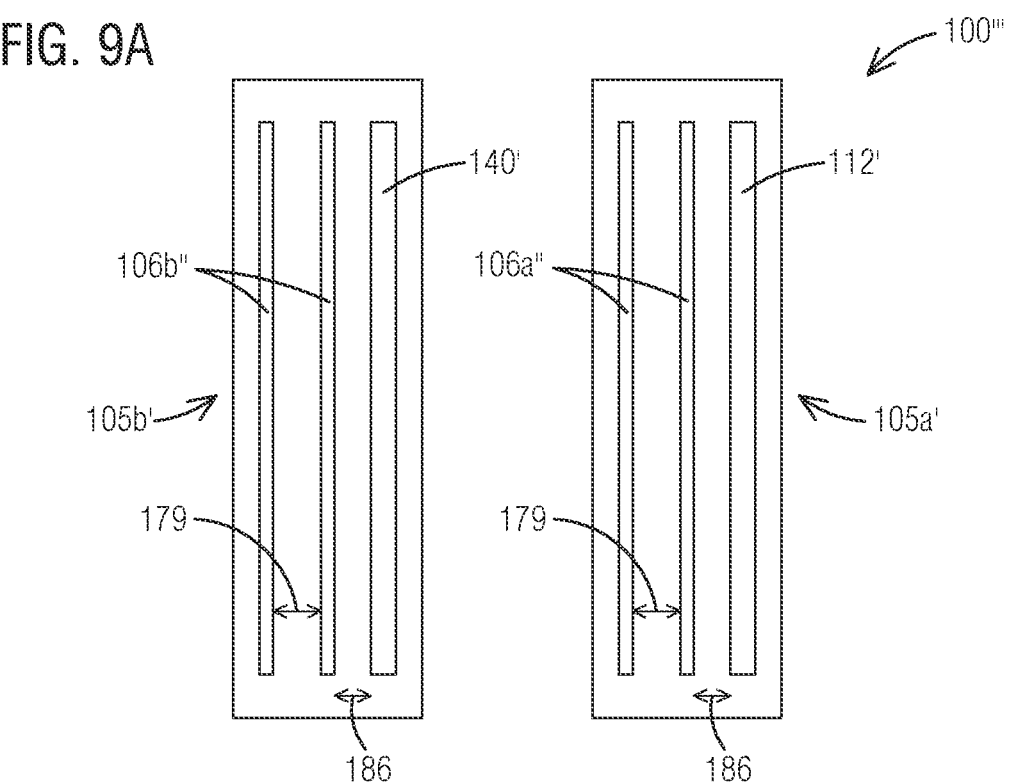
FIG. 9A is an image that illustrates an example of a plan view of an inner surface of the elements of a system for sealing an enclosure of plastic material, according to an embodiment.

FIG. 9A is an image that illustrates an example of a plan view of an inner surface of the elements of a system 100''' for sealing an enclosure of plastic material, according to an embodiment. The system 100''' is similar to the system 100'' of FIG. 6C including the elements 105a, 105b with the exception of the features discussed herein. In an embodiment, unlike the elements 105a, 105b of FIG. 6C with a single heating element 106a, 106b along the inner surface of each respective element 105a, 105b, the elements 105a', 105b' each includes a pair of spaced apart heating elements. In one embodiment, the inner surface of the element 105a' includes a pair of spaced apart heating elements 106a'', with a spacing 179 and the inner surface of the element 105b' includes a pair of spaced apart heating elements 106b'' with the spacing 179. In an example embodiment, the spacing 179 is about ¼" or in a range from about ⅛" to about 1". Although FIG. 9A depicts a pair of spaced apart heating elements along the inner surface of each element, in other embodiments, more than two spaced apart heating elements are provided along the inner surface of each element. In some embodiments, the slots 112', 140' are excluded, e.g. where the cutting element 111 is not included.

Figure 9B:
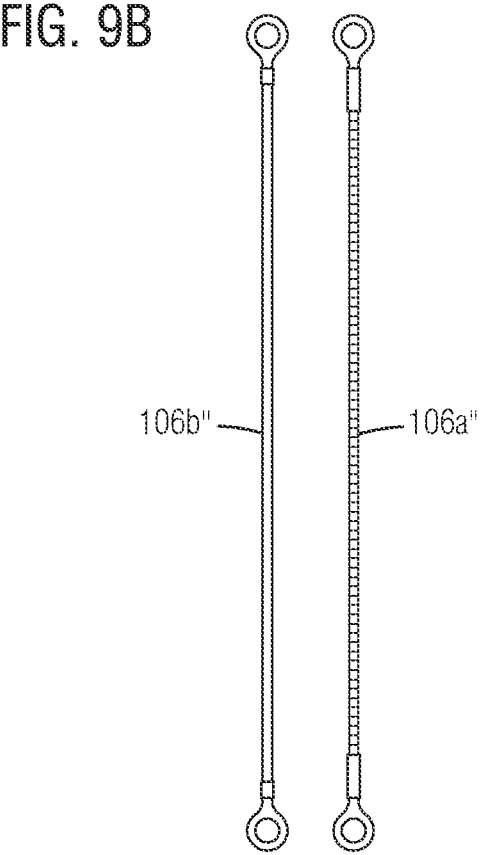
FIG. 9B is an image that illustrates an example of the heating elements of the system of FIG. 9A, according to an embodiment.

FIG. 9B is an image that illustrates an example of the heating elements 106a'', 106b'' of the system 100''' of FIG. 9A, according to an embodiment. In an embodiment, the heating element 106b'' is a flat planar surface and the heating element 106a'' is a non-planar surface (e.g. wire or metal link chain, etc.) that is configured to form a perforated seal when the heating elements 106a'' of the top and bottom elements 105a', 105b' are brought to the closed position. In still other embodiments each pair of spaced apart heating elements 106a'', 106b'' includes one flat planar surface and one non-planar surface. In one embodiment, the non-planar surface is configured to form perforations in the seal along the plastic enclosure, so to accommodate a user manually tearing along one of the pair of seals formed by the non-planar heating elements on the two elements 105a', 105b'.

Figure 9C:
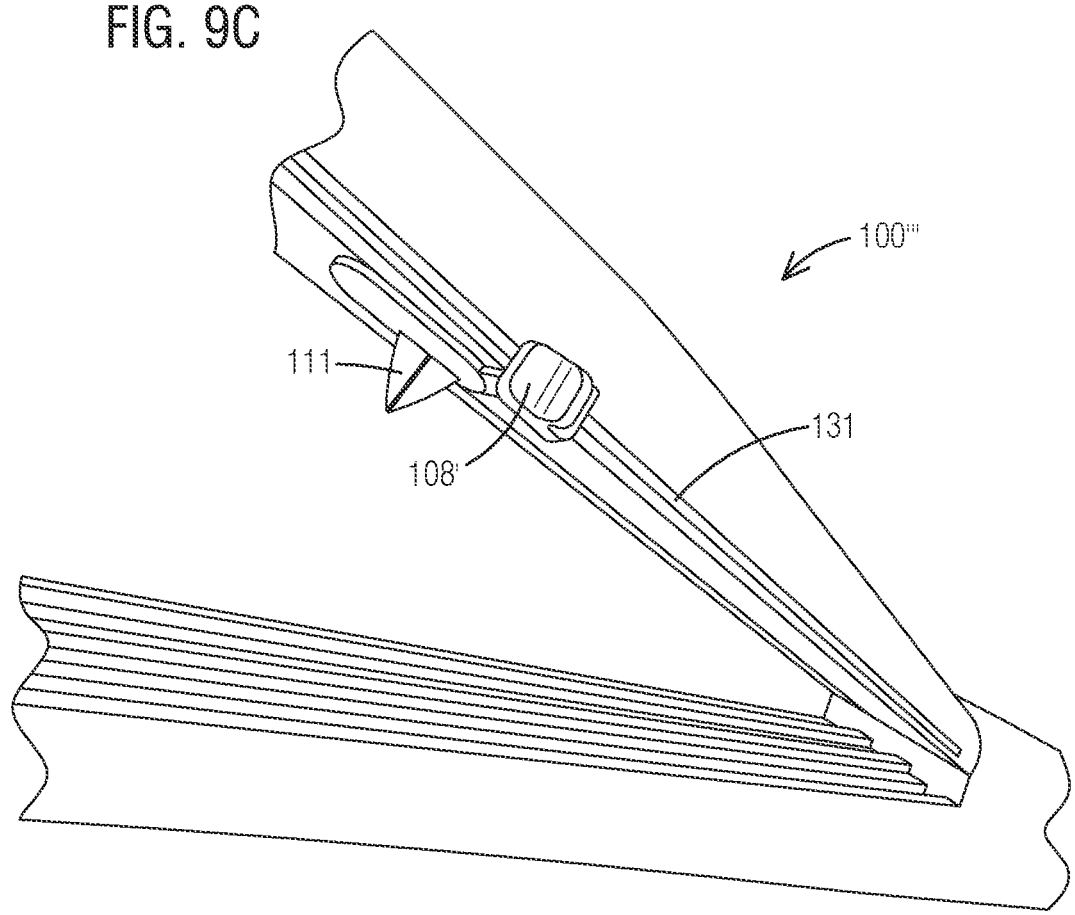
FIG. 9C is an image that illustrates an example of a side perspective view of the elements of the system of FIG. 9A, according to an embodiment.
Figure 9D:
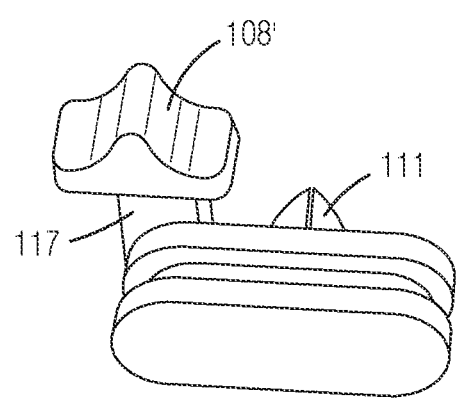
FIG. 9D is an image that illustrates an example of a button and cutting element of the system of FIG. 9C, according to an embodiment.

FIG. 9C is an image that illustrates an example of a side perspective view of the elements of the system 100''' of FIG. 9A, according to an embodiment. In an embodiment, the cutting element 111 is slidably mounted to the upper element 105a' using a button 108' that differs from the button 108 of FIG. 8A since the button 108' is along a side of the upper element 105a'. The inventor of the present invention recognized that positioning of the button 108' along the side of the upper element 105a' conveniently permits additional interior volume within the upper element 105a' to be used to house other components of the system, e.g. electronics such as the heating elements and/or wiring to the heating elements. FIG. 9D is an image that illustrates an example of the button 108' and cutting element 111 of the system 100''' of FIG. 9C, according to an embodiment. In an embodiment, a neck 117 connects the button 108' with the cutting element 111 and the neck 117 is slidably received within a slot 131 positioned along a side of the upper element 105a'. In an example embodiment, the button 108' and the cutting element 111 forms an L-shape so to accommodate the button 108' being slidably received along the side of the upper element 105a'.

Figure 9E:
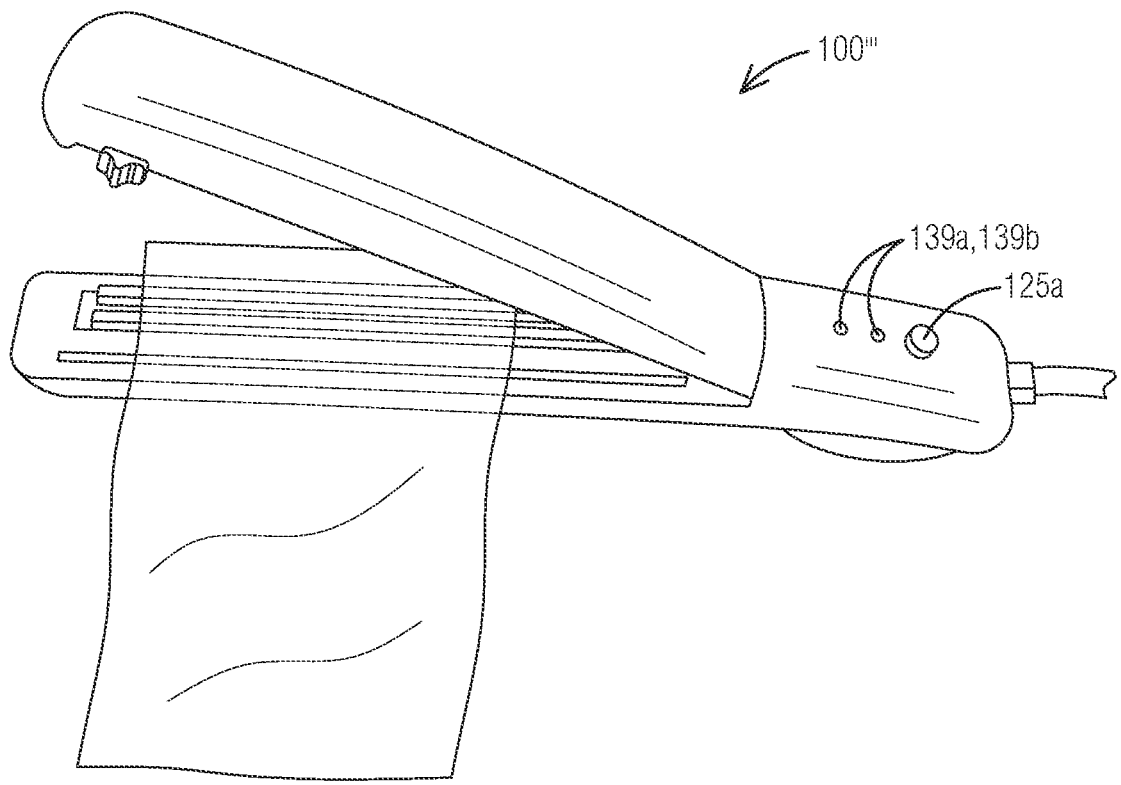
FIGS. 9E-9G are images that illustrate an example of top perspective views of the system of FIG. 9C, according to an embodiment.
Figure 9F:
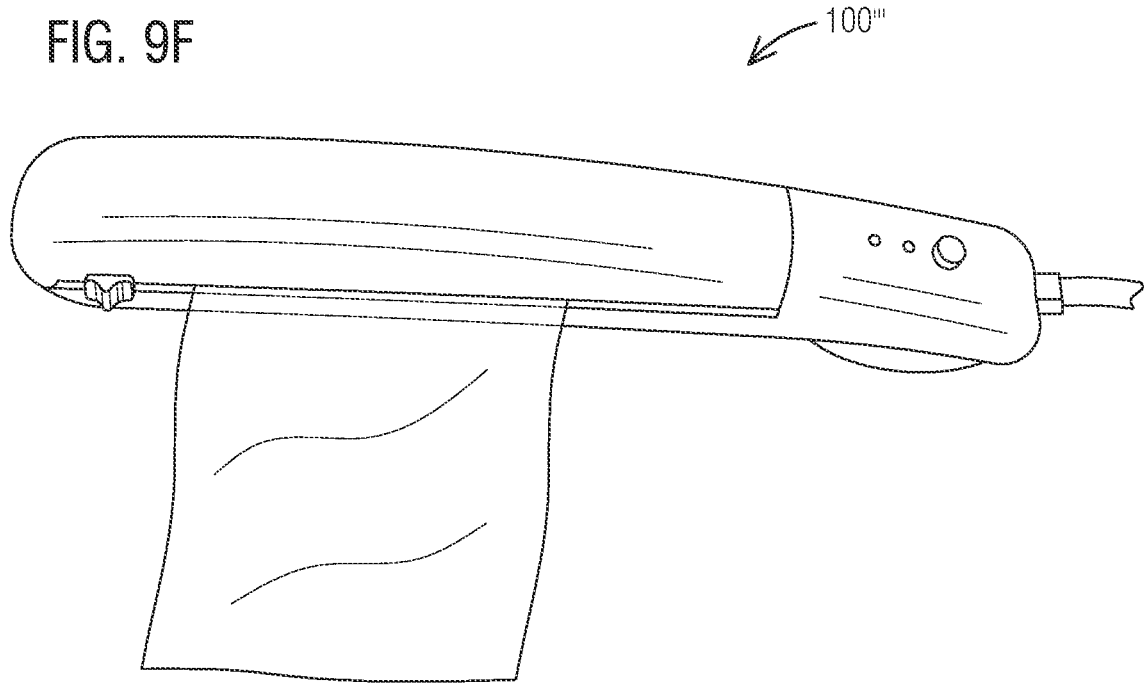
Figure 9G:
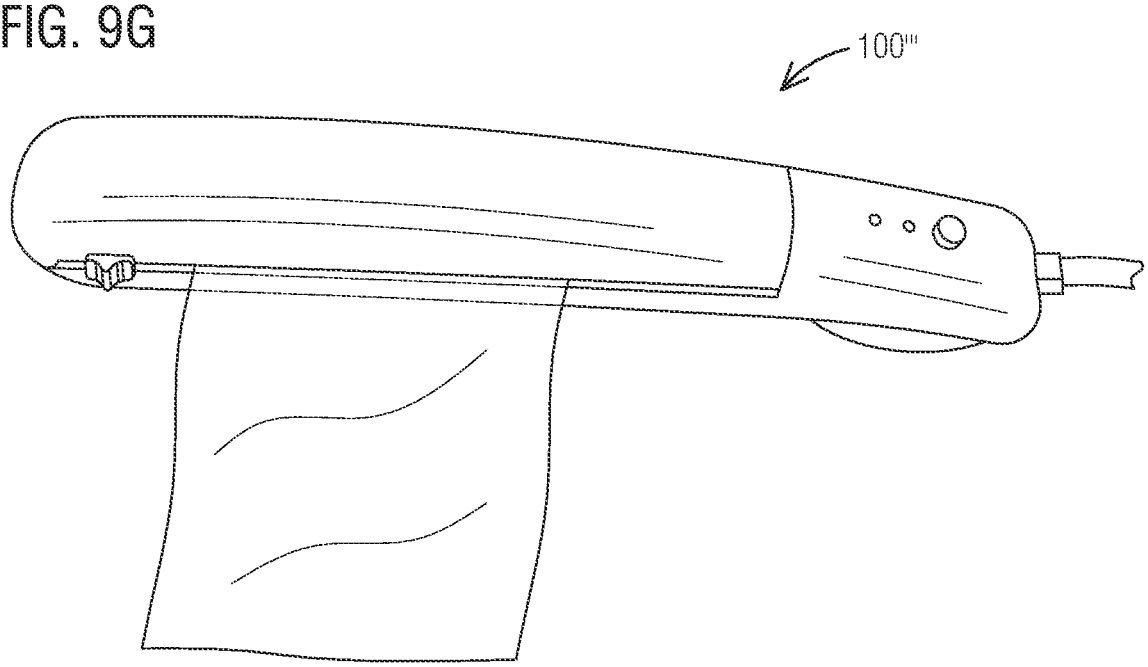

FIGS. 9E-9G are images that illustrate an example of top perspective views of the system 100''' of FIG. 9C, according to an embodiment. In one embodiment, the system 100''' includes the elements 105a', 105b' and the spaced apart heating elements 106a'', 106b'' along the inner surface of each element 105a', 105b'. In another embodiment, the system 100' also includes one or more components to provide a vacuum seal to the plastic enclosure simultaneous to or prior to the spaced apart seals that are formed by the spaced apart heating elements 106a'', 106b''. Although the vacuum seal feature is discussed with respect to the system 100''', the vacuum seal feature can be employed with any of the systems discussed herein.

Figure 9H:
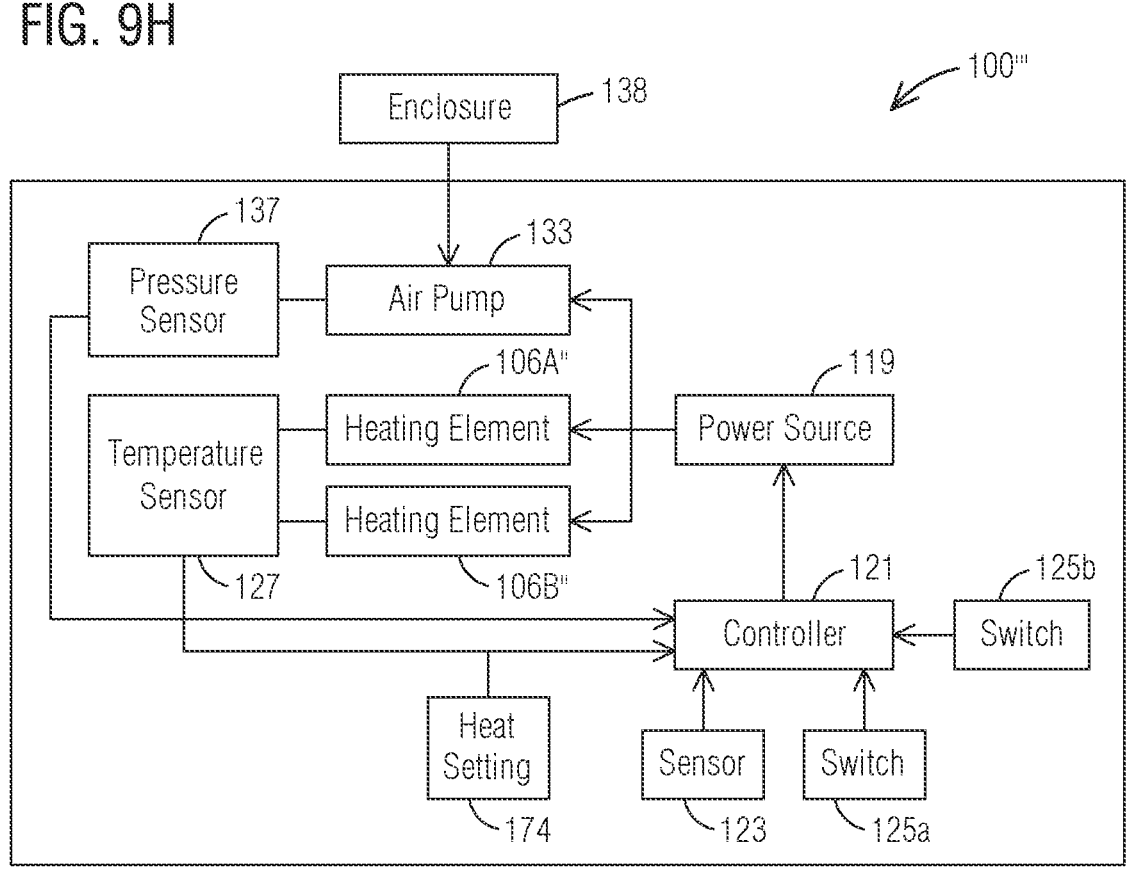
FIG. 9H is a block diagram that illustrates an example of electrical connections between the heating elements and the power source within the system of FIGS. 9E-9G, according to an embodiment.

FIG. 9H is a block diagram that illustrates an example of electrical connections between the heating elements 106a'', 106b'' and the power source 119 within the system 100''' of FIGS. 9E-9G, according to an embodiment. In an embodiment, the system 100''' is capable of forming a vacuum seal (e.g. the pair of spaced apart seals with the heating elements 106a'', 106b'' after removing air from the enclosure) or just a regular seal without the vacuum seal (e.g. with the pair of spaced apart heating elements 106a'', 106b'').

In an embodiment, to form the spaced apart seals with the heating elements 106a'', 106b'', the user presses the switch 125*a* until the light 139*a* flashes. This prompts the user to place the plastic material between the elements 105*a*', 105*b*' and close the elements 105*a*', 105*b*' after which the sensor 123 detects that the elements 105*a*', 105*b*' are in the closed position and sends a signal to the controller 121 which causes the light 139*a* to stop flashing and remain solid. In an embodiment, the controller 121 then operates in a similar manner as discussed above with respect to FIG. 5H except that the power source 119 heats the pair of spaced apart heating elements 106*a*" on the top element 105*a*' and the pair of spaced apart heating elements 106*b*" on the bottom element 105*b*'. As a result, a pair of spaced apart seals 301" (FIG. 10A) are formed in the plastic material with a spacing 179 between them that is the same as the spacing 179 between the heating elements 106*a*", 106*b*".

In an embodiment, to form the vacuum seal with the system 100''', in one embodiment the user presses the switch 125*a* until the light 139*b* flashes. This prompts the user to place the plastic material between the elements 105*a*', 105*b*' (e.g. so that an opening of the plastic material is in flow communication with the air pump 133) and close the elements 105*a*', 105*b*' after which the sensor 123 detects that the elements 105*a*', 105*b*' are in the closed position and sends a signal to the controller 121 which causes the light 139*b* to stop flashing and remain solid. In an embodiment, the controller 121 then transmits a signal to the power source 119 which in turn transmits a signal to an air pump 133 to remove air from the opening of the plastic enclosure 138 placed in flow communication with an inlet of the air pump 133 and/or placed between the elements 105*a*' 105*b*'. As the air pump 133 removes air from the enclosure 138, a pressure sensor 137 monitors the pressure within the enclosure 138 (or pressure of air withdrawn from the enclosure 138 by the pump 133) and once the pressure lowers to a threshold level (e.g. between about 5 and 50 millibars) the pressure sensor 137 transmits a signal to the controller 121 so that the power source 119 stops sending power to the air pump 133. In other embodiments, a second switch 125*b* is positioned on the system 100''' (e.g. on an opposite end of the element 105*a*' as the switch 125*a*) and the user can manually press the switch 125*b* to manually stop the removal of air from the enclosure. In an example embodiment, if the user is vacuum sealing an enclosure with liquid, the user orients the enclosure or bag vertically and uses the hand held system 100''' to commence the vacuum seal, e.g. the pump 133 starts to draw air from the enclosure. Upon visually observing that the liquid in the enclosure starts to rise in the enclosure and/or upon visually confirming that the region of the enclosure 138 not occupied by liquid has the air removed, the user can manually press the switch 125*b* to stop the pump 133 so that the system 100''' does not unintentionally continue to remove the liquids from the enclosure. In yet another embodiment, any vacuum sealing technology known to one of ordinary skill in the art can be employed in the system 100''' to form the vacuum seal. In an embodiment, after removing air from the enclosure, the controller 121 transmits a signal to the power source 119 so that the heating elements 106*a*",106*b*" are heated to form the spaced apart seals 301" (FIG. 10A) along the plastic enclosure in a similar manner as discussed above and in connection with the seal formed in respect to FIG. 5H.

Figure 10A:
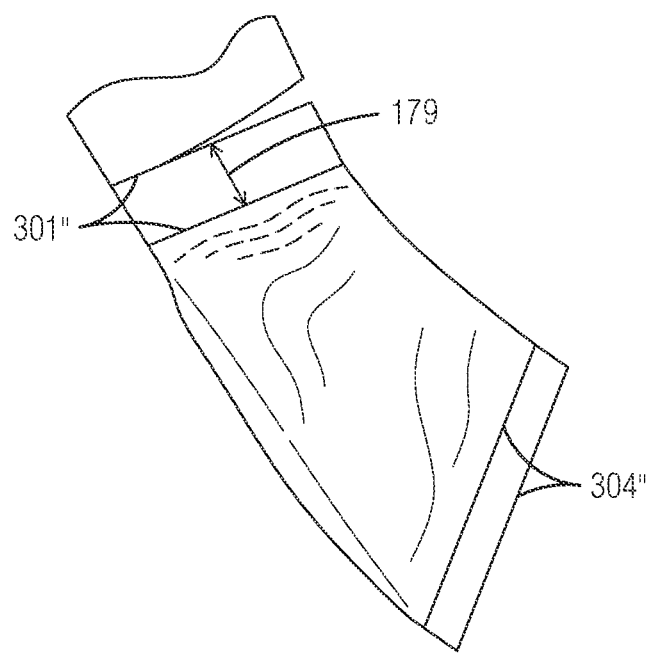
FIG. 10A is an image that illustrates an example of a side view of an enclosure of plastic material including a pair of spaced apart first seals and pair of spaced apart second seals, according to an embodiment.

FIG. 10A is an image that illustrates an example of a side view of an enclosure of plastic material including a pair of spaced apart first seals 301" and pair of spaced apart second seals 304", according to an embodiment. In one embodiment, the contents of the enclosure is liquid. In an embodiment, the system 100''' is used to form a vacuum seal along the first seals 301", where the enclosure is held in a vertical orientation and the hand held system 100''' is closed at the interface along an open top of the enclosure. In this embodiment, the user manually presses the switch 125*b* when the user visually observes the liquid starting to rise after air has been removed from the enclosure, after which the first seals 301" are formed along the interface along the top of the enclosure. In another embodiment, the system 100''' is used to form the first seals 301" along the interface at the top of the enclosure as the user holds the enclosure in a vertical orientation, without the vacuum seal. In an embodiment, the spaced apart seals 301" are formed by the pair of spaced apart heating elements 106*a*", 106*b*" along the inner surface of the elements 105*a*', 105*b*' of the system 100'''. As depicted in FIG. 10A, the spacing 179 is provided between the spaced apart seals 301" where the spacing 179 is the same as the spacing 179 between the spaced apart heating elements 106*a*", 106*b*". The inventor of the present invention recognized that the spacing 179 conveniently permits the user to visually confirm that the first seals 301" are properly formed, since no contents (e.g. liquid) is observed in the gap between the first seals 301" defined by the spacing 179. In an embodiment an inner seal 301" is a primary seal and is most proximate to the contents of the enclosure. The absence of contents within the spacing 179 advantageously serves as visual confirmation that the primary seal 301" is properly formed.

Figure 10B:
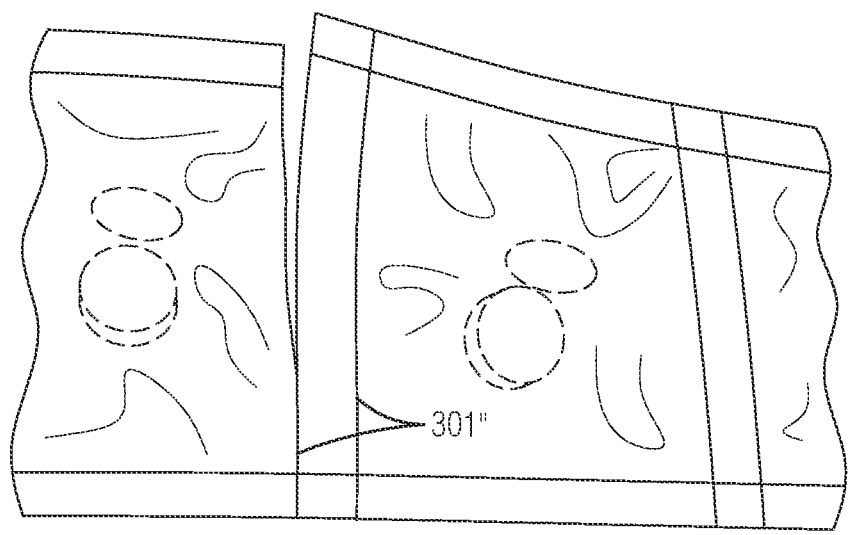
FIG. 10B is an image that illustrates an example of a front plan view of an enclosure of plastic material including a pair of spaced apart first seals and pair of spaced apart second seals, according to an embodiment.

FIG. 10B is an image that illustrates an example of a front plan view of an enclosure of plastic material including a pair of spaced apart first seals 301" and pair of spaced apart second seals, according to an embodiment. In an embodiment the contents of the enclosure are nonperishable (e.g. vitamins) and thus in one embodiment, the first seals 301" are formed using the system 100''' without the vacuum seal.

Figure 10C:
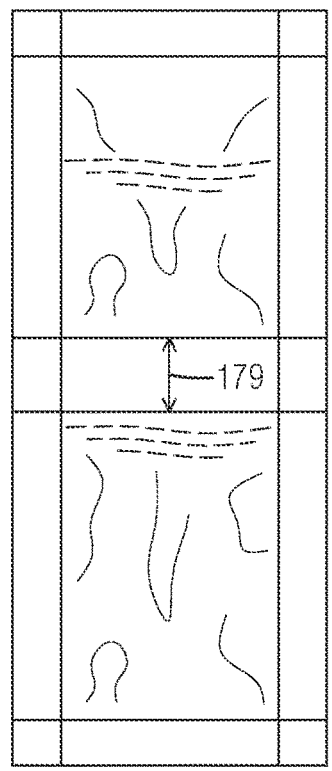
FIG. 10C is an image that illustrates an example of a front plan view of an enclosure of plastic material including a pair of spaced apart first seals and pair of spaced apart second seals with a spacing therebetween, according to an embodiment.
Figure 10D:
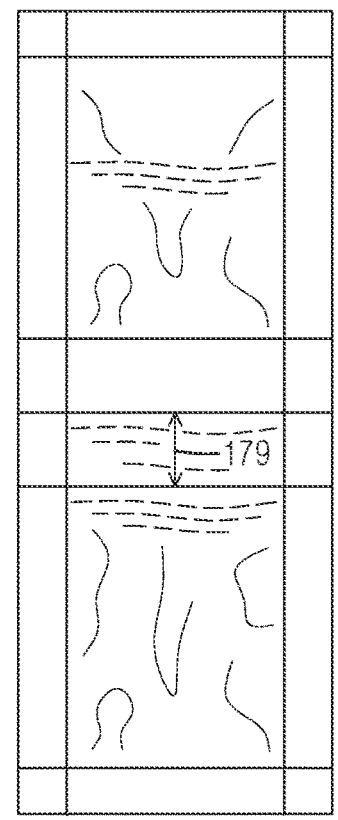
FIG. 10D is an image that illustrates an example of the spacing of FIG. 10C with liquid after squeezing liquid in the enclosure, according to an embodiment.

FIG. 10C is an image that illustrates an example of a front plan view of an enclosure of plastic material including a pair of spaced apart first seals 301" and pair of spaced apart second seals 304" with a spacing 179 therebetween, according to an embodiment. In an embodiment, the user can test the first seals 301" and/or second seals 304" by squeezing the contents (e.g. liquid) within the enclosure. As depicted in FIG. 10C the user is squeezing the contents (e.g. liquid) within the enclosure bounded by the first seals 301". As previously discussed, the user advantageously can confirm that the seals 301" are properly formed by an absence of the contents (e.g. liquid) within the gap defined by the spacing 179. FIG. 10D is an image that illustrates an example of the spacing 179 of FIG. 10C with liquid after squeezing liquid in the enclosure, according to an embodiment. As depicted in FIG. 10D, after squeezing the contents of the liquid in the enclosure, some of the liquid has seeped through the first seals 301" and into the gap defined by the spacing 179. In this embodiment, the visual confirmation that the contents are within the gap defined by the spacing 179 advantageously permit the user to pick up the hand held system 100''' are re-seal the first seals 301''' so to ensure that the contents in one enclosure does not leak into an adjacent enclosure.

Figure 10E:
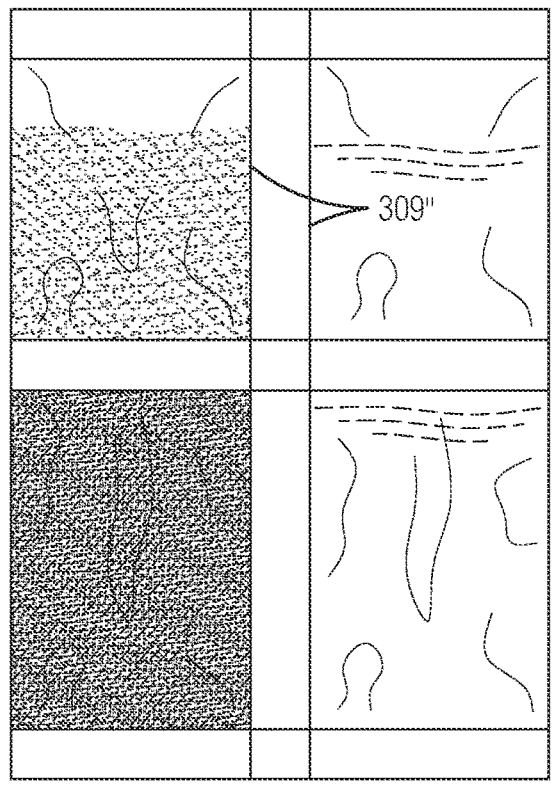
FIG. 10E is an image that illustrates an example of a front plan view of an enclosure of plastic material including a pair of spaced apart interior seals to form a plurality of interior enclosures within the enclosure, according to an embodiment.

FIG. 10E is an image that illustrates an example of a front plan view of an enclosure of plastic material including a pair of spaced apart interior seals 309" to form a plurality of interior enclosures within the enclosure, according to an embodiment. The interior seals 309" are similar to the interior seal 309 discussed previously with the exception that the interior seals 309" are spaced apart seals formed by the system 100''' and thus advantageously provide visual confirmation to the user that the seals are properly confirmed between adjacent enclosures based on the absence of contents in a gap defined by the spacing 179 between the interior seals 309". As further depicted in FIG. 10E, in one embodiment, some of the enclosures (e.g. left side of FIG. 10E) include nonperishable items and thus the spaced apart interior seals 309" and first seals 301" formed with the system 100''' may not include the vacuum seal. In other embodiments, as depicted in FIG. 10E, in one embodiment, some of the enclosures (e.g. right side of FIG. 10E) include perishable items (e.g. liquid) and thus the spaced apart interior seals 309" and first seals 301" formed with the system 100''' may include the vacuum seal so that air is removed from some of the enclosures defined by the interior enclosures 309" meanwhile air is not removed from other enclosures defined by the interior enclosures 309".

Figure 10F:
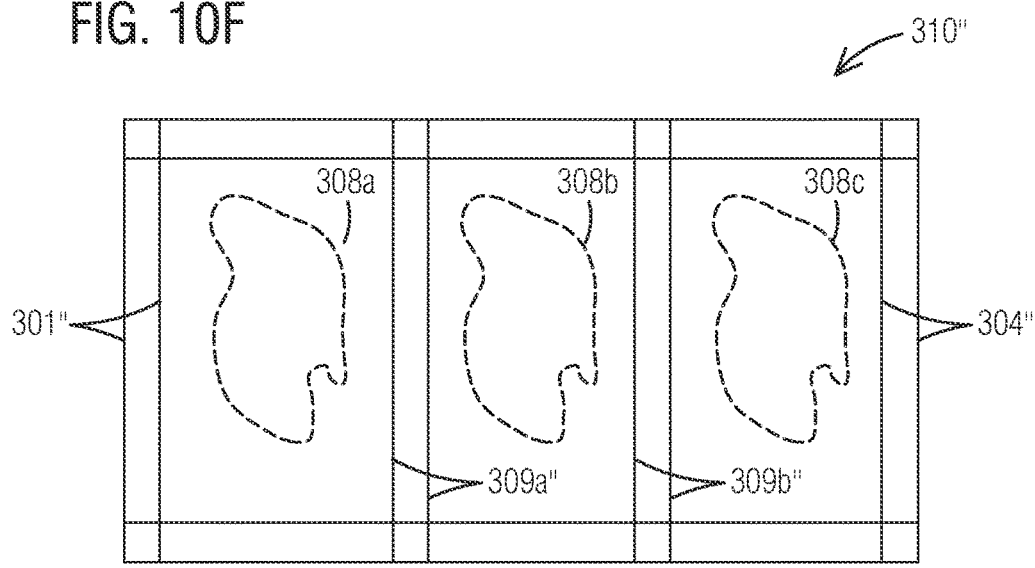
FIG. 10F is a block diagram that illustrates an example of a top view of the enclosure of the plastic material including spaced apart interior seals between the first seal and the second seal, according to an embodiment.

FIG. 10F is a block diagram that illustrates an example of a top view of the enclosure of the plastic material including spaced apart interior seals 309a", 309b" between the first seal and the second seal, according to an embodiment. The spaced apart interior seals 309a", 309b" are similar to the interior seals 309a, 309b of FIG. 3G with the exception that the interior seals 309a", 309b" are spaced apart and are formed with the system 100'''. In yet another embodiment, the interior spaced apart seals 309a", 309b" are vacuum sealed so that the contents 308a, 308b, 308c (e.g. individual chicken breasts) can be individually packaged and individually vacuum sealed. The inventor recognized that this advantageously permits the user to individually vacuum seal contents by hand after which the user can then individually access one contents 308 (e.g. one chicken breast) without opening more than one of the enclosures which is common in conventional vacuum sealers.

Figure 10G:
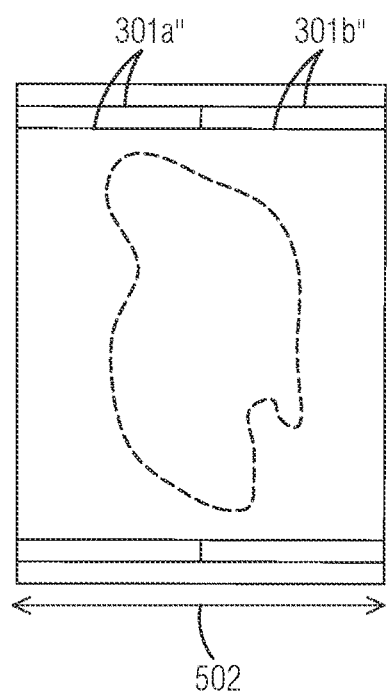
FIG. 10G is a block diagram that illustrates an example of a top view of the enclosure of the plastic material including spaced apart seals along a first width of the enclosure and spaced apart seals along a second width of the enclosure, according to an embodiment.

FIG. 10G is a block diagram that illustrates an example of a top view of the enclosure of the plastic material including spaced apart seals 301a" along a first width of the enclosure and spaced apart seals 301b" along a second width of the enclosure, according to an embodiment. In an embodiment, the enclosure (e.g. bag) has a width 502 that is greater than a length of the heating elements 106a", 106b" and thus the heating elements 106a" 106b" cannot form a continuous seal across the entire width of the enclosure. In this embodiment, the hand held system 100''' is used to form the spaced apart seals 301a" (e.g. without vacuum seal) along a first portion of the width 502 of the enclosure. In this embodiment, the user then takes the system 100''' and rotates it 180 degrees so that the elements 105a', 105b' can then be closed along a second portion of the width 502 to form the spaced apart seals 301b". In one embodiment, where the user desires to vacuum seal the enclosure, the system 100''' is used to vacuum seal the enclosure when forming the spaced apart seals 301b", during which the entire enclosure is vacuum sealed. This advantageously permits the user to vacuum seal the entire enclosure while simultaneously only sealing a portion of the width of the enclosure, after having already sealed a remaining portion of the enclosure.

Figure 11A:
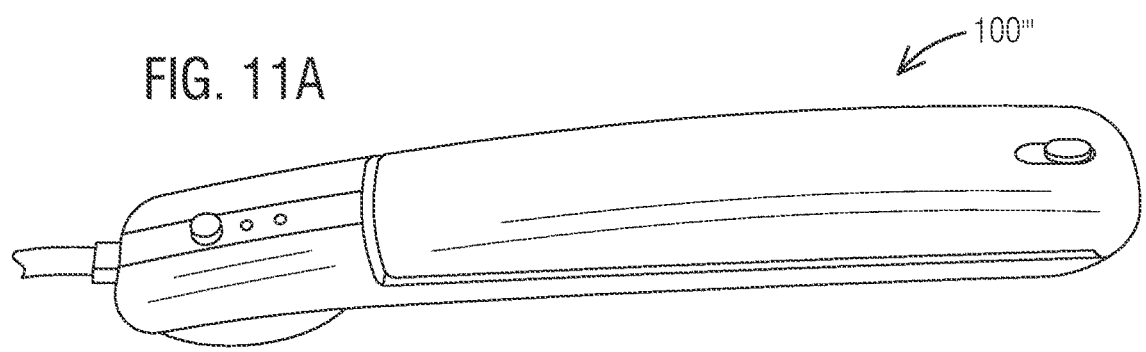
FIGS. 11A-11G are images that illustrate an example of various views of a system for sealing an enclosure of plastic material, according to an embodiment.
Figure 11B:
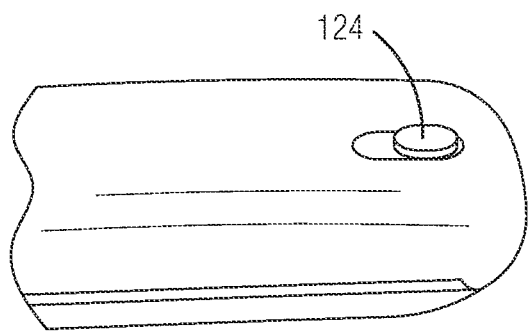

FIGS. 11A-11G are images that illustrate an example of various views of a system for sealing an enclosure of plastic material, according to an embodiment. In an embodiment, the system 100''' of FIG. 11A is similar to the system 100''' of FIGS. 9E-9F with the exception of the features discussed herein. In one embodiment, the system 100''' features a locking mechanism 124 on an outer surface of an upper element 105a'. In an example embodiment, the locking mechanism 124 is used to lock the system 100''' in a closed position (FIG. 11A). In an example embodiment, the locking mechanism 124 is a button that is slidable within a slot such that upon sliding the button within the slot, a hook (not shown) on an inside surface of the upper element 105a' engages a latch (not shown) on an inside surface of the lower element 105b' so that the engagement of the hook and the latch maintains the system 100''' in the closed position (FIG. 11A). In an example embodiment, in order to open the system 100''' to an open position (FIG. 11C), the button of the locking mechanism 124 is slid within the slot so that the hook disengages the latch so that the upper element 105a' can be rotated relative to the lower element 105b'.

Figure 11C:
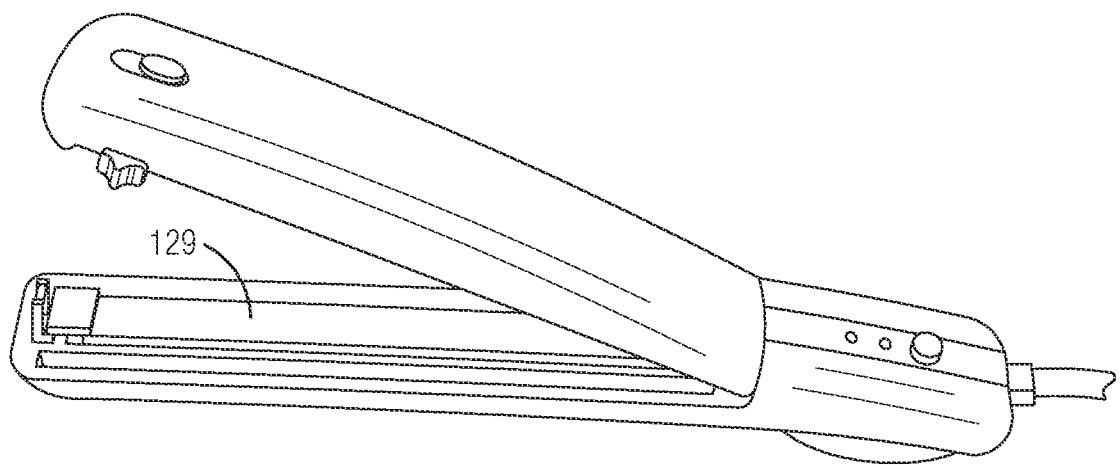
Figure 11D:
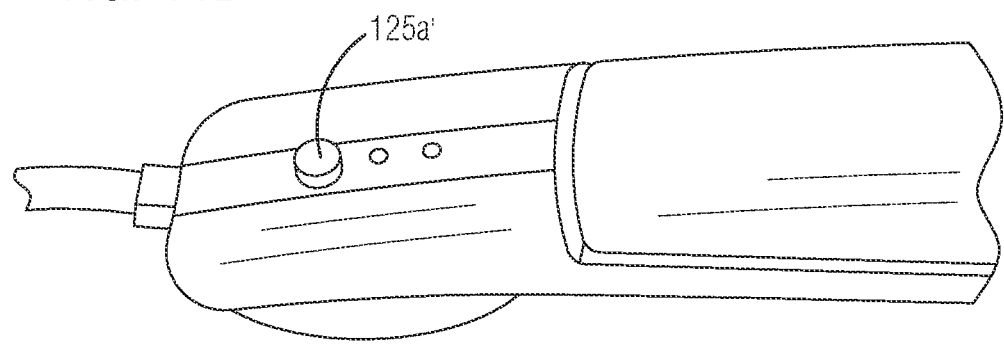
Figure 11E:
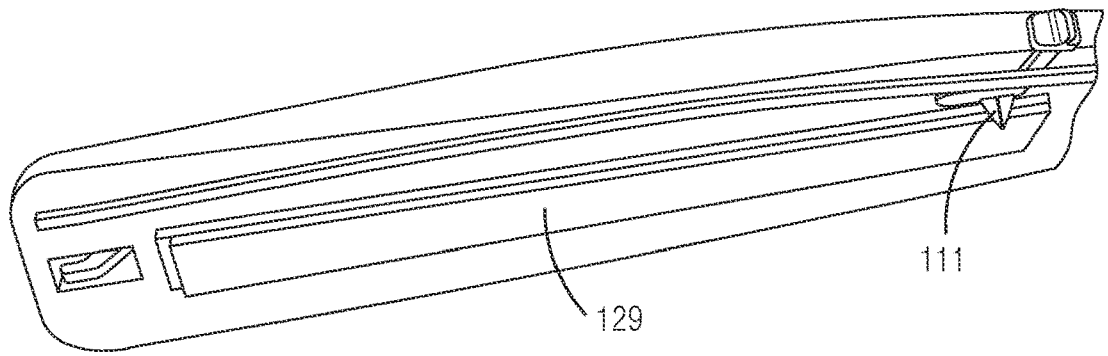
Figure 11F:
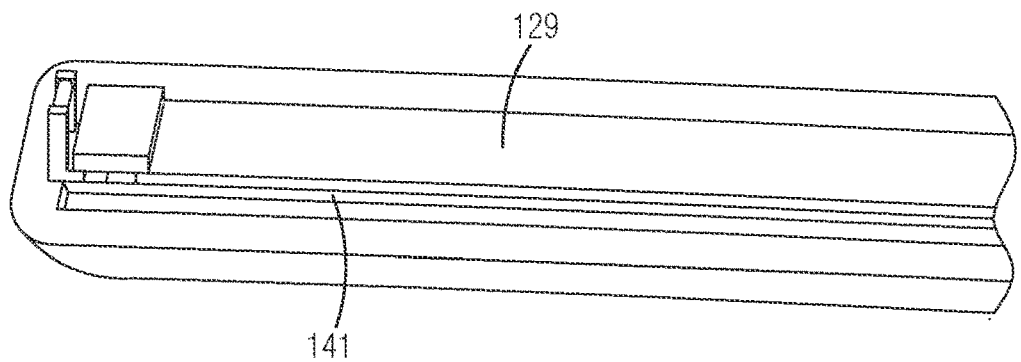
Figure 11G:
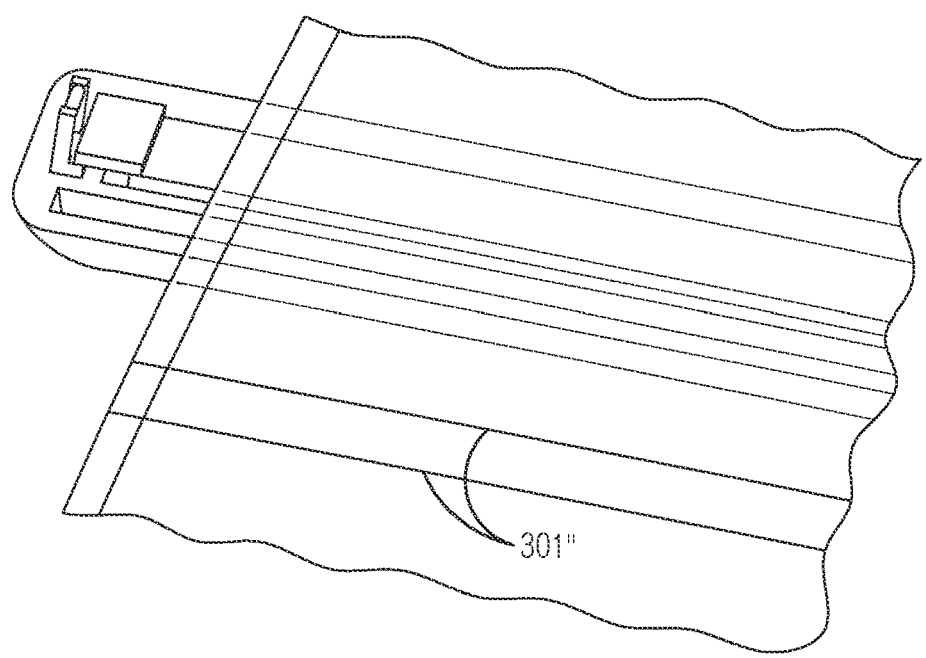

In an embodiment, unlike the system 100''' of FIG. 9A where the heating elements 106a", 106b" are exposed along the inner surfaces of the elements 105a', 105b', in the embodiment of FIG. 11C a silicon strip 129 is placed over both of the heating elements 106a", 106b" (e.g. the heating elements 106a", 106b" remain spaced apart below the silicon strip 129). In an embodiment, FIG. 11F depicts that the silicon strip 129 is mounted on a heating element base 141 which contains the spaced apart heating elements 106a", 106b". Although FIG. 11C depicts a silicon strip 129, in other embodiments a strip of any material can be used, provided that the material does not melt or burn based on the range of temperature of the heating elements 106a", 106b" and is relatively soft so to enhance the dual seal. The inventor recognized that the silicon material of the strip 129 is advantageous since it is relatively soft and enhances the quality of the spaced apart seals on the plastic material.

Figure 11H:
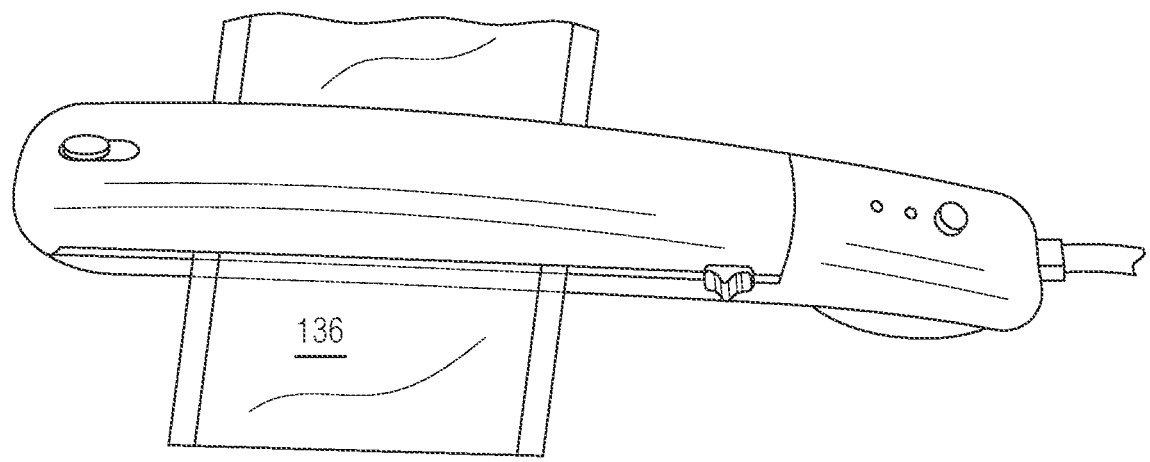
Figure 11I:
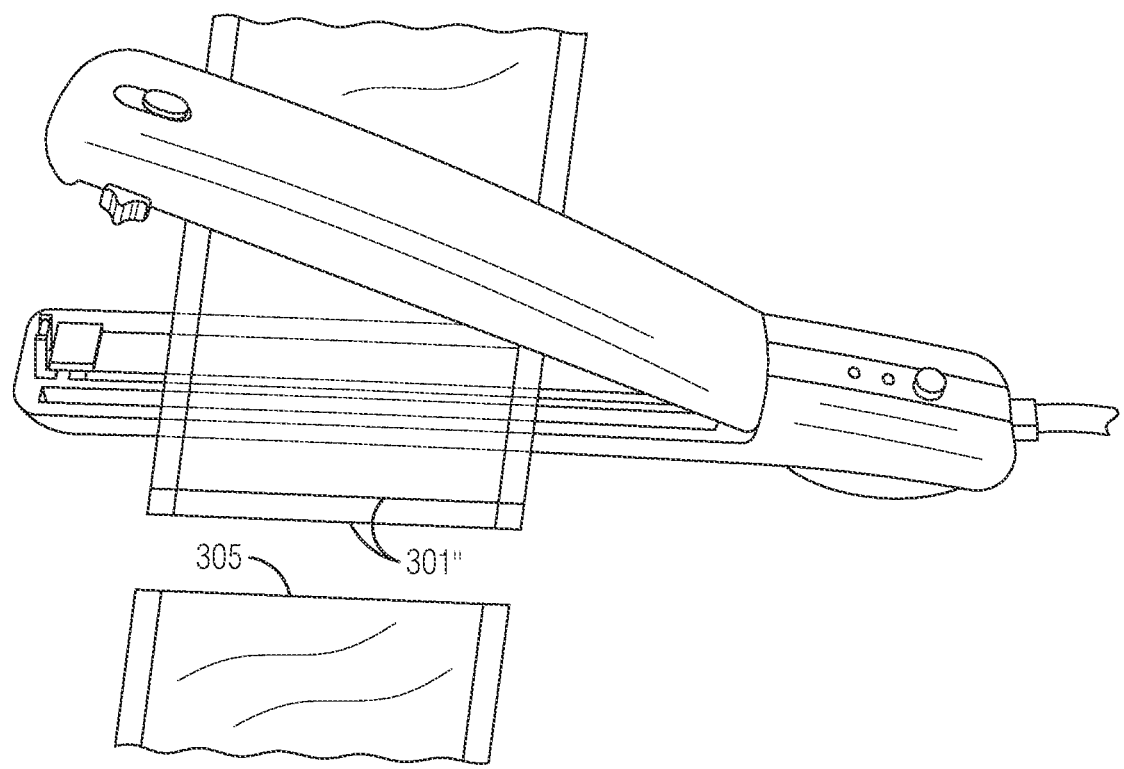

FIGS. 11H-11M are images that illustrate an example of various views of the system 100''' of FIG. 11A being used to seal contents within an enclosure, according to an embodiment. In a first step, the plastic material 136 is positioned between the elements 105a', 105b' of the system 100''' and the system 100''' is moved to the closed position (FIG. 11H). The heating elements 106a", 106b" form spaced apart seals 301" (FIG. 11I) in the plastic material 136 (e.g. which forms a base of the next bag to be filled) and the cutting element 111 is slid across the system 100''' to form the opening 305 in the current bag that is to be filled and sealed. In the next step, contents 308 (e.g. cheese) is passed through the opening 305 and into the enclosure 138' (e.g. bag). The plastic material 136 at the opening 305 is then aligned with the heating elements 106a", 106b" and the system 100''' is moved to the closed position (FIG. 11K). The user then presses the switch 125a' which activates the heating elements 106a", 106b" to form the spaced apart seals 301" along the opening 305 (e.g. to close the opening 305 and seal the enclosure 138', as shown in FIG. 11M). In an embodiment, the system 100''' is used to form the spaced apart seals 301" and is not used to vacuum seal the enclosure 138'. In other embodiments, the system 100''' can be configured to vacuum seal the enclosure 138' (e.g. by including an air pump 133).

FIGS. 12A-12L are images that illustrate an example of various views of a system 100''' for sealing an enclosure of plastic material, according to an embodiment. In an embodiment, the system 100''' of FIGS. 12A-12L is similar to the system 100''' of FIGS. 11A-11F with the exception of the features discussed herein. In an embodiment, the system 100''' features indicator lights 402a, 402b, 402c on a control panel on the outer surface of the upper element 105a'. In an embodiment, the first indicator light 402a has a first color (e.g. red) and is illuminated when the system 100''' is connected to an external power source and the battery (discussed below) is being actively charged. In an embodiment, the second indicator light 402b has a second color (e.g. blue) and blinks when the spaced apart seals 301" are being formed and stops blinking when the seals 301" are formed. In an embodiment, the third indicator light 402c has a third color (e.g. green) and is illuminated when the battery is fully charged and turned on. In an embodiment, the control panel of FIG. 12B also features a switch 125a that is pressed to initiate the sealing of the plastic material (e.g. pushed after the system 100" is moved to the closed position and the plastic material is positioned between the heating elements 106a", 106b") and/or a switch 144 (which is used to open/close the system 100''' in a similar manner as the locking mechanism 124).

Figure 12E:
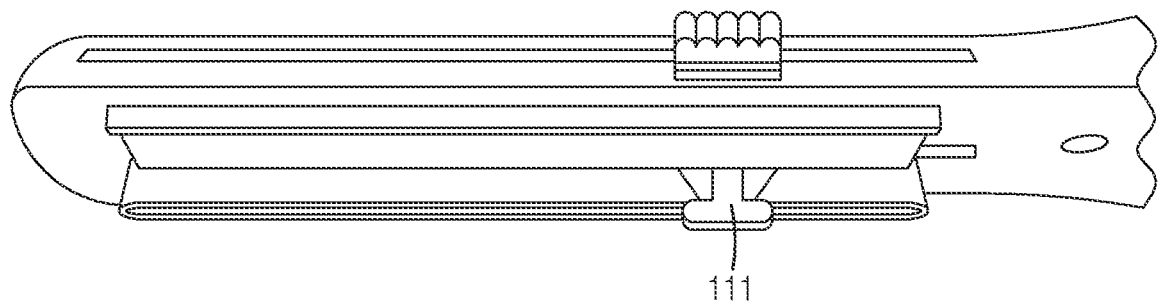

In another embodiment, FIG. 12E depicts the cutting element 111 (e.g. blade) that is actuated by sliding the button 108' (FIG. 12D) within the slot 131. In one embodiment, FIG. 12E depicts that the cutting element 111 features a T-shape where a wide base of the T-shape is slidably received in the slot 112' (FIG. 9A) in the lower element 105b'.

Figure 12F:
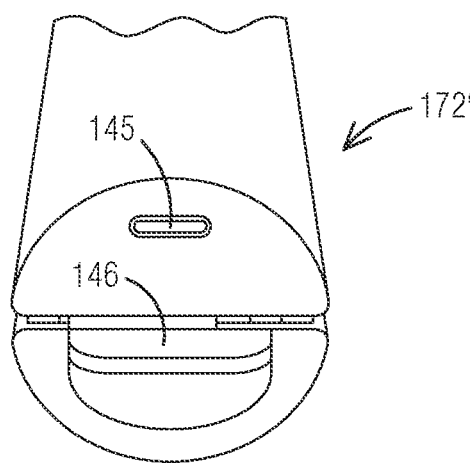

In another embodiment, FIG. 12F depicts a base 172' of the system 100'''. In one embodiment, the base 172' includes a port 145 (e.g. USB port) to connect with an external power source to power the heating elements 106a", 106b" and/or charge a battery. In another embodiment, the base 172' includes a twist lock 146 which is rotatable from a first position (FIG. 12F) where the switch is exposed beyond the base 172 and where the elements 105a' 105b' can be opened relative to each other to a second position (not shown) where the twist lock 146 slides into a slot and does not extend beyond the base 172' so that the system 100''' can be positioned upright on its base 172' on a flat surface (e.g. to be stored away).

Figure 12G:
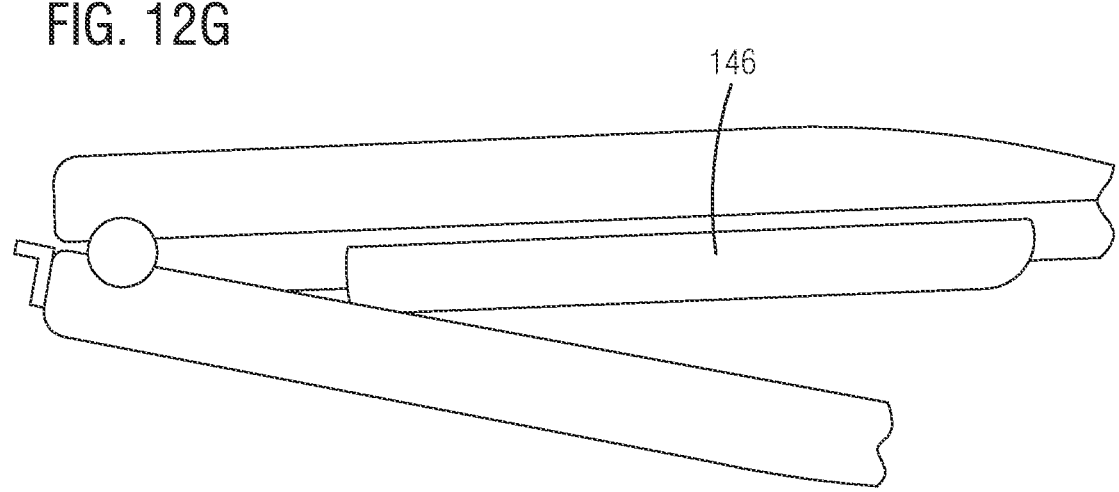

In another embodiment, FIG. 12G depicts a housing to hold a rechargeable battery 146 that is positioned along an inner surface of the upper element 105a' (e.g. adjacent the base 172' and/or defined by the inner surface of the upper element 105a' between the heating element 106a" and the base 172). In one example embodiment, the housing is removable so that the battery 146 can be replaced and/or repaired when needed (e.g. when the battery reaches the end of its life cycle, etc.).

Figure 12H:
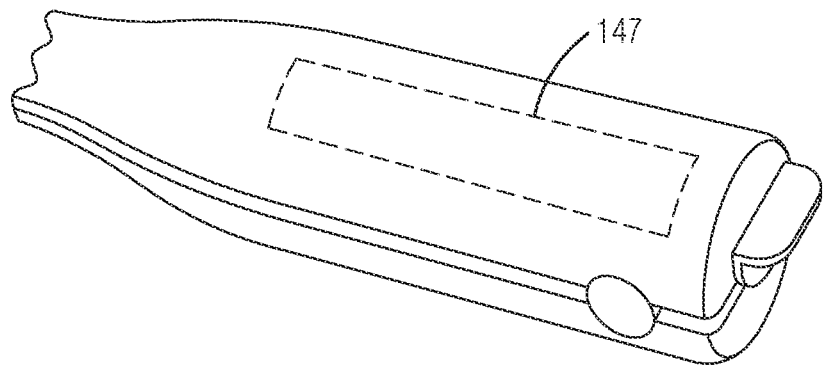
Figure 12I:
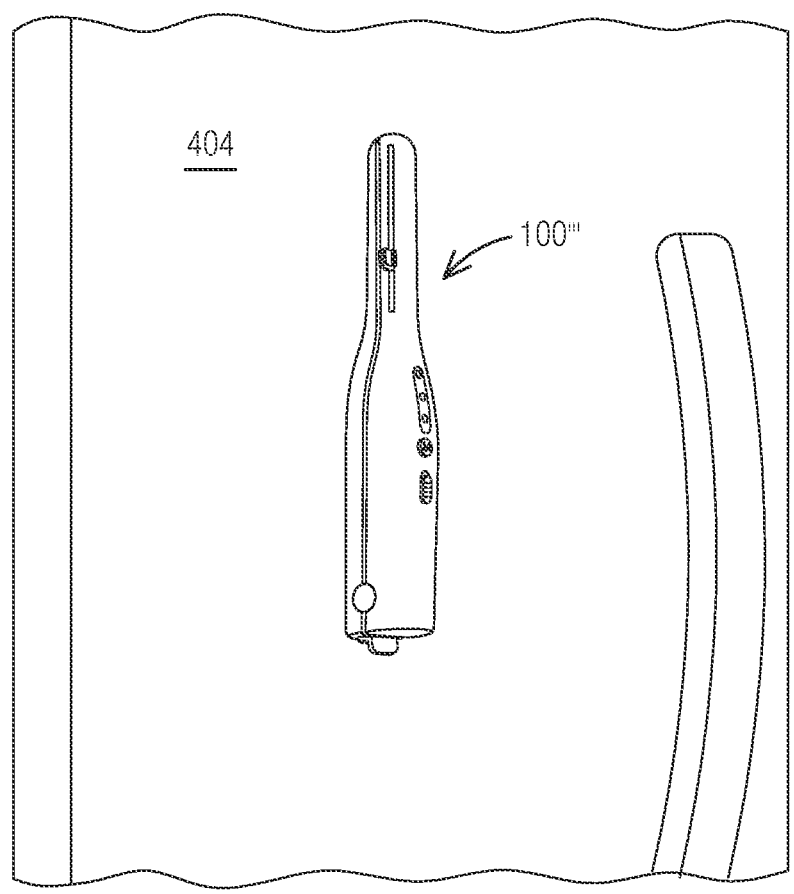

In another embodiment, FIG. 12H features that a magnet 147 is embedded within the lower element 105b' (e.g. adjacent the base 172' and/or between the heating element 106b" and the base 172'). The inventor recognized that the magnet 147 positioned within the lower element 105b' advantageously permits the system 100''' to be secured to a metallic surface (e.g. refrigerator 404 surface as shown in FIG. 12I).

Figure 12J:
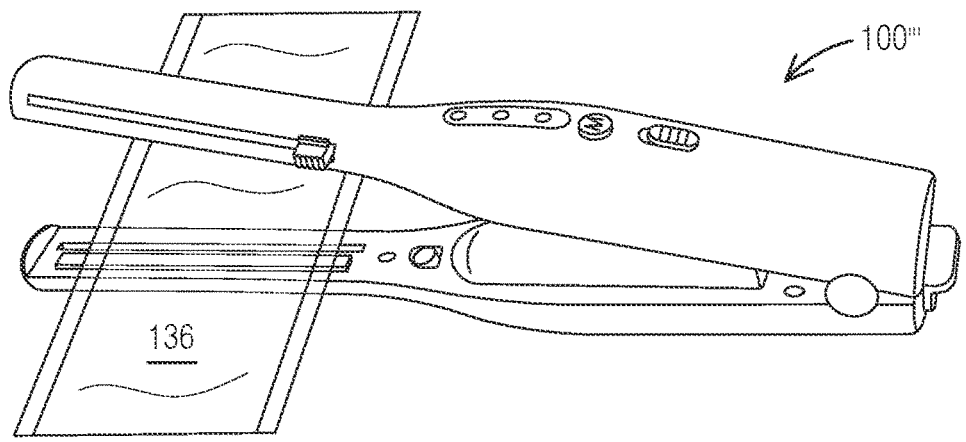
Figure 12K:
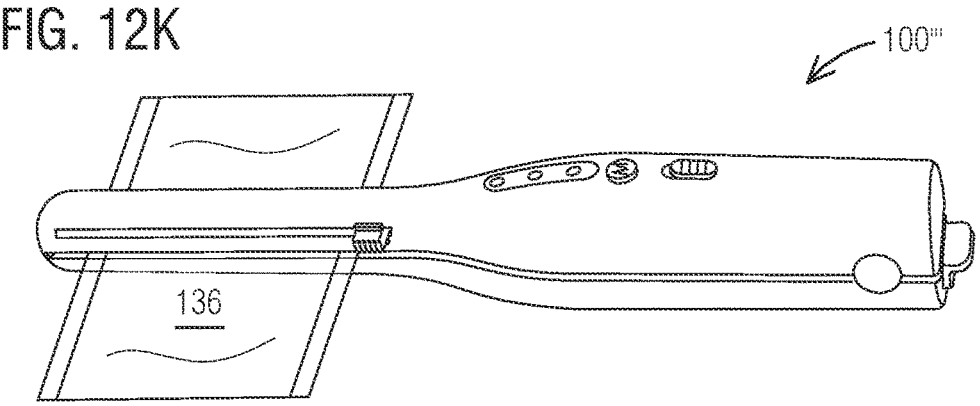
Figure 12L:
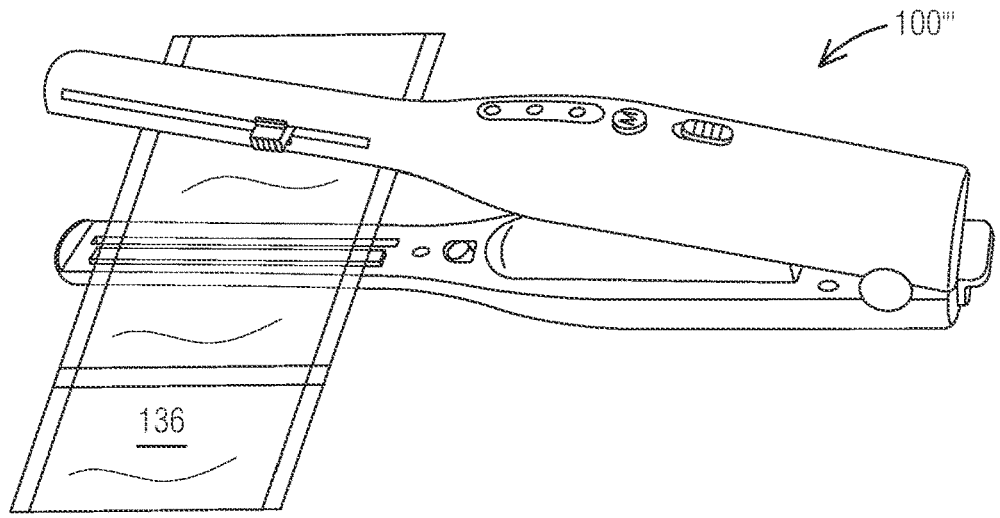

In another embodiment, FIGS. 12J-12L depict the system 100''' being used to form spaced apart seals 301" in the plastic material 136. In an embodiment, FIG. 12J depicts the plastic material 136 positioned between the heating elements 106a", 106b", after which the elements 105a', 105b' are closed and the switch 125a is pressed (FIG. 12K). In an example embodiment, FIG. 12K depicts that the indicator lights 402b, 402c are illuminated indicating that the heating elements 106a", 106b" are heated and the seals 301" are being formed. After the indicator light 402b stops flashing the elements 105a' 105b' are opened (FIG. 12L) to reveal the spaced apart seals 301" formed in the plastic material 136. In an embodiment, as with the system 100''' of FIG. 11A, the system 100''' of FIG. 12A forms the spaced apart seals 301" but does not vacuum seal the enclosure 138'. However, in other embodiments the system 100''' of FIG. 12A can be configured to form a vacuum seal within the enclosure 138' (e.g. by including an air pump 133 in the system 100''').

Figure 13A:
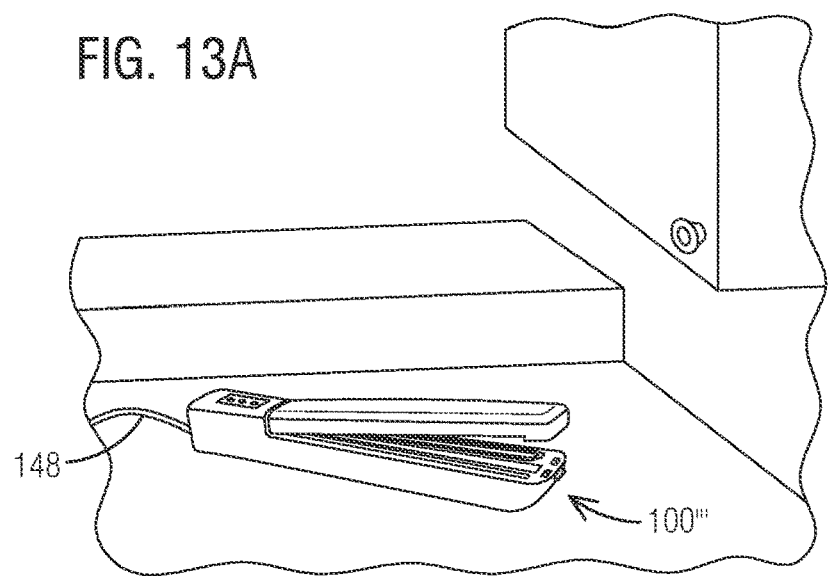
Figure 13C:
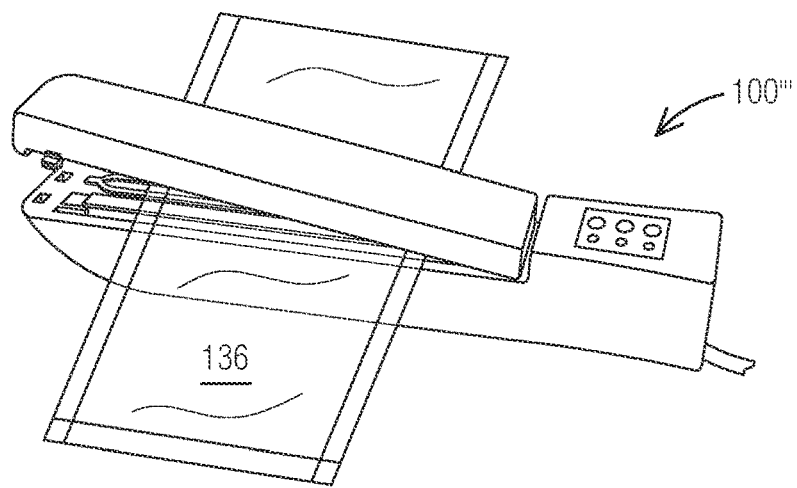
Figure 13B:
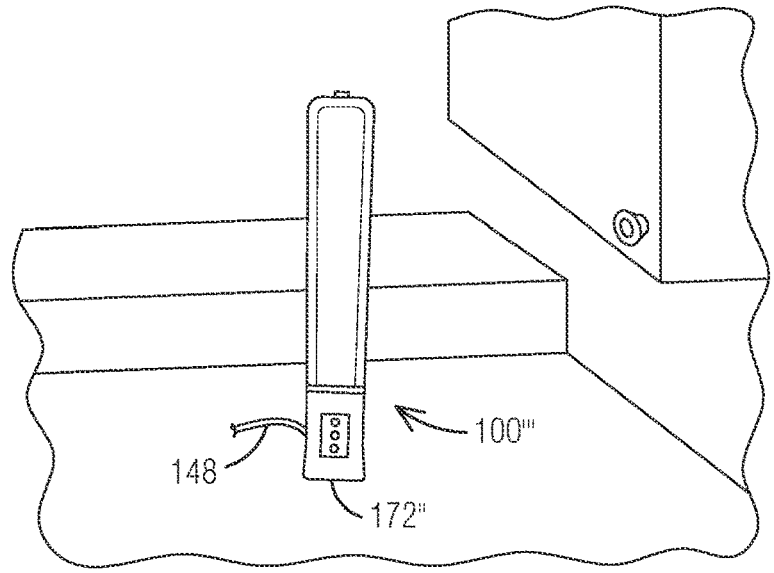
Figure 13D:
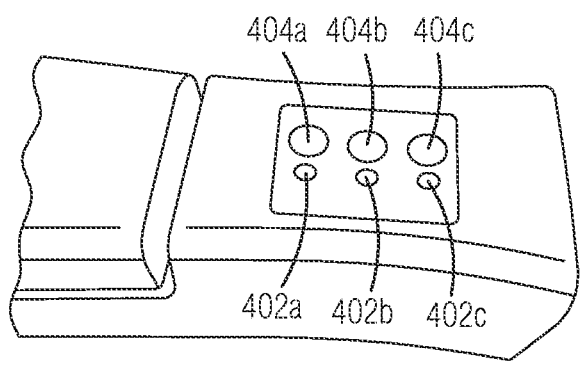
Figure 13E:
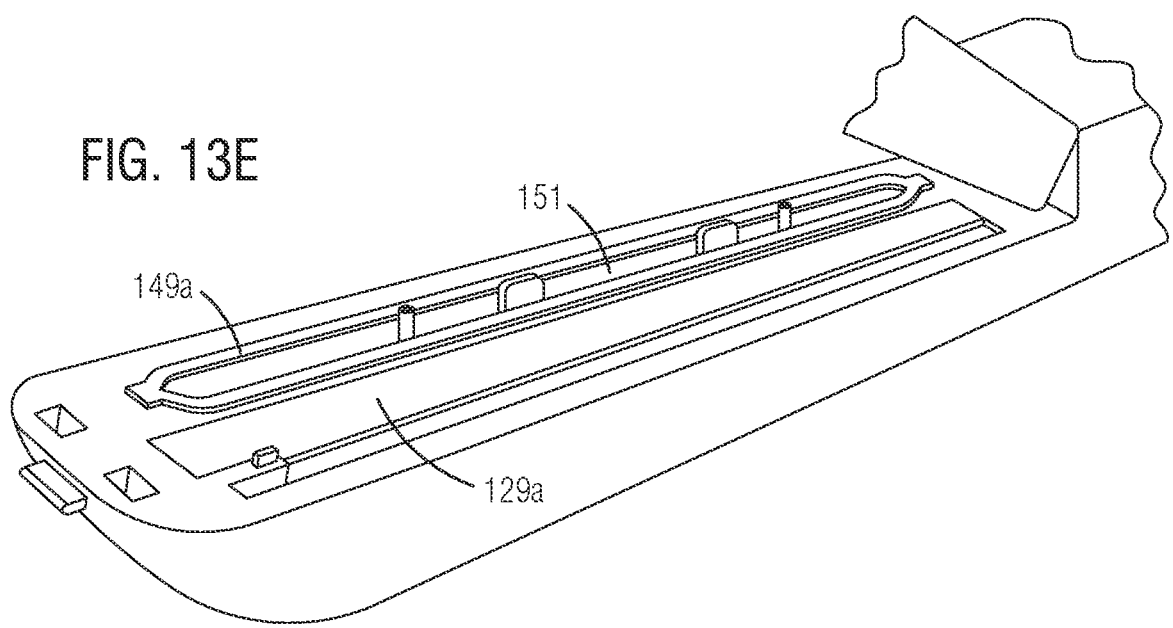
Figure 13F:
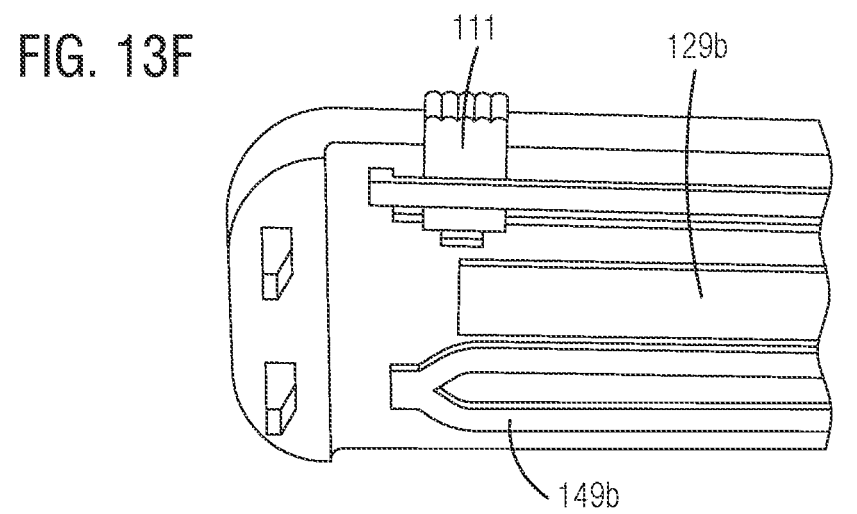

FIGS. 13A-13H are images that illustrate an example of various views of a system 100''' for sealing an enclosure of plastic material, according to an embodiment. In an embodiment, the system 100''' of FIGS. 13A-13H is similar to the system 100''' of FIGS. 12A-12K with the exception of the features discussed herein. In one embodiment, unlike the system 100''' of FIGS. 12A-12K, the system 100''' of FIGS. 13A-13H is configured to form a vacuum seal (in addition to the spaced apart heat seals 301") the enclosure 138'. In another embodiment, the system 100''' of FIGS. 13A-13H is also configured so that it can form the spaced apart heat seals 301" without the vacuum seal. In another embodiment, the system 100''' of FIGS. 13A-13H is powered by an external power source (e.g. using cable 148 of FIG. 13A) and does not include a rechargeable battery. In another embodiment, the system 100''' of FIGS. 13A-13H is table top and not configured to be hand held. In other embodiments, the system 100''' of FIGS. 13A-13H is configured to be hand held. In other embodiments, the system 100'''' of FIGS. 13A-13H is configured to have a rechargeable battery, that may be similar to the rechargeable battery of the system 100'''' of FIGS. 12A-12K. In yet another embodiment, the system 100'''' of FIG. 13B features a base 172" that is relatively flat so that the system 100'''' can be positioned on a flat surface and stored to provide more working room on a surface (e.g. stored vertically as shown in FIG. 13B to provide more counter surface in a kitchen).

In an embodiment, the system 100''' of FIGS. 13A-13H features a control panel (FIG. 13C) including a plurality of switches 404a, 404b, 404c and a respective plurality of indicator lights 402a, 402b, 402c. In another embodiment, the first switch 404a and indicator light 402a (e.g. "vacuum only") are used to form the vacuum seal without the spaced apart seals 301" (see FIGS. 14A-15H below). In one embodiment, the second switch 404b (e.g. "seal only") and indicator light 402b are used to form the spaced apart seals 301" without forming a vacuum seal. In another embodiment, the third switch 404c and indicator light (e.g. "vacuum and seal") 402c are used to form both the spaced apart seals 301" and the vacuum seal. In an example embodiment, the first switch 404a is used to vacuum seal enclosures that are already pre-sealed and thus do not need the spaced apart seals 301" (e.g. bottle, plastic container with lid, etc.).

Figure 13J:
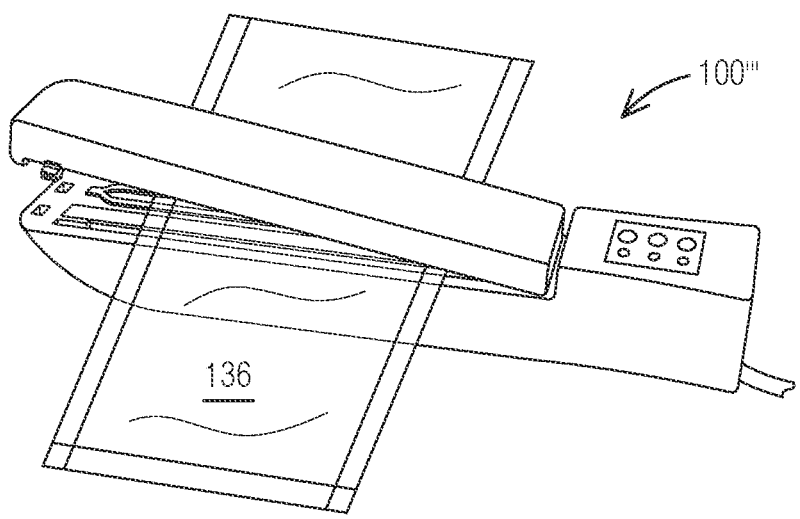
Figure 13K:
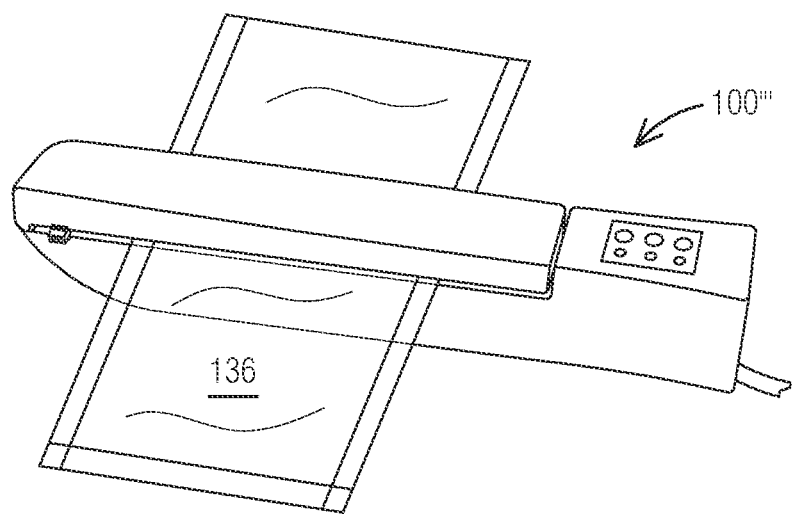
Figure 13L:
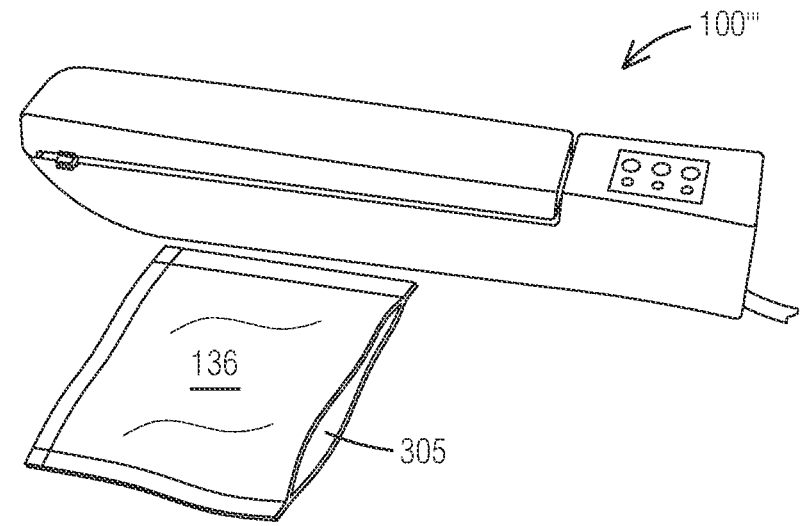

In an embodiment, the system 100''' of FIGS. 13A-13H features a seal ring such as a rubber ring 149a (e.g. oval shaped) that defines an opening 151 in the lower element 105b'. In one embodiment, the air pump 133 has an inlet that is in flow communication with the opening 151 (e.g. inlet of the air pump 133 is positioned within the opening 151). The upper element 105a' also features a rubber ring 149b (FIG. 13E) on an inner surface of the upper element 105a' that engages the rubber ring 149a of the lower element 105b' when the elements 105a', 105b' are closed. This advantageously forms a seal between the rubber rings 149a, 149b (e.g. when the system is closed) to seal a flow communication between the air pump 133 and the enclosure 138' to permit the air pump 133 (e.g. with an inlet within the opening 151) to draw air from the enclosure 138 (e.g. through the opening 305 of plastic bag placed within the opening 151 before closing the system). In an example embodiment, the user presses the switch 404c which causes the air pump 133 to draw air out from the opening 305 of the enclosure 138 and then subsequently causes the heating elements 106a",106b" (e.g. through the silicon strip 129a) to form the spaced apart seals 301" adjacent the opening 305 after the vacuum seal. FIGS. 13I-13N depict these steps. In an embodiment, FIGS. 13I-13K depict that the seals 301" are formed in the plastic material and the cutting element 111 is used to form an opening 305 in the enclosure 138' (e.g. plastic bag) to be filled. Contents 308 (e.g. cheese) are then placed through the opening 305 and into the enclosure 138'. The opening 305 of the enclosure 138' is then placed so that the opening 305 is within the opening 151 (FIG. 13M) so that the air pump 133 inlet is in sealed flow communication with the enclosure 138'. The elements 105a', 105b' are then closed and the third switch 404c (e.g. 'vacuum and seal") is then pressed so that the air pump 133 removes air from the enclosure 138' and subsequently the heating elements 106a", 106b" form the spaced apart seals 301" at the opening 305 (FIG. 13N). The elements 105a', 105b' can then be opened and the vacuum sealed enclosure 138' is then removed from the system.

Figure 14A:
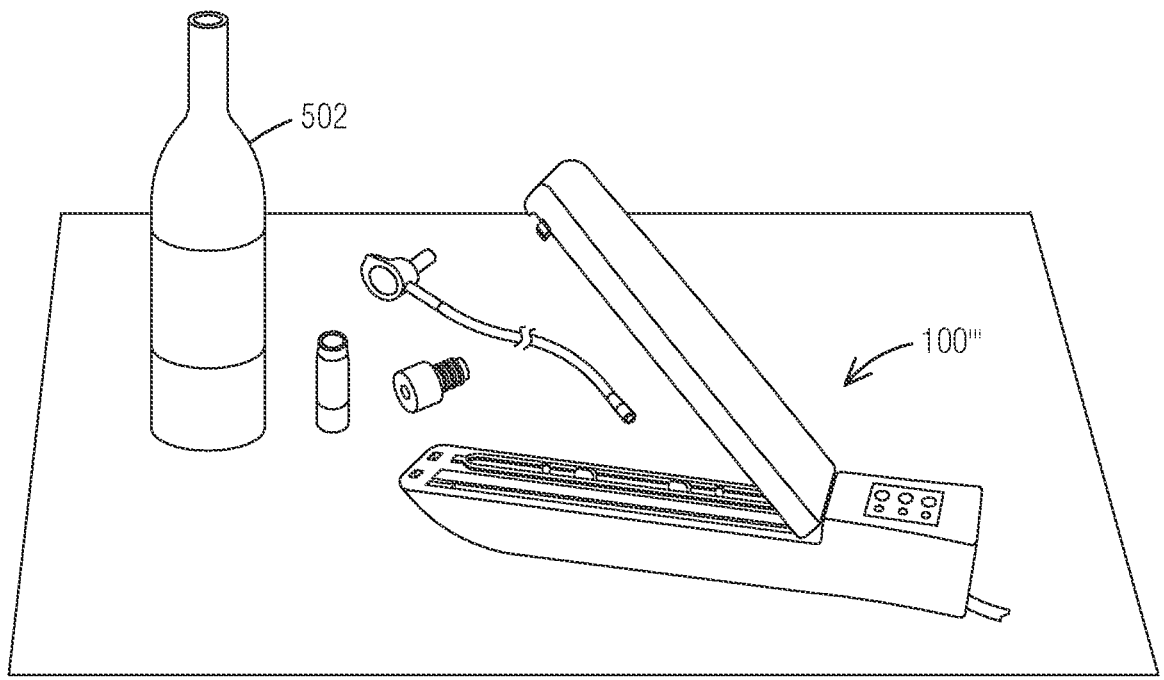
FIGS. 14A-14F are images that illustrate an example of various views of the system of FIG. 13A being used to seal contents within a bottle enclosure, according to an embodiment.
Figure 14B:
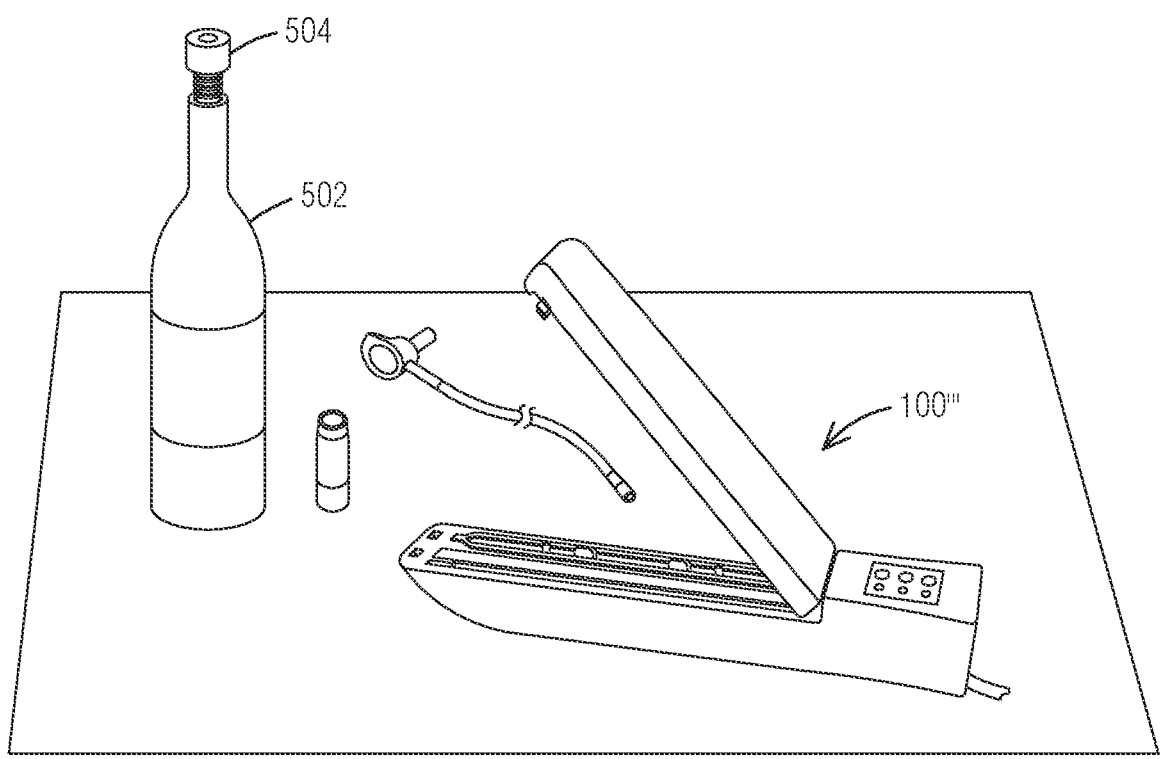
Figure 14C:
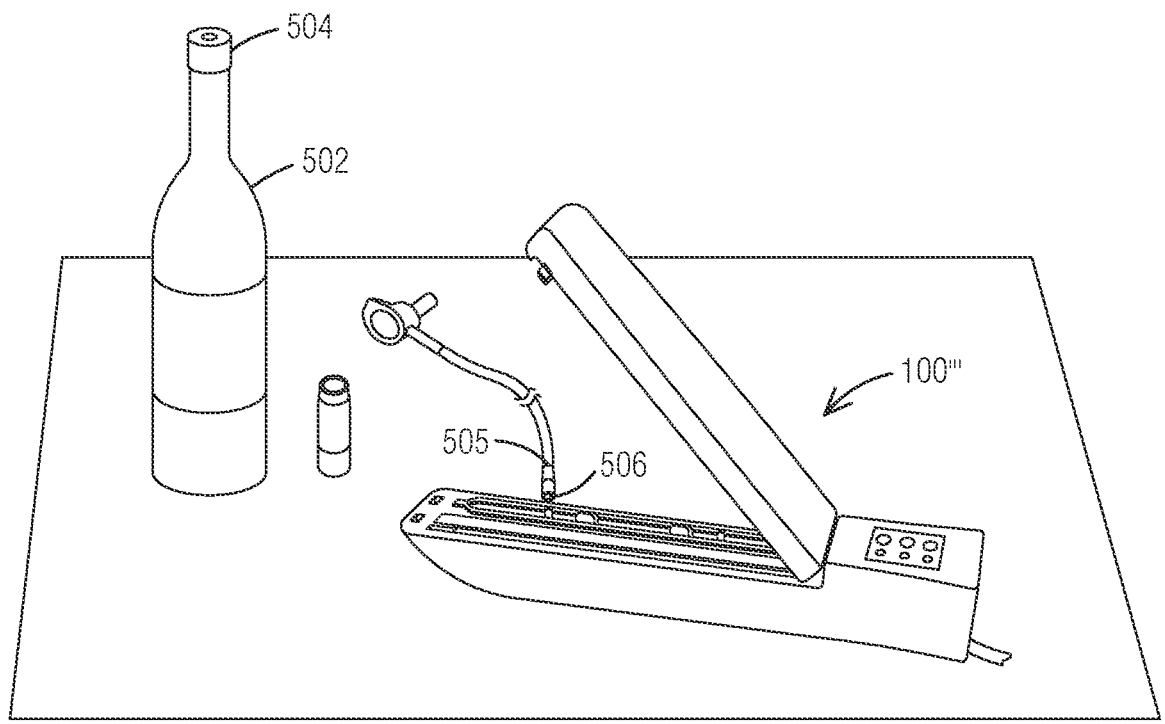

FIGS. 14A-14F are images that illustrate an example of various views of the system 100''' of FIG. 13A being used to seal contents within an enclosure defined by a bottle 502 (e.g. wine bottle), according to an embodiment. In this embodiment, a cork that is a one-way valve 504 (e.g. only lets air out of the bottle 502, not into the bottle 502) is inserted into the bottle opening (FIG. 14B). A plastic tube (e.g. similar to an IV tube) has a first end 506 that is connected with a pump inlet 505 that is positioned within the opening 151 (e.g. the inlet of the air pump 133). A second end 507 of the tube is then connected with an adapter 509 that is inserted into the one-way valve 504 cork (FIG. 14D), so that the air pump 133 is in flow communication with the enclosure of the bottle 502. In an embodiment, the user then presses the first switch 404a (e.g. "vacuum only") which then causes the air pump 133 to draw air out of the enclosure of the bottle 502, and stops after the air has been removed from the bottle 502 and/or the pressure of the removed air is lower than a threshold pressure. In an embodiment, the one-way valve 504 cork maintains the vacuum seal within the bottle 502 and thus no spaced apart seals 301" are required to vacuum seal the bottle 502. In an example embodiment, the one-way valve 504, tube and adapter 509 are sold by various manufacturers such as Foodsaver® of Oklahoma City, Okla. The inventor realized that the air pump 133 of the system 100''' can be advantageously used to form a vacuum seal in the bottle 502 and/or container 511 below, thereby reducing the need for an additional air pump to be used to form the vacuum seal in the bottle 502, which would be required in the absence of the system 100'''.

Figure 14D:
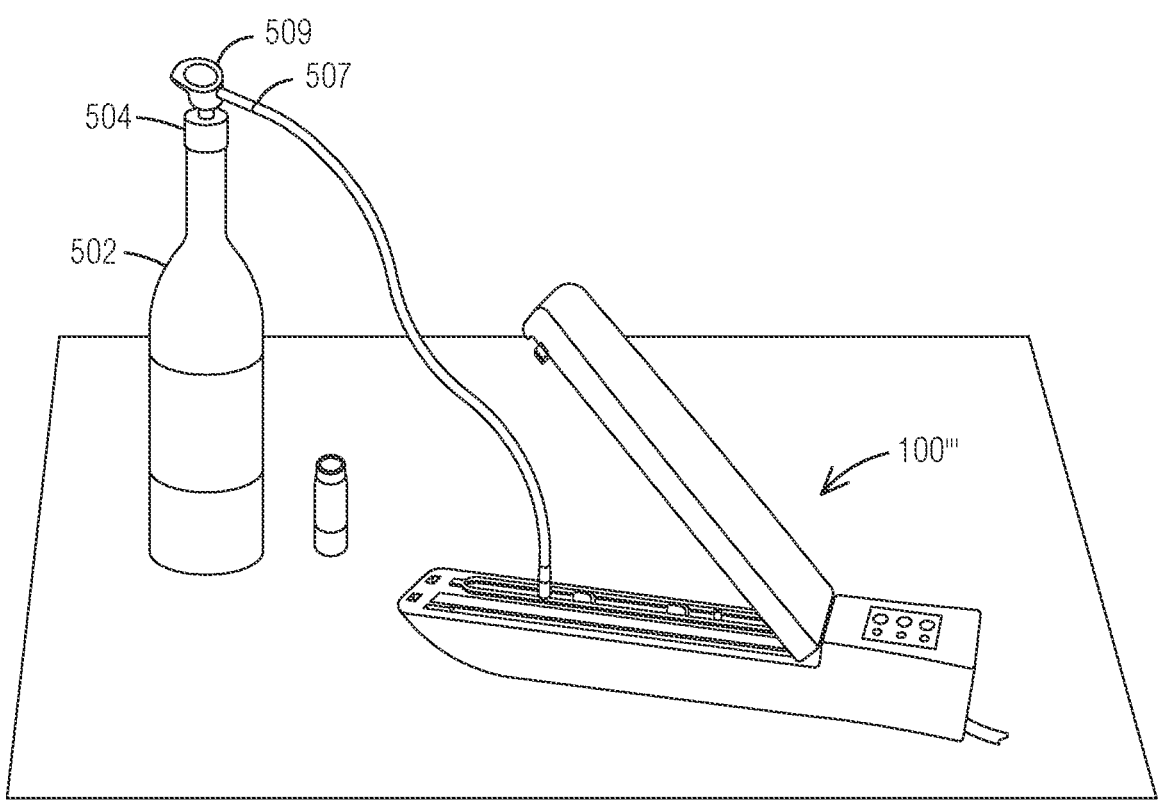
Figure 14E:
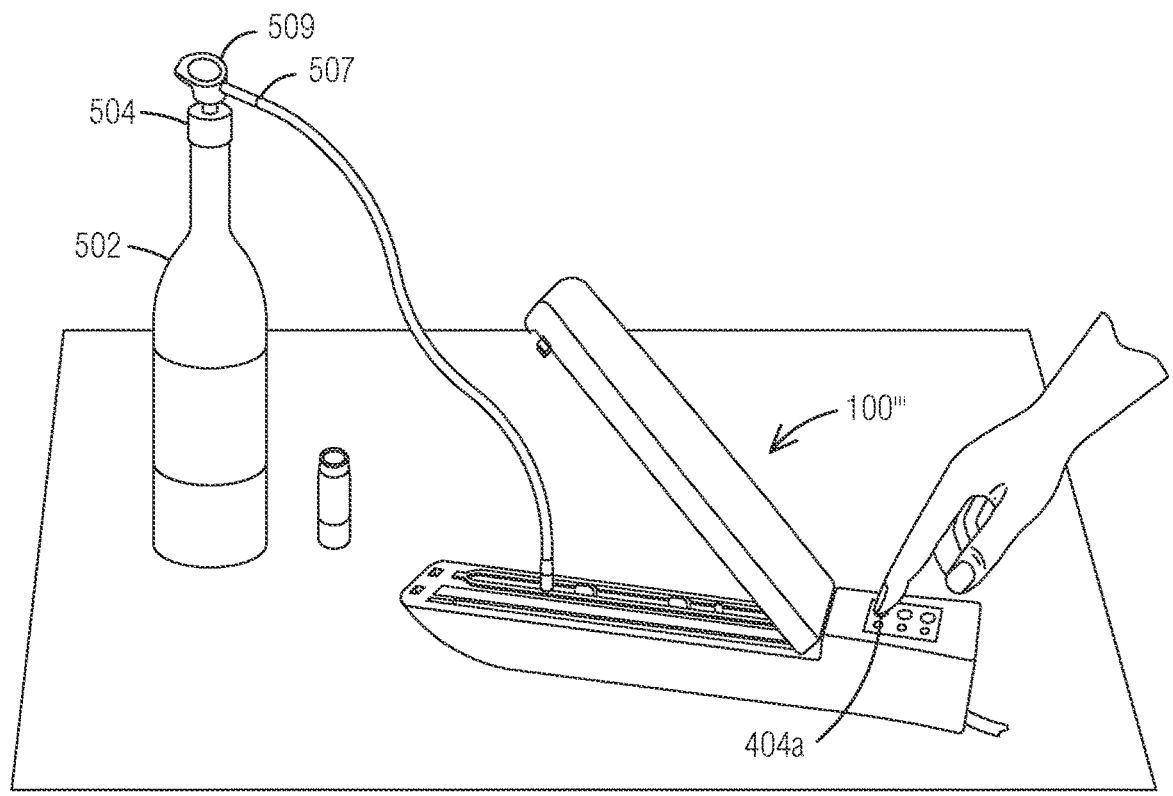
Figure 14F:
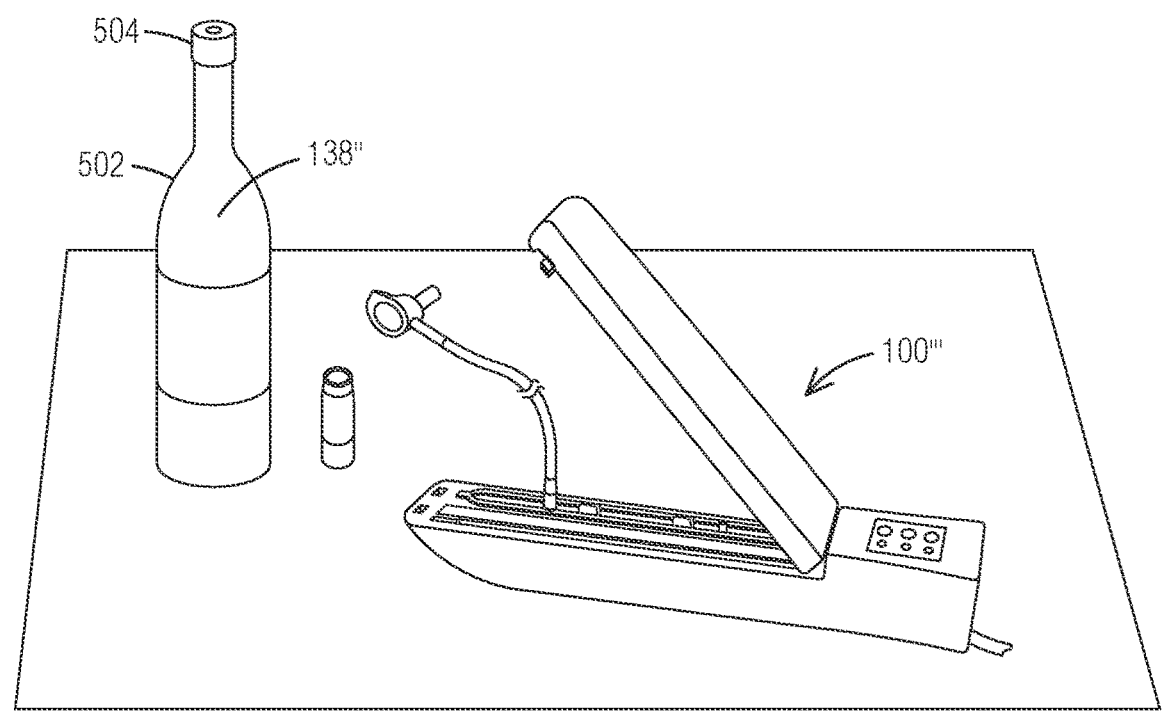
Figure 15A:
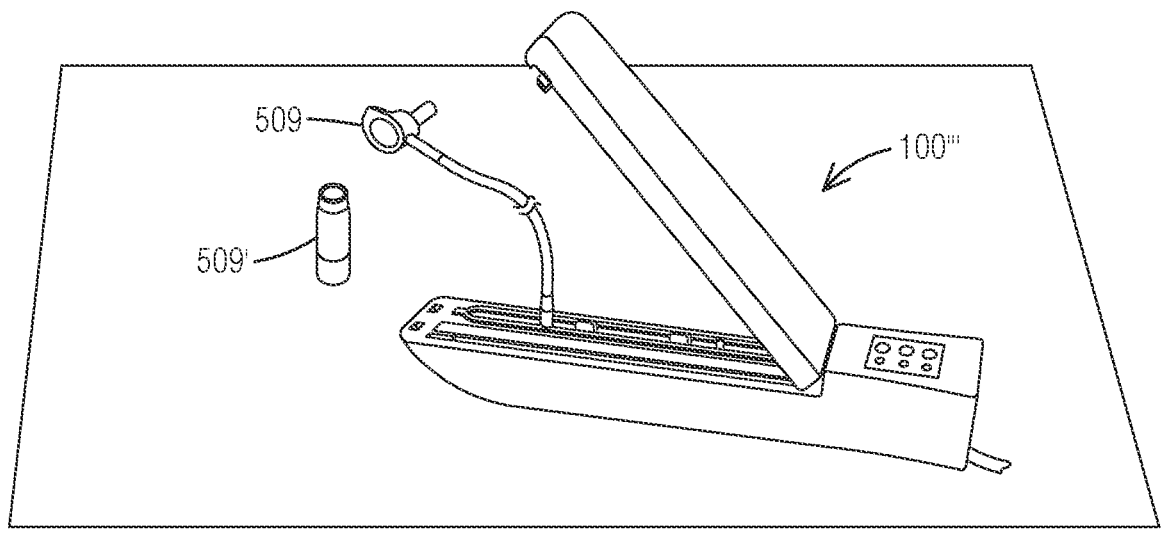
FIGS. 15A-15E are images that illustrate an example of various views of the system of FIG. 13A being used to seal contents within a container enclosure, according to an embodiment.
Figure 15B:
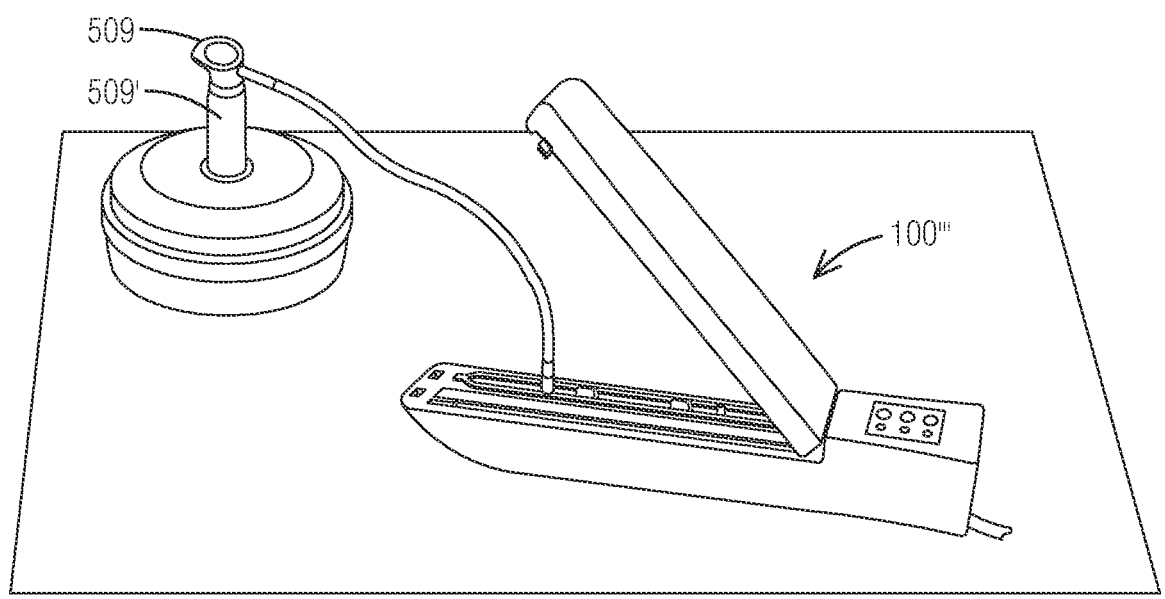
Figure 15C:
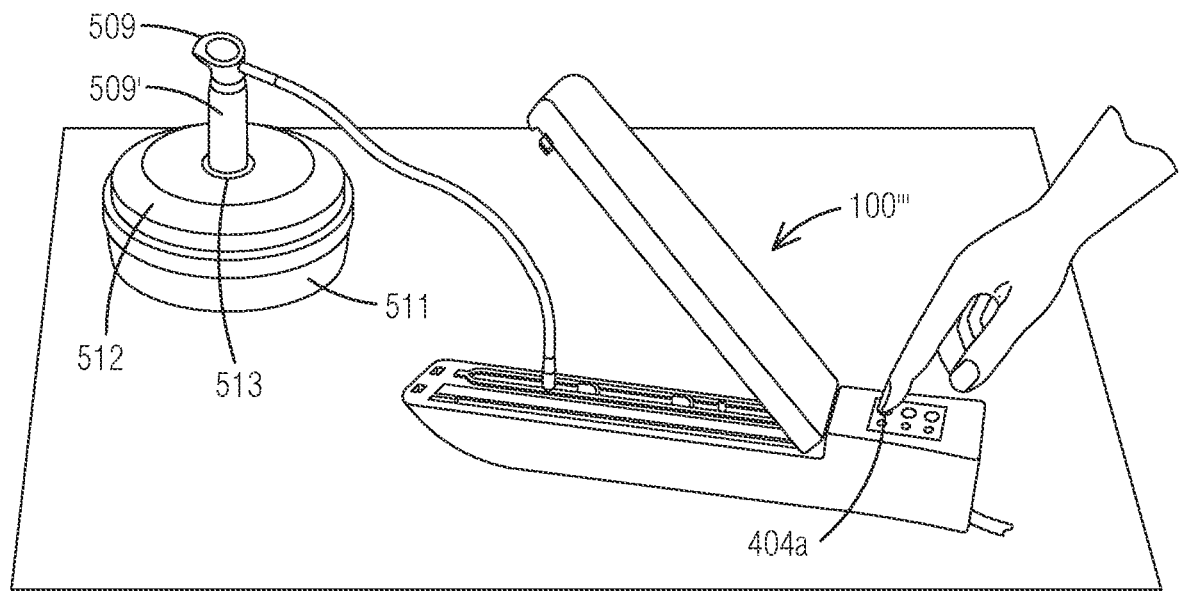
Figure 15D:
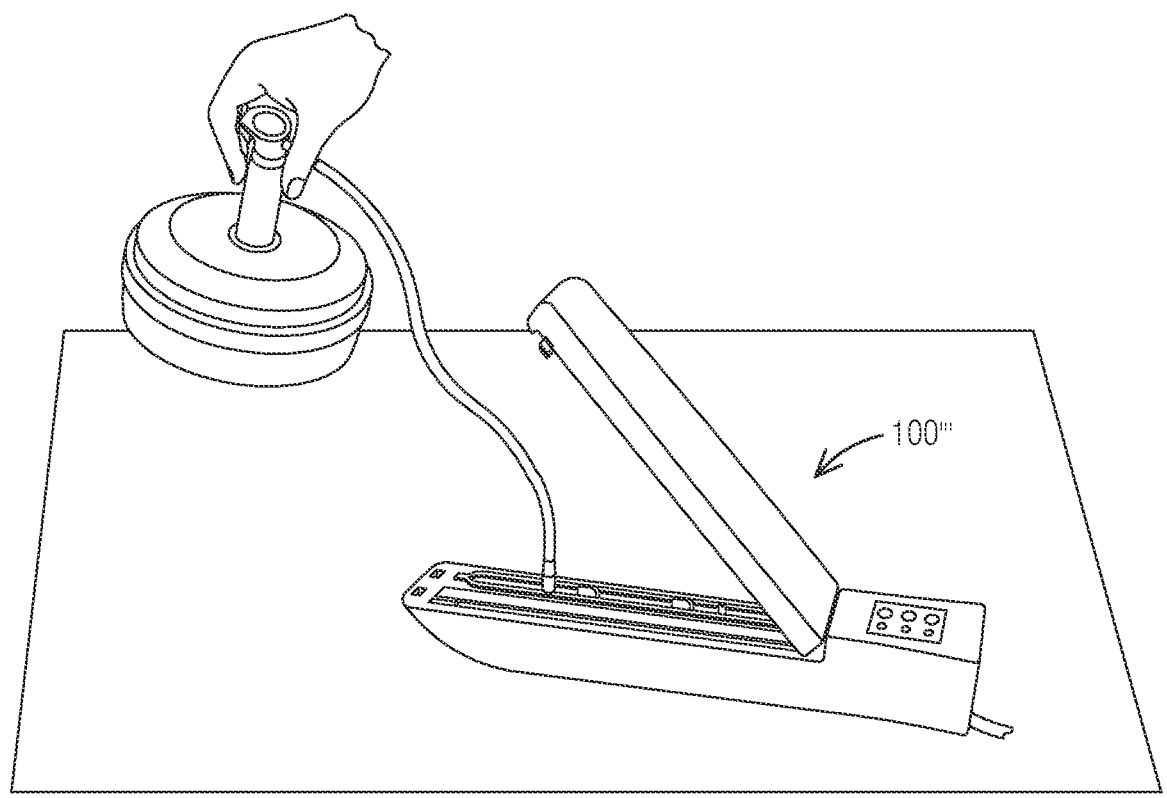
Figure 15E:
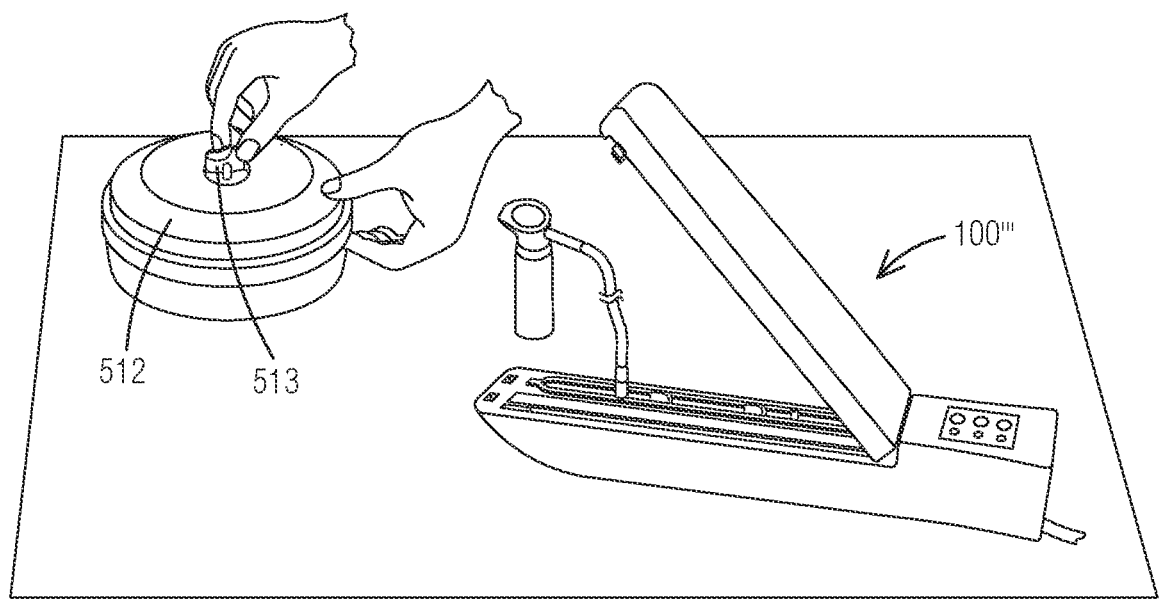

FIGS. 15A-15E are images that illustrate an example of various views of the system 100''' of FIG. 13A being used to seal contents within a container 511 enclosure, according to an embodiment. In an embodiment, the container 511 is a plastic container with a removable lid 512. In an example embodiment, the lid 512 features a one way valve 513 (e.g. a valve which only permits air to leave the container 511 and not enter the container 511). In an example embodiment, the one way valve 513 is opened by folding it upwards (FIG. 15E) which permits air to enter an opening (covered by the valve 513). Thus, the one way valve 513 advantageously prevents air from entering the container 511 and only permits air to leave the container 511 (e.g. during the vacuum seal process). An adapter 509' that is similar to the adapter 509 of FIG. 14D is connected to the adapter 509, since the adapter 509' has a larger diameter (e.g. configured to be inserted within the one way valve 513 of the container 511) than the adapter 509 (e.g. configured to be inserted within the one way valve 504 cork). In other embodiments, the second end 507 of the tube is directly connected to one adapter that is sized to the one way valve 513 of the container 511 and thus there is no need for multiple adapters. As depicted in FIG. 15C the adapter 509' is connected to the one way valve 513, which forms a sealed flow communication between the air pump 133 (e.g. first end 506 of the tube is connected to the pump inlet 505) and the interior of the container 511. The user then presses the first switch 404a (FIG. 15C) which causes the air pump 133 to draw air out of the container 511 until a vacuum seal is formed (FIG. 15D depicts that the container 511 can be lifted off the ground and the lid 512 remains on the container 511, demonstrating the vacuum seal). As depicted in FIG. 15E, to remove the vacuum seal the one way valve 513 is folded upward which permits air to enter the container 511 and breaks the vacuum seal.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. An apparatus for sealing an enclosure of plastic material comprising:
    a pair of elements including a first element pivotally coupled to a second element at a rotational axis at a first end of the elements; and
    a pair of spaced apart heating elements positioned along an inner surface of at least one element and configured to be connected to a power source, wherein a longitudinal axis of the heating elements is oriented parallel to a longitudinal axis of the at least one element and the longitudinal axis of the at least one element is oriented orthogonal to the rotational axis;
    a cutting element positioned at an inner surface of the first element of the pair of elements, wherein the cutting element is configured to move relative to the inner surface in a direction orthogonal to the rotational axis to cut plastic material along an interface between the pair of elements adjacent to the pair of spaced apart heating elements, wherein the cutting element is offset from a center of a width of the first element;
    wherein upon positioning the plastic material including a first plastic layer and a second plastic layer at the interface between the pair of elements, the apparatus is configured to vacuum seal an enclosure defined by the plastic material and wherein the heating elements are configured to increase a temperature at the interface to simultaneously form a pair of spaced apart seals at the interface in the plastic material between the first plastic layer and the second plastic layer.

2. The apparatus of claim 1, further comprising:
    a panel adjacent the first end of the first element, said panel including one or more switches to control operation of the apparatus; and a locking mechanism adjacent a second end of the first element that is opposite to the first end, said locking mechanism configured to lock the pair of elements together in a closed position.

3. The apparatus of claim 1, wherein said cutting element is positioned adjacent to the pair of spaced apart heating elements and is positioned on one side of the pair of spaced apart heating elements such that said cutting element is configured to cut the plastic material to form an opening in the plastic material.

4. The apparatus of claim 3, wherein said cutting element is slidably received in a first slot of the first element so that the cutting element is configured to slide along the inner surface of the first element in the direction orthogonal to the rotational axis and wherein an inner surface of a second element of the pair of elements includes a second slot to slidably receive the cutting element along the interface when the plastic material is cut by the cutting element.

5. The apparatus of claim 4, wherein the second slot and the heating elements are positioned along the inner surface of the second element such that the second slot is spaced apart from the heating element by a minimum spacing such that the heating elements do not seal the opening formed by the cutting element.

6. The apparatus of claim 3, wherein the cutting element is spaced apart from the pair of spaced apart heating elements by a minimum spacing along the inner surface of the first element, wherein the minimum spacing is adjusted such that heat from the pair of spaced apart heating elements does not melt the plastic material along the opening and reseal the opening.

7. The apparatus of claim 1, further comprising a controller and a sensor to detect that the pair of elements are in a closed position, wherein the sensor is configured to transmit a signal to the controller to indicate that the pair of elements are in the closed position and wherein upon receiving the signal from the sensor the controller is configured to transmit a signal to at least one of a pump to vacuum seal the enclosure and the spaced apart heating elements to simultaneously form the pair of spaced apart seals.

8. The apparatus of claim 7, further comprising:
a first switch in signal communication with the controller;
a second switch in signal communication with the controller;
wherein upon pressing the first switch, the first switch is configured to transmit a signal to the controller such that after the controller receives the signal from the first switch and the signal from the sensor, the controller is configured to transmit a signal to activate a pump to vacuum seal the enclosure and does not transmit a signal to increase the temperature of the spaced apart heating elements such that the pair of spaced apart seals are not formed in the plastic material; and
wherein upon pressing the second switch, the second switch is configured to transmit a signal to the controller such that after the controller receives the signal from the second switch and the signal from the sensor, the controller is configured to transmit a signal to activate the pump to vacuum seal the enclosure and is further configured to transmit a signal to increase the temperature of the spaced apart heating elements such that the pair of spaced apart seals are formed in the plastic material.

9. The apparatus of claim 1, wherein the apparatus includes a width dimension and a length dimension that is greater than the width dimension, wherein the longitudinal axis of the heating elements is along the length dimension and the rotational axis is along the width dimension and wherein the apparatus has a flat base along the width dimension such that the apparatus can be stored on a flat surface in a vertical orientation by standing the apparatus with the flat base on the flat surface.

10. The apparatus of claim 1, further comprising a pump mounted within a housing of one of the pair of elements and in fluid communication with an interior of the enclosure such that the pump is configured to draw air from the interior of the enclosure to vacuum seal the enclosure.

11. The apparatus of claim 1, further comprising a pump including an inlet, wherein an inner surface of a first element of the pair of elements defines an opening in flow communication with the pump inlet and wherein an opening in the plastic material is positioned adjacent to the opening defined by the inner surface of the first element such that the pump is configured to draw air from the enclosure through the opening in the plastic material and the opening defined by the first element.

12. The apparatus of claim 11, further comprising a first seal ring around the opening defined by the first element and a second seal ring on the inner surface of a second element of the pair of elements such that the first seal ring engages the second seal ring when the pair of elements are moved to a closed position to seal a flow communication between the pump and the enclosure across the interface.

13. An apparatus for sealing an enclosure of plastic material comprising:
a pair of elements including a first element pivotally coupled to a second element at a rotational axis at a first end of the elements, wherein a longitudinal axis of the pair of elements is oriented orthogonal to the rotational axis;
a pair of spaced apart heating elements positioned along an inner surface of at least one element and configured to be connected to a power source to melt the plastic material including a first plastic layer and a second plastic layer and simultaneously form a pair of spaced apart seals in the first plastic layer and the second plastic layer at an interface between the pair of elements; and
a cutting element positioned at an inner surface of at least one element on one side of the pair of spaced apart heating elements, wherein the cutting element is configured to move relative to the inner surface of the at least one element in a direction orthogonal to the rotational axis to cut the plastic material to form an opening in the plastic material along the interface, wherein the cutting element is offset from a center of a width of the first element; and
a pump with an inlet positioned adjacent to the interface and configured to draw air through the opening in the plastic material to vacuum seal an enclosure defined by the plastic material.

14. The apparatus of claim 13, further comprising:
an opening defined by the inner surface of a first element of the pair of elements, wherein the pump inlet is in flow communication with the opening defined by the inner surface of the first element; and
wherein the opening in the plastic material is positioned adjacent the opening defined by the inner surface of the first element such that the pump is in flow communication with the enclosure through the opening defined by the first element and the opening of the plastic material.

15. The apparatus of claim 14, further comprising:
a controller in signal communication with the heating elements and the pump and
a sensor to detect that the pair of elements are in a closed position, wherein the sensor is configured to transmit a signal to the controller to indicate that the pair of elements are in the closed position;
wherein upon receiving the signal from the sensor, the controller is configured to at least one of:
transmit a signal to activate the pump to draw air from the enclosure through the inlet to vacuum seal the enclosure; and
transmit a signal to cause the heating elements to form the pair of spaced apart heat seals in the plastic material at the enclosure.

16. The apparatus of claim 14, further comprising a pressure sensor to measure a pressure within the enclosure and wherein the pump is configured to stop drawing air from the enclosure when the measured pressure falls below a pressure threshold.

17. The system of claim 13, wherein the apparatus is portable such that operation of the apparatus including the plastic material being positioned at the interface between the pair of elements, the pair of elements being pivoted from an open position to a closed position and the formation of the seal are performed while the apparatus is held with a handle.

18. The apparatus of claim 13, further comprising:
a panel adjacent to the first end of the first element, said panel including one or more switches to control operation of the apparatus; and
a locking mechanism adjacent to a second end of the first element that is opposite to the first end, said locking mechanism configured to lock the pair of elements together in a closed position.

19. The apparatus of claim 13, wherein the apparatus is further configured to vacuum seal a second enclosure positioned external to a housing of the apparatus, wherein the second enclosure is different from the enclosure with the opening along the interface, wherein a first end of a tube is connected to the pump inlet and a second end of a tube is connected to an opening of the second enclosure, wherein the pump is configured to vacuum seal the second enclosure through the tube.

20. A method for sealing an enclosure of plastic material, comprising:
providing the apparatus for sealing an enclosure of plastic material of claim 1;
positioning the plastic material including a first plastic layer and a second plastic layer at an interface between a pair of elements including a first element pivotally coupled to a second element at a rotational axis, wherein a pair of spaced apart heating elements are positioned along an inner surface of at least one of the elements, wherein a longitudinal axis of the pair of elements is oriented orthogonal to the rotational axis;
pivoting the pair of elements from an open position to a closed position;
cutting the plastic material with a cutting element positioned at an inner surface of the first element including moving the cutting element relative to the inner surface of the first element in a direction orthogonal to the rotational axis to form an opening in the plastic material, wherein the cutting element is offset from a center of a width of the first element;
drawing air, with a pump, through the opening in the plastic material at the interface to form a vacuum seal in an enclosure defined by the plastic material; and
simultaneously forming, with the pair of spaced apart heating elements, a pair of spaced apart seals at the opening in the plastic material after the vacuum seal is formed in the enclosure.

\* \* \* \* \*